United States Patent [19]

Shasha

[11] Patent Number: 5,809,212
[45] Date of Patent: Sep. 15, 1998

[54] CONDITIONAL TRANSITION NETWORKS AND COMPUTATIONAL PROCESSES FOR USE INTERACTIVE COMPUTER-BASED SYSTEMS

[75] Inventor: Dennis Shasha, New York, N.Y.

[73] Assignee: New York University, New York, N.Y.

[21] Appl. No.: 768,727

[22] Filed: Dec. 18, 1996

Related U.S. Application Data

[63] Continuation of Ser. No. 90,811, Jul. 12, 1993, abandoned.

[51] Int. Cl.$^6$ ........................................ G06F 15/18
[52] U.S. Cl. .................................. 395/10; 706/45
[58] Field of Search ................ 395/10, 55, 600, 395/162; 364/200; 376/259

[56] References Cited

U.S. PATENT DOCUMENTS

| | | | |
|---|---|---|---|
| 4,870,568 | 9/1989 | Kahle et al. ............................ | 707/5 |
| 4,902,469 | 2/1990 | Watson et al. ......................... | 376/259 |
| 5,208,911 | 5/1993 | Newman et al. ....................... | 345/514 |
| 5,276,775 | 1/1994 | Meng .................................... | 395/55 |
| 5,404,514 | 4/1995 | Kageneck et al. ...................... | 707/5 |
| 5,408,655 | 4/1995 | Oren et al. ............................. | 707/501 |

*Primary Examiner*—Allen R. MacDonald
*Assistant Examiner*—Sanjiv Shah
*Attorney, Agent, or Firm*—Kenyon & Kenyon

[57] ABSTRACT

A conditional transition network for representing a domain of knowledge in a computer based system and computational procedures for use with the same is here presented. Each node of the network comprises a number of data fields, namely: a Precondition Field which contains an expression that evaluates to either TRUE, POSSIBLE or FALSE; a Question Field consisting of a linguistic string; an Answer Field whose expression can evaluate to any numerical or string domain, a Contents Field from a textual, visual, audio, or multimedia domain; and several other fields including a Delay Field. The edges of the network are induced by the precondition and answer formula and by edges embedded in the contents. If the precondition of node A refers to node B, then there is a precondition edge from B to A. Similarly, if the answer formula of node A refers to node B, then there is an answer edge from node B to node A. Edges from the Contents Field of one node to the Contents Field of another node are called hypermedia edges or links. They also may have predicates attached to them. When the querier of the network answers questions, various nodes change their precondition values among the values TRUE, POSSIBLE and FALSE. TRUE nodes correspond to those the querier should examine further. FALSE ones correspond to those of no further interest. POSSIBLE ones correspond to those that may or may not be of further interest.

26 Claims, 51 Drawing Sheets

| (v,w) Title Field | Node ID Field |
|---|---|
| (v) Display Label Field ||
| (w) Precondition Expression Field ||
| Precondition Children Field | Precondition Parents Field |
| Precondition Value Field | Precondition Flag Field |
| (w) Question Field ||
| (w,r) Answer Field ||
| Answer Children Field | Answer Parents Field |
| (w) Contents Field with embedded links each with a link predicate ||
| (w) Delay Field / HowLongTrueField / (d) Delay Remaining Field ||
| Qualified Answer Field ||

FIG. 2A

Q1. Question: What is your Gross Income?  Title: Gross Income
Precondition Expression: empty.
A1: Acceptable answers: any number.

Q2. Question: How many exemptions do you have?  Title: Exemptions
Precondition Expression: empty.
A2: Acceptable answers: any non-negative integer.

NQ3. Question: none  Title: Net Income
Precondition Expression: Exemptions ≥ 0
NA3: Answer determined by formula Gross Income- 2150 * Exemptions Q4. Question: Are You Married?  Title: Married
Precondition Expression: empty.
A1: Acceptable answers: yes or no.

C1. Question: none  Title: Pay Taxes
Precondition Expression: (Net Income > 12000) or (Net Income > 4000 AND Married = "No")
AC1: Acceptable answers: not applicable.

C2. Question: none  Title: Pay Nothing
Precondition Expression: (Net Income ≤ 4000) or (Net Income ≤ 12,000 AND Married = "Yes")
AC1: Acceptable answers: not applicable.

FIG. 4C

| Manage | A | B | C | D | E | F | G |
|---|---|---|---|---|---|---|---|
| 0 | | | | | | | |
| 1 | | Gross Inco CanAnswer | | Exemptions CanAnswer | | | |
| 2 | Married? CanAnswer | | | Net Income Possible | | | |
| 3 | | | Pay Taxes Possible | Pay Nothing Possible | | | |
| 4 | | | | | | | |
| 5 | | | | | | | |
| 6 | | | | | | | |

Number of floating boxes: 0
Number of TRUE floating boxes: 0
Number of POSSIBLE floating boxes: 0
Number of FALSE floating boxes: 0

FIG. 20B

| Title Field: Gross Income     Node ID Field: 1
Display Field: Can Answer
Precondition Expression Field:
Precondition Children Field:
Precondition Parents Field:
Precondition Value Field: TRUE  Prec. Flag Field: TRUE
Question Field: How much is your gross income?
Answer Field: POSSIBLE
Answer Children Field: 5
Answer Parents Field:
Contents Field:
Delay Field: 0  How Long True Field: 0
Delay Remaining Field: 0
Qualified Answer Field: POSSIBLE |

| Title Field: Exemptions     Node ID Field: 4
Display Field: Can Answer
Precondition Expression Field:
Precondition Children Field: 5
Precondition Parents Field:
Prec. Value Field: TRUE  Prec. Flag: TRUE
Question Field: How many exemptions do you have?
Answer Field: POSSIBLE
Answer Children Field: 5
Answer Parents Field:
Contents Field:
Delay Field: 0  How Long True Field: 0
Delay Remaining Field: 0
Qualified Answer Field: POSSIBLE |

| Title Field: Married     Node ID Field: 2
Display Field: Can Answer
Precondition Expression Field:
Precondition Children Field: 3,6
Precondition Parents Field:
Prec. Value Field: TRUE  Prec. Flag Field: TRUE
Question Field: Are you married?
Answer Field: POSSIBLE
Answer Children Field:
Answer Parents Field:
Contents Field:
Delay Field: 0  How Long True Field: 0
Delay Remaining Field: 0
Qualified Answer Field: POSSIBLE |

| Title Field: Net Income     Node ID Field: 5
Display Field: Possible
Precondition Expression Field: Exemptions$\geq$0
Precondition Children Field: 3,6
Precondition Parents Field: 4
Prec. Value Field: POSSIBLE
Prec. Flag Field: POSSIBLE
Question Field:
Answer Field: Gross Income-2150*Exemptions
Answer Children Field:
Answer Parents Field: 1,4
Contents Field:
Delay Field: 0  How Long True Field: 0
Delay Remaining Field: 0
Qualified Answer Field: POSSIBLE |

| Title Field: Pay Taxes     Node ID Field: 3
Display Field: Possible
Precondition Expression Field: Net Income > 12000 OR
(Net Income>4000 AND Married="No")
Precondition Children Field:
Precondition Parents Field: 2,5
Prec. Value Field: POSSIBLE  Prec. Flag Field: POSSIBLE
Question Field:     Answer Field: POSSIBLE
Answer Children Field:
Answer Parents Field:
Contents Field: Consult an accountant...
Delay Field: 0  How Long True Field: 0
Delay Remaining Field: 0
Qualified Answer Field: POSSIBLE |

| Title Field: Pay Nothing     Node ID Field: 6
Display Field: Possible
Precondition Expression Field: (Net Income $\leq$ 4000) OR
(Net Income$\leq$12000) AND (Married="Yes"))
Precondition Children Field:
Precondition Parents Field:2,5
Precondition Value Field: POSSIBLE
Prec. Flag Field: POSSIBLE
Question Field:
Answer Field: TRUE  Answer Parents Field
Answer Children Field: Contents Field: Contents: Congratulations!
Delay Field: 0  HowLongTrue Field: 0
DelayRemaining Field: 0
Qualified Answer Field: POSSIBLE |

FIG. 20C

| | |
|---|---|
| Title Field: Gross Income     Node ID Field: 1<br>Display Field: 15000<br>Precondition Expression Field:<br>Precondition Children Field:<br>Precondition Parents Field:<br>Precondition Value Field: TRUE Prec. Flag Field: TRUE<br>Question Field: How much is your gross income?<br>Answer Field: 15000<br>Answer Children Field: 5<br>Answer Parents Field:<br>Contents Field:<br>Delay Field: 0 HowLongTrue Field: 0<br>DelayRemaining Field: 0<br>Qualified Answer Field: 15000 | Title Field: Exemptions     Node ID Field: 4<br>Display Field: 2<br>Precondition Expression Field:<br>Precondition Children Field: 5<br>Precondition Parents Field:<br>Precondition Value Field: TRUE Prec. Flag: TRUE<br>Question Field: How many exemptions do you have?<br>Answer Field: 2<br>Answer Children Field: 5<br>Answer Parents Field:<br>Contents Field:<br>Delay Field: 0 HowLongTrue Field: 0<br>DelayRemaining Field: 0<br>Qualified Answer Field: 2 |
| Title Field: Married     Node ID Field: 2<br>Display Field: Can Answer<br>Precondition Expression Field:<br>Precondition Children Field: 3,6<br>Precondition Parents Field:<br>Precondition Value Field: TRUE Prec. Flag: TRUE<br>Question Field: Are you married?<br>Answer Field: POSSIBLE<br>Answer Children Field:<br>Answer Parents Field:<br>Contents Field:<br>Delay Field: 0 HowLongTrue Field: 0<br>DelayRemaining Field: 0<br>Qualified Answer Field: POSSIBLE | Title Field: Net Income     Node ID Field: 5<br>Display Field: 10700<br>Precondition Expression Field: Exemptions$\geq$0<br>Precondition Children Field: 3,6<br>Precondition Parents Field: 4<br>Precondition Value Field: POSSIBLE<br>Prec. Flag Field: POSSIBLE<br>Question Field:<br>Answer Field: Gross Income-2150*Exemptions<br>Answer Children Field:<br>Answer Parents Field: 1,4<br>Contents Field:<br>Delay Field: 0 HowLongTrue Field: 0<br>DelayRemaining Field: 0<br>Qualified Answer Field: 10700 |
| Title Field: Pay Taxes     Node ID Field: 3<br>Display Field: POSSIBLE<br>Precondition Expression Field: Net Income > 12000 OR<br>(Net Income>4000 AND Married="No")<br>Precondition Children Field:<br>Precondition Parents Field: 2,5<br>Precondition Value Field: POSSIBLE<br>Prec. Flag Field: POSSIBLE<br>Question Field: Answer Field: TRUE<br>Answer Children Field: Answer Parents Field:<br>Contents Field: Consult an accountant...<br>Delay Field: 0 HowLon True Field: 0<br>DelayRemaining Field: 0<br>Qualified Answer Field: POSSIBLE | Title Field: Pay Nothing     Node ID Field: 6<br>Display Field: Possible<br>Precondition Expression Field: (Net Income $\leq$ 4000) OR<br>((Net Income$\leq$12000) AND (Married="Yes"))<br>Precondition Children Field:<br>Precondition Parents Field: 2,5<br>Precondition Value Field: POSSIBLE<br>Prec. Flag Field: POSSIBLE<br>Question Field:<br>Answer Field: TRUE    Answer Parents Field:<br>Answer Children Field:<br>Contents: Congratulations!<br>Delay Field: 0 HowLongTrue Field: 0<br>DelayRemaining Field: 0<br>Qualified Answer Field: POSSIBLE |

FIG. 20E

Title Field: Gross Income　　Node ID Field: 1
Display Field: 15000
Precondition Expression Field:
Precondition Children Field:
Precondition Parents Field:
Precondition Value Field: TRUE Prec. Flag Field: TRUE
Question Field: How much is your gross income?
Answer Field: 15000
Answer Children Field: 5
Answer Parents Field:
Contents Field:
Delay Field: 0 How Long True Field: 0
Delay Remaining Field: 0
Qualified Answer Field: 15000

Title Field: Exemptions　　Node ID Field: 4
Display Field: 2
Precondition Expression Field:
Precondition Children Field: 5
Precondition Parents Field:
Prec. Value Field: TRUE Prec. Flag: TRUE
Question Field: How many exemptions do you have?
Answer Field: 2
Answer Children Field: 5
Answer Parents Field:
Contents Field:
Delay Field: 0 HowLongTrue Field: 0
DelayRemaining Field: 0
Qualified Answer Field: 2

Title Field: Married　　Node ID Field: 2
Display Field: Yes
Precondition Expression Field:
Precondition Children Field: 3,6
Precondition Parents Field:
Prec. Value Field: TRUE Prec. Flag Field: TRUE
Question Field: Are you married?
Answer Field: "Yes"
Answer Children Field:
Answer Parents Field:
Contents Field:
Delay Field: 0 How Long True Field: 0
Delay Remaining Field: 0
Qualified Answer Field: "Yes"

Title Field: Net Income　　Node ID Field: 5
Display Field: 10700
Precondition Expression Field: Exemptions≥0
Precondition Children Field: 3,6
Precondition Parents Field: 4
Precondition Value Field: POSSIBLE
Prec. Flag Field: POSSIBLE
Question Field:
Answer Field: Gross Income−2150*Exemptions
Answer Children Field:
Answer Parents Field:1,4
Contents Field:
Delay Field: 0 HowLongTrue Field: 0
DelayRemaining Field: 0
Qualified Answer Field: 10700

Title Field: Pay Taxes　　Node ID Field: 3
Display Field: False
Precondition Expression Field: Net Income > 12000 OR (Net Income>4000 AND Married="No")
Precondition Children Field:
Precondition Parents Field: 2,5
Precondition Value Field: FALSE
Prec. Flag Field: FALSE
Question Field: Answer Field: TRUE
Answer Children Field: Answer Parents Field:
Contents Field: Consult an accountant...
Delay Field: 0 HowLongTrue Field: 0
DelayRemaining Field: 0
Qualified Answer Field: FALSE Title Field: Pay Nothing　　Node ID Field: 6
Display Field: TRUE
Precondition Expression Field: (Net Income ≤ 4000) OR (Net Income≤12000) AND (Married="Yes"))
Precondition Children Field:
Precondition Parents Field:2,5
Precondition Value Field: TRUE
Prec. Flag Field: TRUE
Question Field:
Answer Field: TRUE　Answer Parents Field:
Answer Children Field: Contents: Congratulations!
Delay Field: 0 How Long True Field: 0
DelayRemaining Field: 0
Qualified Answer Field: TRUE

FIG. 20G

Title Field: Gross Income  Node ID Field: 1
Display Field: 17000
Precondition Expression Field:
Precondition Children Field:
Precondition Parents Field:
Precondition Value Field: TRUE Prec. Flag Field: TRUE
Question Field: How much is your gross income?
Answer Field: 17000
Answer Children Field: 5
Answer Parents Field:
Contents Field:
Delay Field: 0 HowLongTrue Field: 0
DelayRemaining Field: 0
Qualified Answer Field: 17000

Title Field: Exemptions  Node ID Field: 4
Display Field: 2
Precondition Expression Field:
Precondition Children Field: 5
Precondition Parents Field:
Precondition Value Field: TRUE Prec. Flag: TRUE
Question Field: How many exemptions do you have?
Answer Field: 2
Answer Children Field: 5
Answer Parents Field:
Contents Field:
Delay Field: 0 HowLongTrue Field: 0
DelayRemaining Field: 0
Qualified Answer Field: 2

Title Field: Married  Node ID Field: 2
Display Field: Noninfluential
Precondition Expression Field:
Precondition Children Field: 3,6
Precondition Parents Field:
Prec. Value Field: TRUE Prec. Flag: TRUE
Question Field: Are you married?
Answer Field: POSSIBLE
Answer Children Field:
Answer Parents Field:
Contents Field:
Delay Field: 0 HowLongTrue Field: 0
DelayRemaining Field: 0
Qualified Answer Field: POSSIBLE Title Field: Net Income  Node ID Field: 5
Display Field: 12700
Precondition Expression Field: Exemptions≥0
Precondition Children Field: 3,6
Precondition Parents Field: 4
Prec. Value Field: POSSIBLE Prec. Flag Field: POSSIBLE
Question Field:
Answer Field: Gross Income-2150*Exemptions
Answer Children Field:
Answer Parents Field:1,4
Contents Field:
Delay Field: 0 HowLongTrue Field: 0
DelayRemaining Field: 0
Qualified Answer Field: 12700

Title Field: Pay Taxes  Node ID Field: 3
Display Field: True
Precondition Expression Field: Net Income > 12000 OR (Net Income>4000 AND Married="No")
Precondition Children Field:
Precondition Parents Field: 2,5
Precondition Value Field: TRUE
Prec. Flag Field: TRUE
Question Field: Answer Field: TRUE
Answer Children Field: Answer Parents Field:
Contents Field: Consult an accountant...
Delay Field: 0 HowLongTrue Field: 0
DelayRemaining Field: 0
Qualified Answer Field: TRUE Title Field: Pay Nothing  Node ID Field: 6
Display Field: False
Precondition Expression Field: (Net Income ≤ 4000) OR ((Net Income≤12000) AND (Married="Yes"))
Precondition Children Field:
Precondition Parents Field:2,5
Precondition Value Field: FALSE
Prec. Flag Field: FALSE
Question Field:
Answer Field: TRUE   Answer Parents Field:
Answer Children Field:
Contents Field: Congratulations!
Delay Field: 0 How Long True Field: 0
DelayRemaining Field: 0
Qualified Answer Field: FALSE

FIG. 20I

Global Clock: 0

```
Title Field: Foundation          Node ID Field: 1
Display Label Field: Possible
Precondition Exp. Field:   Prec. Children: 5 Parents:
Precondition Value: TRUE Prec. Flag: POSSIBLE
Question Field:
Answer: TRUE Ans. Children: Ans. Parents:
Contents Field: The foundation takes two months
Delay: 2  HowLongTrue: 0  Qual. Ans. POSSIBLE
Delay Remaining: 2
```

```
Title Field: Beams          Node ID Field: 6
Display Label Field: Possible
Precondition Exp. Field: Prec. Children: 5 Parents:
Precondition Value: TRUE Prec. Flag Field: POSSIBLE
Question Field:
Answer: TRUE Ans. Children: Ans. Parents:
Contents Field: Delivery of the beams takes one month.
Delay: 1 HowLongTrue: 0 Qual. Ans. POSSIBLE
DelayRemaining: 1
```

```
Title Field: Approve?          Node ID Field: 2
Display Label Field: Can Answer
Precondition Expression Field: Space Frame = TRUE
Children 3,4 Parents: 5
Precondition Value: TRUE Prec Flag: TRUE
Question Field:  Does inspector approve space frame?
Answer: POSSIBLE Ans. Children: Ans. Parents:
Contents Field: This inspector is very picky.
Delay: 0   HowLongTrue: 0 Qual. Ans. POSSIBLE
DelayRemaining: 0
```

```
Title Field: Challenge Inspector          Node ID Field: 3
Display Label Field: Possible
Precondition Exp. Field: Approve?="No"Children:Parents:
Precondition Value: POSSIBLE Prec. Flag: POSSIBLE
Question Field:
Answer: TRUE Ans. Children: Ans. Parents:
Contents Field: Go see his boss.
Delay: 0 HowLongTrue: 0 Qual. Ans. POSSIBLE
DelayRemaining: 0
```

```
Title Field: Complete          Node ID Field: 4
Display Label Field: Possible
Precondition Expression Field: Approve?="Yes" AND
Space Frame=TRUE  Prec. Children: Parents: 2,5
Precondition Value: POSSIBLE
Prec. Flag: POSSIBLE
Question Field:
Answer: TRUE Ans. Children: Ans. Parents:
Contents Field: Let's hope we get here on time.
Delay: 0 HowLongTrue: 0 Qual. Ans. POSSIBLE
DelayRemaining: 0
```

```
Title Field: Space Frame          Node ID Field: 5
Display Label Field: Possible
Precondition Exp. Field: Foundation = TRUE AND
Beams = TRUE Prec. Children: 4 Parents: 1,6
Precondition Value: POSSIBLE Prec. Flag: POSSIBLE
Question Field:
Answer: TRUE Ans. Children: Ans. Parents:
Contents Field: This is a conservative estimate.
Delay: 2 HowLongTrue: 0 Qual. Ans. POSSIBLE
Delay Remaining: 2
```

Fig. 21B

Title Field: Net Income      Node ID Field: 1
Display Label Field: CanAnswer
Precondition Exp Field: Children: 2,4 Parents:
Precondition Value: TRUE Prec Flag: TRUE
Question Field: What is your net income?
Answer: POSSIBLE Ans. Children: Ans. Parents:
Contents Field:
Delay: 0 HowLongTrue: 0 Qual. Ans. POSSIBLE Title Field: U.S.State      Node ID Field: 3
Display Label Field: CanAnswer
Precondition Exp. Field: Children: 2,4 Parents:
Precondition Value: TRUE Prec. Flag: TRUE
Question Field: Which state do you live in?
Answer: POSSIBLE Ans. Children: Ans. Parents:
Contents Field:
Delay: 0 HowLongTrue: 0 Qual. Ans. POSSIBLE Title Field: Profession      Node ID Field: 5
Display Label Field: Can Answer
Precondition Exp. Field: Children: 2,4 Parents:
Precondition Value: TRUE Prec Flag: TRUE
Question Field: What is your profession?
Answer: POSSIBLE Ans. Children: Ans. Parents:
Contents Field:
Delay: 0 HowLongTrue: 0 Qual. Ans. POSSIBLE Title Field: Get Money      Node ID Field: 2
Display Label Field: Possible
Precondition Exp Field:  NetIncome < 0
Prec. Children:  Prec. Parents 1
Precondition Value: POSSIBLE
Prec. Flag: POSSIBLE  Question Field:
Answer: TRUE Ans. Children: Ans. Parents:
Contents Field: The government owes you money.
Delay: 0 HowLongTrue: 0 Qual. Ans. POSSIBLE Title Field: Pay Taxes      Node ID Field: 4
Display Label Field: Possible
Precondition Exp. Field: (NetIncome ≥ 0 AND
NETIncome < 500000) OR ((NetIncome ≥ 0 AND
(U.S. State!="Kentucky" OR Profession!= "Horsebreeder"))
Prec. Children: Prec Parents: 1,3,5
Precondition Value: POSSIBLE
Prec. Flag: POSSIBLE Question Field:
Answer : TRUE Ans. Children: Ans. Parents:
Contents Field: You must pay taxes.
Delay: 0 HowLongTrue: 0 Qual. Ans. POSSIBLE

FIG. 22B

| | |
|---|---|
| Title Field: Joe  Node ID Field: 1<br>Display Label Field: CanAnswer<br>Precondition Exp. Field: Children: 2,4,6 Parents:<br>Precondition Value: TRUE Prec. Flag: TRUE<br>Question Field: Which course should Joe teach?<br>Answer: POSSIBLE Ans. Children: Ans. Parents:<br>Contents Field:<br>Delay: 0 How Long True: 0 Qualified Ans.POSSIBLE | Title Field: Mary  Node ID Field: 3<br>Display Label Field: History<br>Precondition Exp. Field: Children: 2,4,6 Parents:<br>Precondition Value: TRUE Prec. Flag: TRUE<br>Question Field: Which course should Mary teach?<br>Answer: History Ans. Children: Ans. Parents:<br>Contents Field:<br>Delay: 0 HowLongTrue: 0 Qual. Ans. History |
| Title Field: Tom  Node ID Field: 5<br>Display Label Field: Can Answer<br>Precondition Exp. Field: Children: 2,4,6 Parents:<br>Precondition Value: TRUE Prec Flag: TRUE<br>Question Field: Which course should Tom teach?<br>Answer: POSSIBLE Ans. Children: Ans. Parents:<br>Contents Field:<br>Delay: 0 HowLongTrue: 0 Qual. Ans. POSSIBLE | Title Field: History  Node ID Field: 2<br>Display Label Field: True<br>Precondition Exp Field: Joe = "History"<br>OR Mary = "History"  Prec. Children: Parents:<br>Precondition Value: TRUE<br>Prec. Flag: TRUE Question Field:<br>Answer: TRUE Ans.Children: Ans. Parents:<br>Contents Field: Here is the syllabus for the course...<br>Delay: 0 HowLongTrue: 0 Qual. Ans. TRUE |
| Title Field: English  Node ID Field: 4<br>Display Label Field: Possible<br>Precondition Exp. Field: Mary = "English"<br>OR Joe = "English" Prec. Children: Parents:<br>Precondition Value: POSSIBLE<br>Prec. Flag: POSSIBLE Question Field<br>Answer: TRUE Ans. Children: Ans. Parents:<br>Contents Field: This class discusses Shakespeare.<br>Delay: 0 HowLongTrue: 0 Qual. Ans. POSSIBLE | Title Field: Math  Node ID Field: 6<br>Display Label Field: Possible<br>Precondition Exp. Field: Tom= "Math"<br>OR Mary = "Math" Prec. Children: Parents:<br>Precondition Value: POSSIBLE<br>Prec. Flag POSSIBLE Question Field:<br>Answer: TRUE  Ans. Children: Ans. Parents:<br>Contents Field: Linear algebra.<br>Delay: 0 HowLongTrue: 0 Qual. Ans. POSSIBLE |

FIG. 23B

CONDITIONAL TRANSITION NETWORKS AND COMPUTATIONAL PROCESSES FOR USE INTERACTIVE COMPUTER-BASED SYSTEMS

RELATED APPLICATIONS

The present application is a continuation of U.S. patent application Ser. No. 8/090,811 filed on Jul. 12, 1993 now abandoned.

BACKGROUND OF INVENTION

1. Field of Invention

The present invention relates to a novel dynamic information structure which can be used to represent knowledge networks, and also to related computational processes of diverse complexity within interactive computer-based systems.

2. Brief Description of the Prior Art

Presently, various types of computer-based systems are used to solve problems in diverse fields such as finance, science, industry, education, defense, engineering and recreation. Examples of such systems include rule-based expert systems, truth maintenance systems, database systems, hypermedia systems, spreadsheet computer systems, and the like.

Obtaining a solution to a problem using a computer-based system involves designing an information structure within the system tailored to a particular application and then mapping this tailored information structure onto available data structures (e.g. arrays, matrices, records, lists, queues, graphs and trees) in the system for subsequent implementation. An implementation of the available data structures involves both choosing a storage structure therefor and providing a set of procedures or functions that implement the appropriate operations using the chosen storage structure.

Typically, the information structure or structures utilized in any particular computer-based system will characterize many of its capabilities.

For example, most modern spreadsheet programs run on personal computer systems and utilize simple network-type data structures (i.e. directed acyclic graphs) where the edges of the graph carry answer information to nodes, and the calculations based on the answers are performed at the nodes. Each node has a single field.

Spreadsheet programs, such as Microsoft Excel 4.0, provide a bottom-up process called Solver which permits the user to state a set of constraints on some of the derived nodes in the network (i.e. nodes containing formulae) using conjunctives of arithmetic expressions and comparators (i.e., less than, less than or equal to, equal to, greater than, greater than or equal to). The spreadsheet program then determines whether these constraints can be met by changing the values at specified nodes. The Solver capability employs numerical techniques, such as linear programming and integer programming, to perform the node constraint computations. This restricts the range of applicability of the Solver Process. For example, the Solver cannot discover the value of node A2 that will make A3 have a value 1 in the situation where A1 has the value 4, and A3 contains the boolean expression= AND(A1=4, A2=6). The solution should be that A2 have the value 6, thus making the AND expression have the value 1. However, by the very nature of such prior art spreadsheet programs and the simple network data structures which they employ, prior art spreadsheet programs have a limited range of utility.

Like prior art spreadsheet programs, hypermedia or hypertext computer systems also employ network-type data structures (i.e. directed acyclic graphs), where the edges of the graph are selected based on the answer chosen. An exemplary hypertext system is described in the paper "Hypertext: an Introduction and Survey" by Jeff Conklin published in IEEE Computer, September 1987, at pages 17–41. Yet, unlike spreadsheet programs, each answerable node in a hypertext network presents the user with an answerable question and a set of choices of which other nodes in the network the user may visit. This type of data structure allows navigation among different nodes in the network. However, there is a major drawback associated with prior art hypermedia systems. Specifically, the state of a query in the system at a particular stage is defined by the last node accessed in the network, irrespective of how the user arrived at the accessed node.

Consequently, the capabilities of prior art hypermedia systems have been necessarily restricted and thus of limited utility in many fields of computing and modeling. For example, it is not possible in the hypermedia model to restrict the exploration of nodes to ones which have not yet been visited. While this restriction can be fixed, it requires a special case effort.

In prior art database systems, a data file is defined using a database language and accessed using the facilities of a software database management system. The database management system has facilities for database language processing in order to permit (i) the handling of run-time calls for database access from application programs and/or end users, and (ii) the maintenance of data base integrity. As the data in the data file must be described at several levels of abstraction, a different data description language is typically required for each level. As such, prior art database systems require extensive software overhead and have been most useful in processing many records of similar structure (e.g. a set of employee records) in order select the same by various criteria. An exemplary database system of this architecture is disclosed at pages 2–5 of Principles of Data Base and Knowledge-based Systems, by Ullman, et al., published by Computer Science Press (1988). However, prior art database systems have been limited in a wide variety of ways. In particular, in order to enhance security, restrictions on expressibility have been imposed in such prior art data base systems. While most prior art data base systems have extensive query capabilities, these are usually based on a record data structure and simple operations on those records.

Recently, database systems based on object-oriented programming languages, such as C++, have arisen. These programming languages allow the user to store and manipulate arbitrary data structures. By themselves, however, they embody only the language capabilities of the programming languages on which they are based and lack inference capabilities required to provide a cognitive model of even the simplest form of human reason.

Rule-based expert systems designed for a particular domain of knowledge perform forward chaining operations (i.e. deriving conclusions from facts and rules) and use different data structures and procedures to perform backward-chaining operations (i.e. using the rules in order to derive new facts to support a particular conclusion). In addition, expert systems sometimes include a complete programming language. As is well known in the art, the knowledge base includes a set of inference rules, each consisting of precondition-action pairs (i.e. statements of the form If X is True, Then do Y) that may be applied to one or more knowledge bases. The precondition statements identify or refer to a condition of applicability in the knowledge base and the action statement identify actions to be taken on the knowledge base when its associated precondition statement is true.

While expert systems have found great utility in small domains containing a manageable amount of information, they have not been without significant shortcomings and drawbacks. In particular, when the system performs forward-chaining, if the preconditions of several rules are satisfied at the same time, the system chooses one of these rules depending on some "conflict-resolution" criterion. As discussed in "Controlling Forward Rule Instances" by Petrie and M. H. Huhns, at the 8th International Workshop on Expert Systems and their Applications, 1989, pages 383–398, conflict-resolution can and has caused expert systems to behave in ways which are difficult to predict, either causing serious errors or unforseen consequences. Also when performing backward chaining, prior art expert systems force the user to answer questions in a particular order, rendering them difficult to use when the user has only limited knowledge. Thus, prior art expert systems have limitations in many simple applications involving the application of expertise.

In recent years, the development of truth maintenance systems (TMS) has facilitated the cognitive modelling of human reasoning by using auto-epistemic logic, or stable set semantics for logic programs. As described in the article "A Truth Maintenance System" by Jon Doyle, Journal of Artificial Intelligence, Vol. 12, 1979, pages 231–272, truth maintenance systems arose in artificial intelligence as a way to model "non-monotonic" belief systems. A "monotonic" belief system is one in which beliefs are never revised when further facts are learned. Common-sense reasoning does not work this way, however. To use an example from the literature, if a monotonic truth maintenance system learns that; "Tweety is a bird", it will normally conclude that "Tweety can fly". However, in a non-monotonic truth maintenance system this conclusion will be discarded if the system acquires the fact that "Tweety is a penguin". Thus, "Non-monotonic" systems allow the drawing of believed conclusions that may later be retracted.

In general, truth maintenance systems are based on a directed-graph type data structure, comprising a set of nodes, each of which may stand for an arbitrary piece of information. Each node has a field containing one or more justifications. Each justification has a particular form (i.e. conjunction of nodes and conjunction of negations of nodes) that does not allow the direct formulation of exclusive OR's. Notably, nodes in a truth maintenance system have no answer field, so the value of a node is simply the value of its justification (i.e. either BELIEVED or NOT BELIEVED or UNKNOWN). Truth maintenance systems are formalized in the article "A Rational Reconstruction of Non-monotonic Truth Maintenance Systems" by Charles Elkan, published in the Journal of Artificial Intelligence, Vol. 43, 1990, pages 219–234.

Truth maintenance systems have several shortcomings and drawbacks. For example, such systems require a separate inference engine to add justifications to the system based on criteria external to the system itself. The function of the inference engine is to query nodes that represent the existence of contradictions. Thus, truth maintenance systems require strategies to find "Nogoods" which, as described by Elkan are nodes that are false in all acceptable models because their justification has two nodes that represent contradictory facts, e.g. "Tweety can fly" and "Tweety cannot fly". An example of such required strategies is the backtracking algorithm described by Elkan, which tries to discover justifications that remove such contradictions.

Thus, there is a great need in the art for an improved way of representing networks of fact, belief, expectation or the like from arbitrary domains, as well as various modes of reasoning within a computer-based system, so that a user can acquire qualified statements of knowledge, belief or expectation from the system as required or desired, by answering only a few questions, while avoiding the shortcomings, complexity, and drawbacks of prior art systems.

OBJECTS AND SUMMARY OF THE INVENTION

Accordingly, it is a primary object of the present invention to provide a novel dynamic data structure, hereinafter referred to as a "conditional transition network", which can be used in computer-based systems so that any network of fact, belief, or the like expressed in any particular domain, hereinafter referred to as a "cognitive or knowledge network", can be represented using one or more conditional transition networks of the present invention. Thereafter knowledge statements can be simply accessed therefrom as desired or required by a user.

A further object of the present invention is to provide a computer-based system with one or more conditional transition networks in order to represent one or more knowledge networks therein, and to permit efficient acquisition of knowledge therefrom through natural language interaction with the system.

A further object of the present invention is to provide such a computer-based system having both writing and reading modes of operation, wherein during the writing mode of operation a knowledge network can be represented using one or more conditional transition networks, and wherein during the reading mode of operation, knowledge of interest to the reader can be simply acquired and computations can be invoked by answering a minimal number of questions.

A further object of the present invention is to provide such a computer-based system with a process that automatically advises the reader which nodes satisfy predetermined truth conditions following the specification of some answer statements by the reader or writer.

A further object of the present invention is to provide such a computer-based system with a computational process that permits a reader to automatically determine which answers support a conclusion or outcome sought after as a "target".

A further object of the present invention is to provide such a computer-based system with a process that permit a writer or reader to automatically determine whether there are any logical loopholes present in the conditional transition network of the system.

An even further object of the present invention is to provide such a computer-based system with a process that advises the reader as to which nodes might reveal important information.

A further object of the present invention is to provide such a computer-based system with a process that automatically propagates throughout the network, the effect of answering or changing an answer to a question in some node of the network.

An even further object of the present invention is to provide such a computer-based system with a global clock that permits the representation of temporal characteristics present in many application domains.

An even further object of the present invention is to provide such a computer-based system, in which nodes in the conditional transition network have predetermined truth conditions with Extended Boolean logic values (i.e., TRUE, FALSE, POSSIBLE).

An even further object of the present invention is to provide such a computer-based system, in which the state of its conditional transition network is defined by the values of the data elements contained in each of the nodes of the network plus the value of the global clock.

A further object of the present invention is to provide such a computer-based system, in which the user is free to answer any answerable node having a TRUE Precondition Flag in any desired order.

A further object of the present invention is to provide such a computer-based system with a visual display screen having a spreadsheet-style display format.

A further object of the present invention is to provide such a computer-based system with a process that automatically generates a display label for each of the nodes in the conditional transition network, as a function of the value of the answer, the value of the predetermined truth conditions, and the delay remaining field associated with the node at the time of display, as well as the importance and "influence" of other nodes.

An even further object of the present invention is to provide such a computer-based system with a conditional transition network having a constraint node that may be modified by both the reader and the writer in order to allow for database-style query capabilities while allowing for some distinctions that are not present in databases of prior art.

A further object of the present invention is to provide a conditional transition network that can be programmed as an expert system and thereby permit the expert system to perform influential node analysis, loophole analysis and target seeking, while providing the advantage of using a simpler data structure and a simpler conceptual model for knowledge representation, than rule-based expert systems of known art.

A further object of the present invention is to provide such a conditional transition network that can be used in conjunction with conventional databases systems. In such systems, answers, predetermined truth conditions, and information in other fields may refer to external data bases. At the same time, the values of answers and the predetermined truth conditions at the nodes can be automatically propagated through descendent nodes in the network, while permitting such processes as target-seeking, loophole analysis and non-influential query node detection.

A further object of the present invention is to provide a novel computational framework for modelling human reasoning.

These and other objects of the present invention will become apparent hereinafter.

BRIEF DESCRIPTION OF THE DRAWINGS

For a more complete understanding of the objects of the present invention, the Detailed Description of the Illustrative Embodiments set forth below is to be read in conjunction with the accompanying drawings, wherein:

FIG. 2A is a schematic representation of the data fields associated with each node in the conditional transition network of the present invention, indicating which fields are visible and which fields the writer can change;

FIG. 4C is a table listing the questions and answers associated with the question and answer graph of FIG. 4B;

FIG. 20A through 20I and schematic representations of a conditional transition network, illustrating the evolution of a sequence of states undergone by the network during the interactive process of the present invention utilizing the Update Answer/Qualified Answer Routine in the reader mode;

FIGS. 21A through 21H are series of schematic representations of a conditional transition network, arranged to illustrate the evolution of a sequence of states undergone by the network during the interactive process of the present invention utilizing the Advance Global Clock Routine;

FIG. 22A through 22C, are series of schematic representations displaying a conditional transition network, and illustrating the network states which have been induced by the Approximate Loophole Search Routine, during which the system automatically attempts to find a network state in which all important nodes have FALSE Precondition Flags;

FIG. 23A through 23C are a series of schematic representations displaying a conditional transition network, and illustrating the network states which have been induced by the Target State Search Routine during which the system automatically attempts to find a network state in which all target nodes have TRUE Precondition Flags.

DETAILED DESCRIPTION OF THE ILLUSTRATIVE EMBODIMENTS

Figure 1:
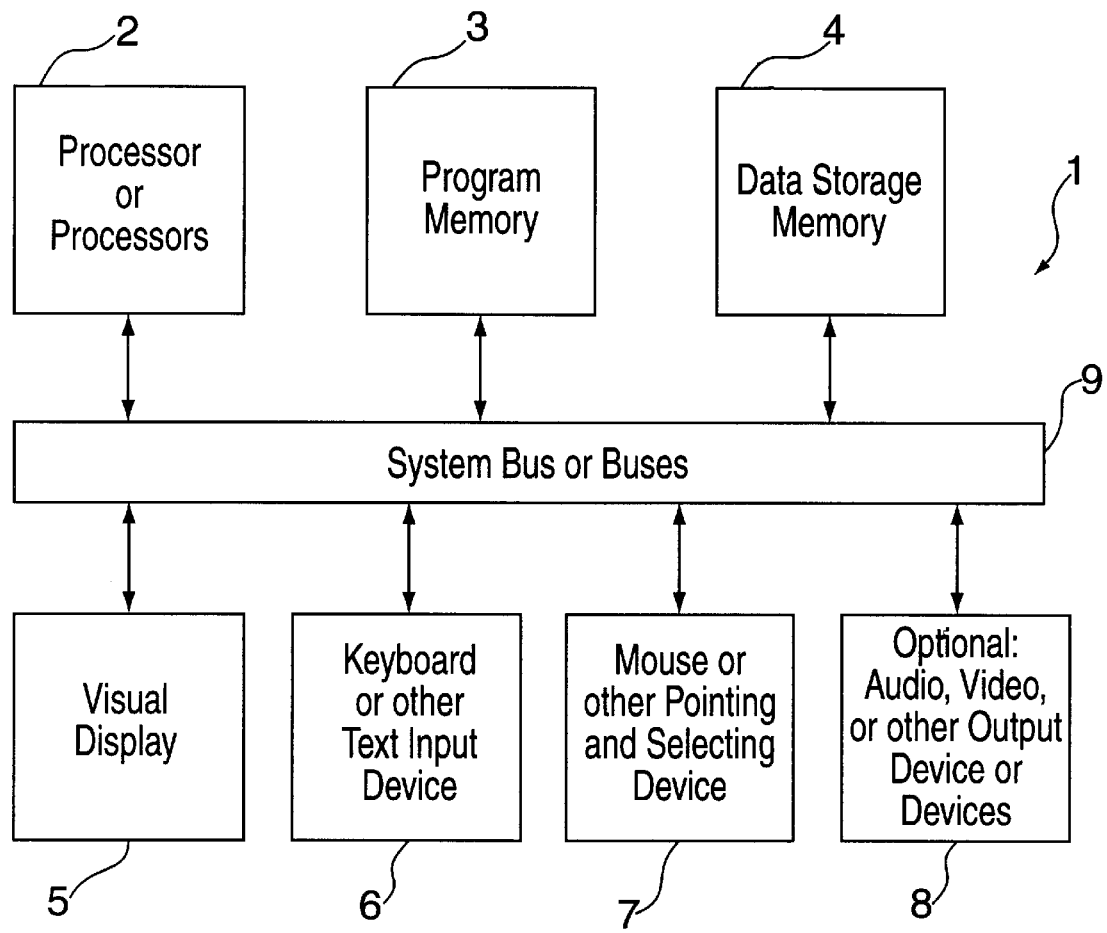
FIG. 1 is a block diagram of an interactive computer-based system which includes one or more conditional transition networks and is capable of performing various computational processes in accordance with the principles of the present invention.

One embodiment of the computer-based system of the present invention is schematically illustrated in FIG. 1. As shown, system 1 comprises a number of conventional components, namely: one or more central processing units (e.g. microprocessors) 2; program memory 3 for storing an operating system program, application programs, and the various computational routines of the present invention; random access data storage memory 4 for storing data files associated with one or more conditional transition networks (CTNS); a visual display unit 5 having a screen or surface; a keyboard or other text input device 6 (optional for some applications); a pointing and selecting device (e.g. mouse-type input device) 7; and optionally, one or more audio and/or video output devices (e.g. audio sound system, video display unit, etc.) 8. As illustrated, each of these system components are operably associated with processor(s) 2 by way of one or more system busses (or wireless communication channels) 9 in a manner well known in the art. In the preferred embodiment of the present invention, the operating system program is Microsoft Windows, UNIX X-Windows, or Apple MacIntosh System 7 in order to allow the processor to support at least two input/output windows, pointing device 7, and multi-media input and output devices 8. As used hereinafter and in the claims the term "computer-based system" shall be understood to include programmable computing devices, dedicated electronic devices, personal digital assistants, personal computers and multi-user computer systems.

Figure 2:
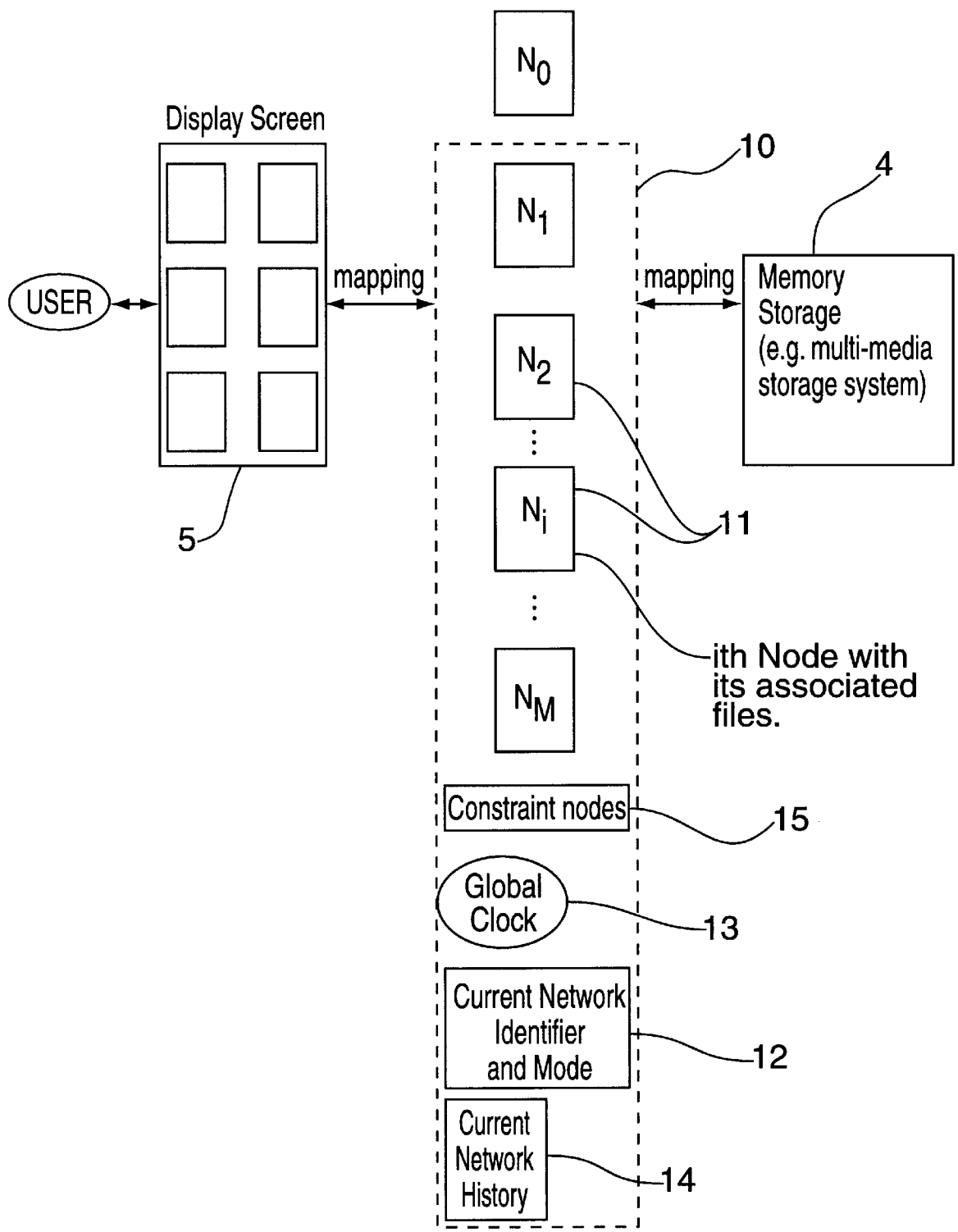
FIG. 2 is a schematic representation of a conditional transition network implemented within the computer-based system of FIG. 1, and the mapping processes which typically occur between the conditional transition network and the visual display screen of the system, and between the conditional transition network and the memory storage device of the system.

In FIG. 2, a conditional transition network of the present invention is schematically illustrated with the display screen of visual display unit 5 and data storage memory 4. The purpose of this illustration is two-fold. On the one hand, FIG. 2 shows that each conditional transition network 10 represents a data or information pattern, any portion of which may be displayed on the visual display screen by way of a display mapping process carried out by processor 2 of FIG. 1. On the other hand, FIG. 2 also shows that the conditional transition network may refer to data within data storage memory 4 by way of an indirect addressing mapping process carried out by the processor.

In general, each conditional transition network 10 is based upon a graph type data (i.e. information) structure comprising a set of nodes 11, some of which may be connected by edges (i.e. links) that extend from one node to another. The edges are not shown in FIG. 2, but are shown for example in FIG. 20A. At a network level of representation, each conditional transition network is assigned a network identifier which is stored in a Network ID Field 12 that is global to the system. More than two conditional transitional networks can be linked together in order to represent a complex network of knowledge (i.e. a cognitive network). Each node in a conditional transition network is also a data structure which can be linked together with other nodes in the same (or different) network in order to form an additional directed graph data structure in accordance with the principles of the present invention. Associated with the network ID of the current conditional transition network is the current mode of operation of the network, i.e. reader mode or writer mode. The operating mode of the system is established by the user when first requesting that the application run. The significance of the mode will be described later, but essentially the writer mode gives the user the ability to modify the conditional transition network freely, whereas the reader mode restricts the user's ability to modify the network.

Each conditional transition network has a "network state" which is a function of the state of all of the nodes in the conditional transition network and the value of the Global Clock 13. As will become apparent hereinafter, when certain conditions in the network are satisfied, the network will undergo a transition from its current state to a new current state which is a function of the state of all the nodes in the conditional transition network. Each unique state in which the network resides, is specified by the data set of the network. During the operation of a conditional transition network, the data set of each network state may be stored in a Network State History Field 14, which allows the user to play back any process previously conducted using any previously constructed conditional transitional network. In order to optimize memory storage, only the user's changes to the network state are stored, rather than the entire network state.

Finally, certain nodes, called Constraint nodes, can be added to the conditional transition network by the reader or writer as an aid to setting the truth values of other nodes.

The conditional transition network of the present invention can be implemented in diverse types of computer-based systems using various programming techniques and a complete programming language such as C, C++, COBOL, LISP, FORTRAN, or any other programming language known in the art. For example, the conditional transition network can be realized using an object-oriented programming language. In object-oriented terminology, each node typically will be viewed as an information structure having various slots, called attributes, for storing information called attribute values or data fields. When such an information structure contains information, it is typically referred to as an "object".

As illustrated in FIG. 2A, each local node in the conditional transition network comprises a number of "data fields" or attributes. In the illustrative embodiment, these data fields are identified as follows: Title Field; Node ID Field; Display Label Field; Precondition Expression Field; Precondition Value Field; Precondition Flag Field; Precondition Parents Field; Precondition Children Field; Question Field; Answer Field; Answer Parents Field; Answer Children Field; Contents Field (with Links and Link Predicates); Delay Field; How Long True Field; Delay Remaining Field; and Qualified Answer Field. The state of each node in the conditional transition network is a function of the value of each of its data fields. As described below, each of these data fields is assigned a specific role (i.e. function) during the performance of the various computational processes of the present invention.

As illustrated in FIG. 2A, each field of a network node contains one or more of the following set of labels {v,r,w,d}. Label v indicates that its associated field is visible to the reader; label r indicates the its associated field can be modified by the reader, whereas label w indicates that its associated field can be modified by the writer. Label d, on the other hand, indicates that its associated field is displayed only for nodes whose Delay Field has a value greater than 0 and has a TRUE Precondition Value.

In general, it is presumed that users of the computer-based system of the present invention will be persons having very little experience in computing. However, the user of the system may also be a programmed processor as well. In either case, the user may perform as a "writer" and/or a "reader" of the conditional transition network, and thus can be viewed as engaging in writing and reading operations, respectively.

Figure 5A:
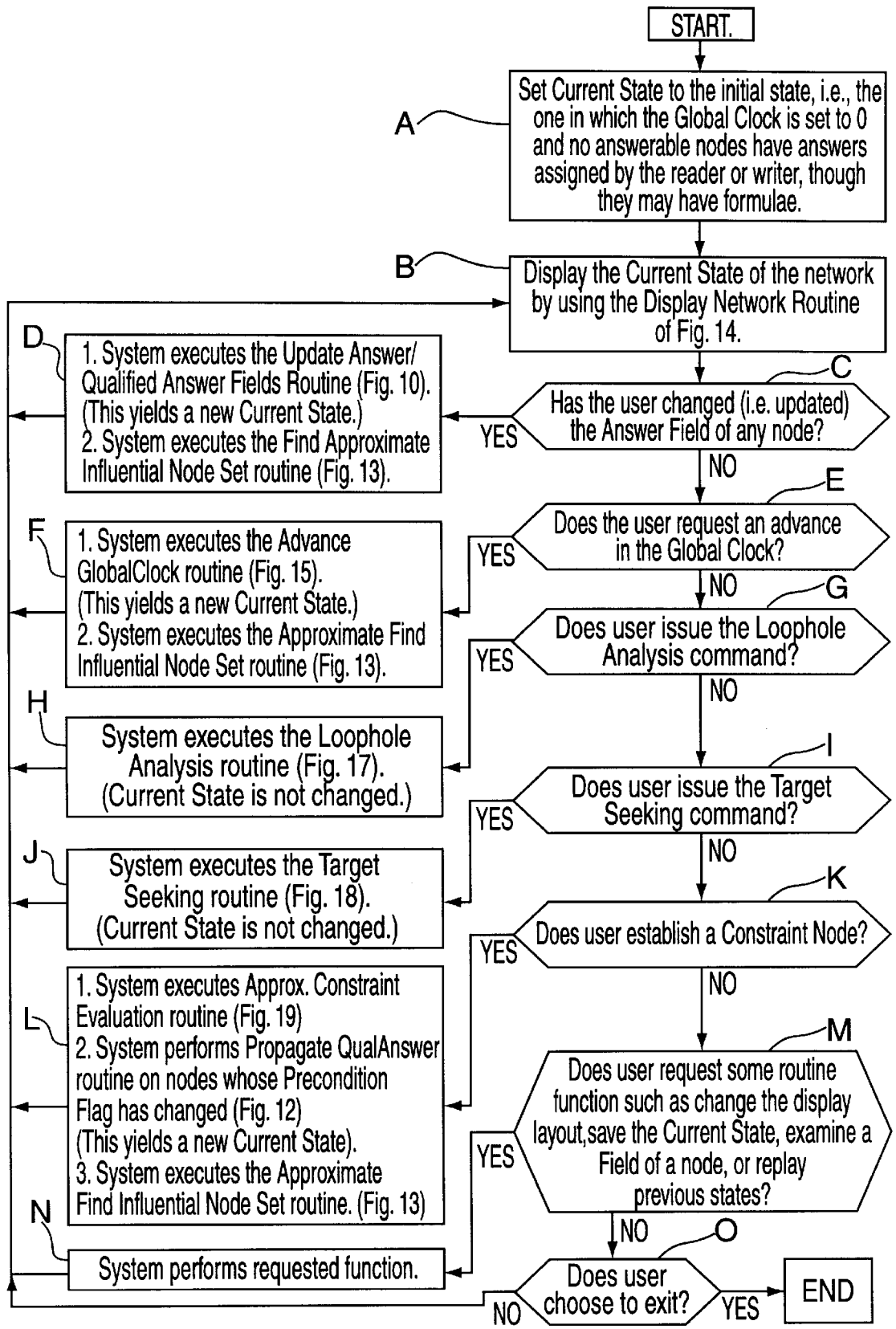
FIG. 5A is a high level flow chart illustrating the steps performed during the reading mode of the interactive process of the present invention.

During the reading mode of operation illustrated in FIG. 5A, the user acquires knowledge from the represented knowledge network, or causes computations to occur. This process may involve not only writing data into certain fields (i.e. labeled r) in selected nodes in the network, but also involves reading data therefrom as well as from other fields. As a reader, the user selects a node in a particular network state using the pointing device 7 shown in FIG. 1.

Figure 5B:
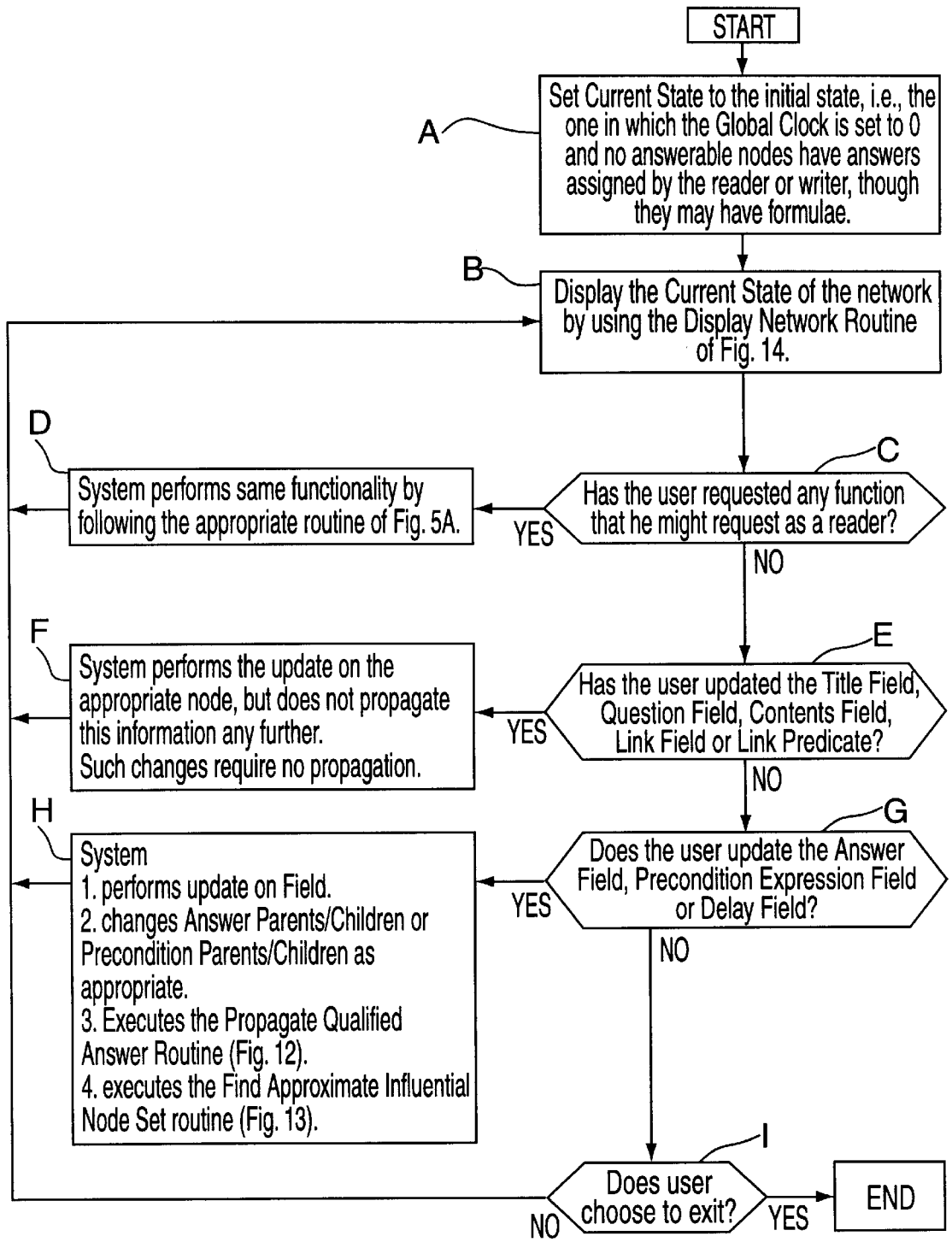
FIG. 5B is a high level flow chart illustrating the steps performed during the writing node of the interactive process of the present invention.

During a writing operation illustrated in FIG. 5B, the user must first represent an acquired knowledge network within a conditional transition network. This process involves writing data into those fields labeled w in FIG. 2A in order to create a conditional transition network. As a writer, the user also selects a node in a particular network state using the pointing device 7 of FIG. 1 known in the art.

Thereafter, the user changes or modifies one of the fields of the selected node, and then the system calculates a new current network state based on the previous network state and the changes made, if any, at the selected node. As a reader, the user is allowed to specify and modify answers for nodes that have questions, advance the Global Clock, and perform Target-Seeking and/or Loophole Analysis, which will be described in greater detail hereinafter and other ancillary functions. The ancillary functions include replaying some or all of the answer decisions the reader has made; "descending" into other conditional transition networks; and moving nodes in the display. The specific details of th se ancillary processes will not be described as they are apparent to those who are skilled in the art once the other computational mechanisms are described.

During the writing mode of operation illustrated in FIG. 5B, the writer may modify any field as well as perform any function that the reader may perform during the reading mode. If desired, the writer may also view all the nodes of current interest through a "window" on the display screen. This mode of operation will be illustrated in greater detail hereinafter with reference to FIG. 5B.

In general, the Title Field contains an alphanumerical identifier which is selected by the writer of the network to remind the reader what question or conclusion (i.e. outcome) each node represents within the conditional transition network. The Node ID Field in each node contains a string identifier for identifying the node efficiently by the system. The identification (ID) string for each node may be any alphabetical, numerical or alphanumerical code, or even cell location within a spreadsheet display format.

However, the node ID string must be unique for each node in a given conditional transition network as it serves as an argument in the internal representations of the Precondition Expression Field, Answer Field or Content Field Links of other nodes. The Display Label Field contains a display label which is derived from the Display Label Field Routine illustrated in FIG. 14A.

As will be described in greater detail hereinafter, the display labels of a node in the illustrative embodiment are as follows: Overview, True, Possible or False; Non-Influential; CanAnswer; and the value of the Qualified Answer Field of a node. The meaning (i.e. interpretation) of these display labels will be explained in greater detail with reference to the Display Label Routine.

Figure 9:
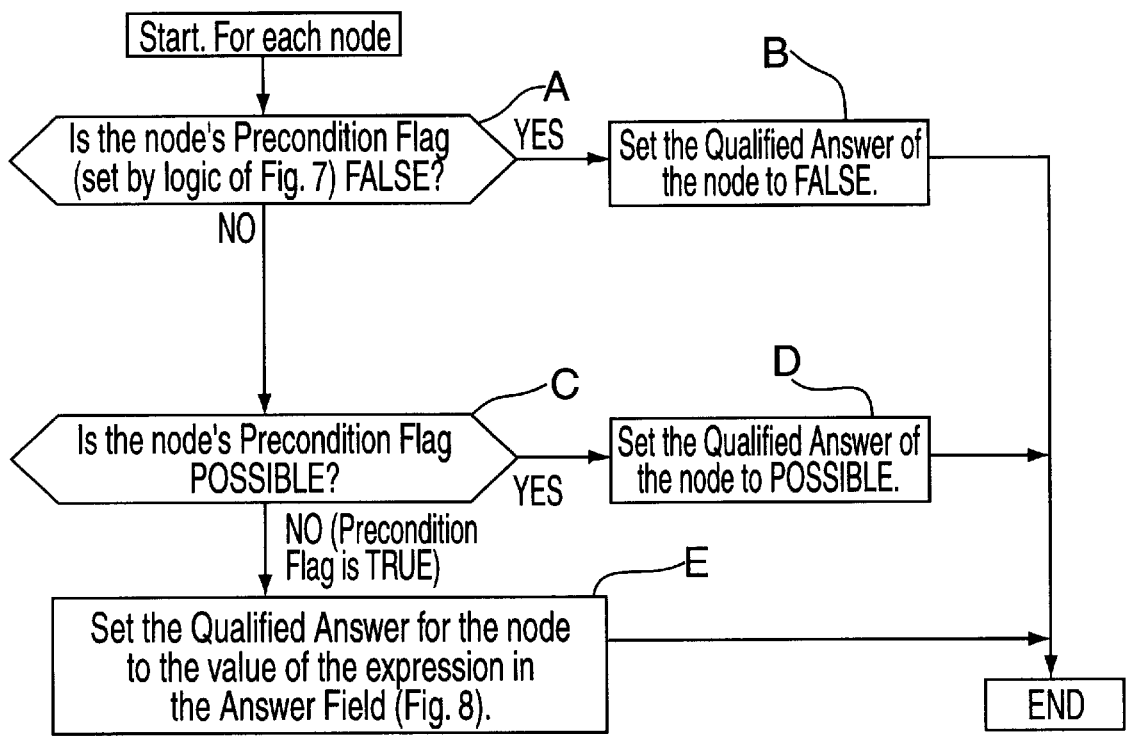
FIG. 9 is flow chart illustrating the steps performed by the system in the Qualified Answer Assignment Routine.

In the illustrative embodiment, the Precondition Expression Field in each node contains predicates (i.e. truth statements) expressed by the writer using a conventional text editing program. In general, these predicates may be expressed in virtually any logical language including propositional logic with arithmetic, predicate calculus of any order with arithmetic, expression languages having sophisticated statistical functions, sets, and sequences including quantification, or expression languages adapted to handle multi-value elements. Each Precondition Expression is evaluated by the Precondition Expression Evaluation Routine shown in FIG. 6 yielding a Precondition Value of either-TRUE, POSSIBLE or FALSE. The arguments in each Precondition Expression comprise a set of node IDs from other nodes in the network. The value of each argument is the Qualified Answer at the respective node as computed using the Qualified Answer Assignment Routine shown in FIG. 9, and then stored in the Qualified Answer Field of the node. The user may specify the node ID's directly or may identify a node using its Title, provided the Title is unique within a given conditional transition network. When a spreadsheet display format is used, the argument in each Precondition Expression may identify a node through its cell position on the spreadsheet display. The function of the Precondition Expression at each node is to represent an expression which, when evaluated, is used as part of the computation of the Precondition Value, Precondition Flag and Qualified Answer of each node.

The Precondition Parents Field of a node X contains the node identifier of each node Y which is an argument of the Precondition Expression of node X. Each such node Y is referred to as a Precondition Parent of node X.

Symmetrically, the Precondition Children Field of each node contains the node identifier of each node Y whose Precondition Expression Field contains the ID of node X as an argument. Each such node Y is referred to as a Precondition Child of node X.

Figure 7:
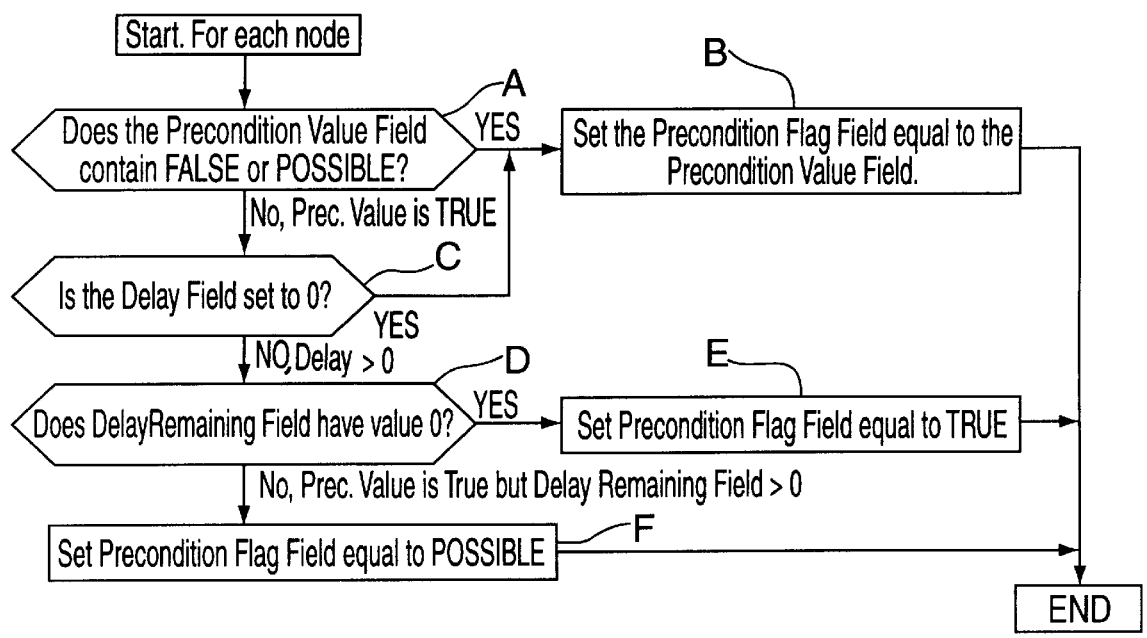
FIG. 7 is a high level flow chart illustrating the steps performed by the Precondition Flag Evaluation Routine.

The Precondition Flag Field of each node X contains an Extended Boolean logic value (i.e. TRUE, FALSE or POSSIBLE) and is computed using the Precondition Flag Evaluation Routine shown in FIG. 7. The Precondition Flag at each node depends on the Precondition Value, the value in the Delay Field, and the value of the Delay Remaining Field.

The Question Field of each node contains a question string (which may be empty) in some natural language such as English. A node having a non-empty question string is said to be an "answerable node". A node whose question string is empty is said to be "unanswerable."

The Answer Field of each node contains an answer string expressed in a mathematical-logical language to be described. If the string contains references to other nodes or has an arithmetic expression containing at least one arithmetic operator (e.g. +, −), it is said to be a "formula" or an "Answer-formula". The Answer Field may be one of three types, namely: Formula-Answer, No-Answer, and User-Answer. If the Question Field is empty (i.e. null) but the Answer Field contains a formula, then the Answer Field is said to be of type Formula-Answer. If the Question Field is empty and the Answer Field does not contain a formula, then the Answer Field is said to be of type No-Answer. If the Question Field is non-empty, then the Answer Field is of type User-Answer whether or not the Answer Field contains a formula. With User-Answer type Answer Fields, the value of the Answer Field may depend at least partly on the user's response to the string in the Question Field.

An Answer Field containing a formula has an initial value determined by the evaluation of that formula. An Answer Field that is empty has an initial value of TRUE if the Question Field is empty, and an initial value of POSSIBLE otherwise.

Each node Y included in the Answer Field of node X is referred to as an Answer Parent of node X and X is the Answer Child of node Y. In general, the Answer Children Field of each node may contain one or more unique node identifiers. Similarly, the Answer Parent Field of each node X may contain several node ID's.

The Qualified Answer Field of each node contains either an Extended Boolean logic value of TRUE, FALSE or POSSIBLE, or the value of the expression in the Answer Field of the node when the value of its Precondition Flag is TRUE. If the Precondition Flag is not TRUE, then the Qualified Answer is equal to the Precondition Flag. These values are assigned to the Qualified I Answer Field of each node by the Qualified Answer Assignment Routine shown in FIG. 9.

The Contents Field of each node may contain directly addressable data, or the address of either text, audio, and/or video data stored in data storage memory 4 of FIG. 1 by conventional indirect addressing techniques well known in the art. The Contents Field may also refer to a procedure that generates either text, audio, and/or video data. The output of the procedure may depend on the values of the qualified answers of nodes in the network. In the illustrative embodiment, the Contents Field is uninterpreted by the program running the conditional transition network. However, the Contents Field of each node may be examined by using a Content Search Query Routine, e.g. a Key Word Search Routine well known in the art, or by a suitable application program (e.g. an AI type program with learning capabilities) running with the program running the conditional transition network. Within the Contents Field of each node, there may be one or more links to the Contents Fields of other nodes in the network. In the illustrative embodiment, each such link may be associated with a predicate expression, called a Link Predicate Expression, which evaluates to an Extended Boolean logic value, i.e. TRUE, POSSIBLE, or FALSE. By associating a Link Predicate Expression at the Contents Field of a node with a link, it is possible for the writer to program a conditional transition network so that the reader can traverse the link to access particular data, only when the associated Link Predicate has the value TRUE.

In general, the Link Predicate Expressions may be expressed in virtually any logical language, including propositional logic with arithmetic, predicate calculus of any order with arithmetic, expression languages having sophisticated statistical functions, sets, and sequences, including quantification, or expression languages adapted to handle multi-value structures. Each Link Predicate Expression has zero or multiple arguments. Like Precondition Expressions, the arguments of each Link Predicate Expression will refer to one or more Node ID's which will be evaluated to their Qualified Answers in a given network state. The Link Predicate Expression will be evaluated by the Precondition Expression Evaluation Routine shown in FIG. 6.

The use of Link Predicate Expressions within the Contents Fields of nodes has many applications in computer-based systems. One example is making the security level in which a reader is interested, a function of the node Answer Field values in the network. In such instances, only those content links with that security level will be visible to the reader based on the use of Link Predicate Expressions of the form: security="secret".

Another example is to use a Link Predicates in the Contents Fields of a conditional transition network in order to produce an improved hypermedia system for maintaining complex machinery. Such an improved hypermedia system can be built to convey information about complex equipment in order to support the maintenance or repair of that equipment. Such an improved hypermedia system has several advantages. One advantage is that it allows the electronic encoding of documentation, which is much more compact than the paper representation. Another advantage is that such an improved hypermedia system allows a node in its conditional transition network to have links to all related nodes. For example, a node representing a subassembly may contain links to nodes in the same mechanical subsystem, to nodes in the same physical area, and so on. This permits a maintenance troubleshooter who begins a diagnosis at some nodes to browse in many directions. With this opportunity arises a problem, namely: that the number of link choices is often so large, it confuses all but the most experienced troubleshooters. Link predicates, however, can be used to reduce the number of link choices at each node to just the relevant ones, by encoding the values of diagnostic measurements made, previous choices made, and other information. For example, if tests have revealed low pressure values in a hydraulic subsystem, then a link from one hydraulic subassembly in that subsystem to another such subassembly should have its link predicate evaluate to TRUE, whereas a link from a hydraulic subassembly to the physically close on-board video subsystem should have its link predicate evaluate to FALSE. A FALSE link predicate renders that link choice invisible to the reader, thus making the troubleshooter's job easier. If new tests are performed concurrently with the troubleshooter's exploration, then other link predicates may change their values among TRUE, FALSE, and POSSIBLE.

The Delay Field of each node contains a non-negative integer, (e.g. 0, 1, 2, 3, . . . ) which intuitively represents the time required to complete a particular task. In the conditional transition network of the present invention, the Current Time is the value of the single Global Clock Field 13 shown in FIG. 2. In essence, the Global Clock Field is a counter which starts at time zero and is advanced by the reader at will using an input device, such as a mouse. Technically, the non-negative integer in the Delay Field represents the number of consecutive Global Clock ticks during which the value in the Precondition Value Field of a node must be TRUE before the value in the Precondition Flag Field of the node becomes TRUE. The How Long True Field contains the number of consecutive Global Clock ticks that have been counted during which the Precondition Valve has been TRUE. The value in Delay Remaining Field is always equal to the value in the Delay Field less the value in the How Long True Field. The relationship among these various field is managed by the Advance Global Clock Routine shown in FIG. 15.

Figure 13:
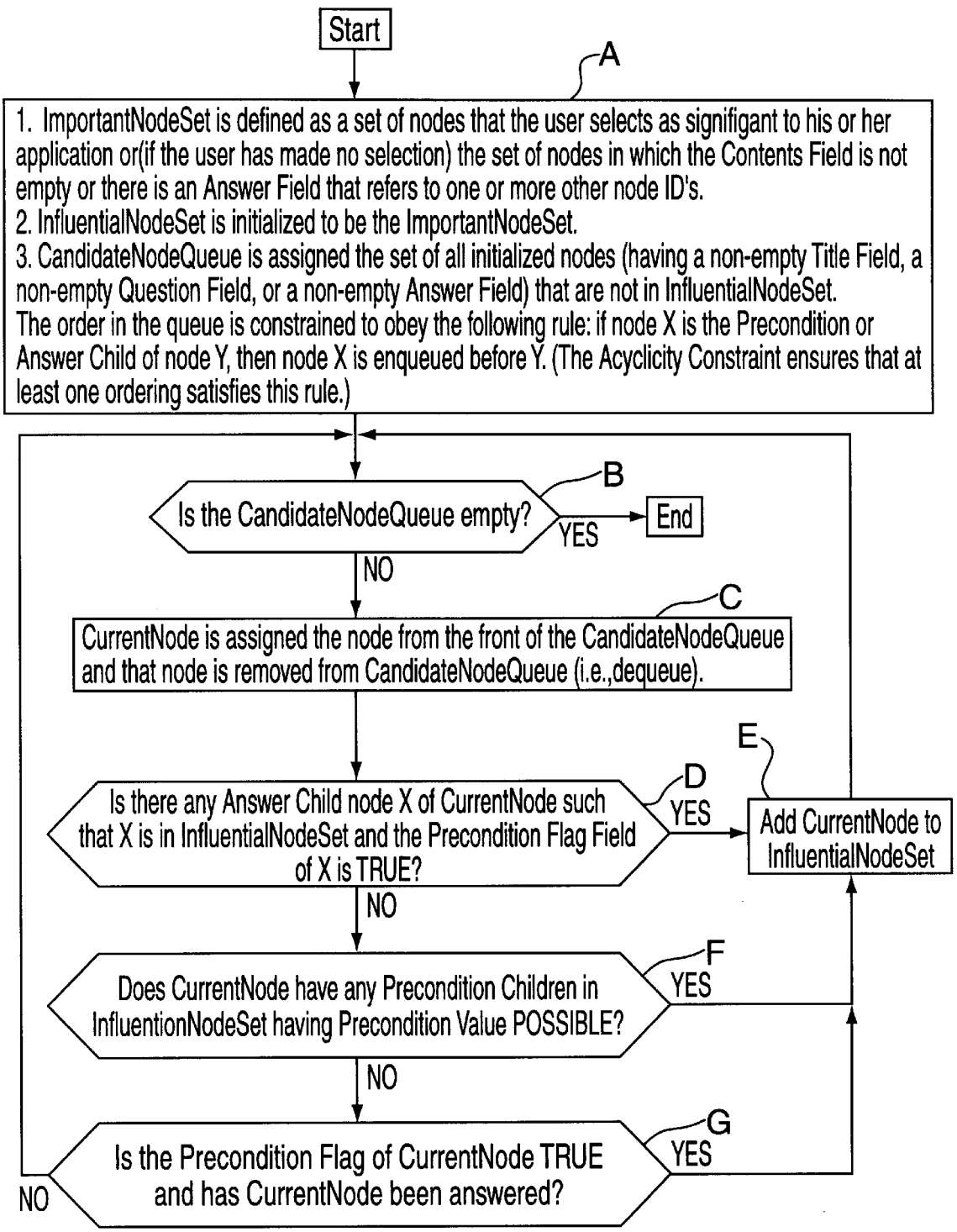
FIG. 13 is a high level flow chart illustrating the steps performed by the Approximate Find Influential Node Set Routine.
Figure 14:
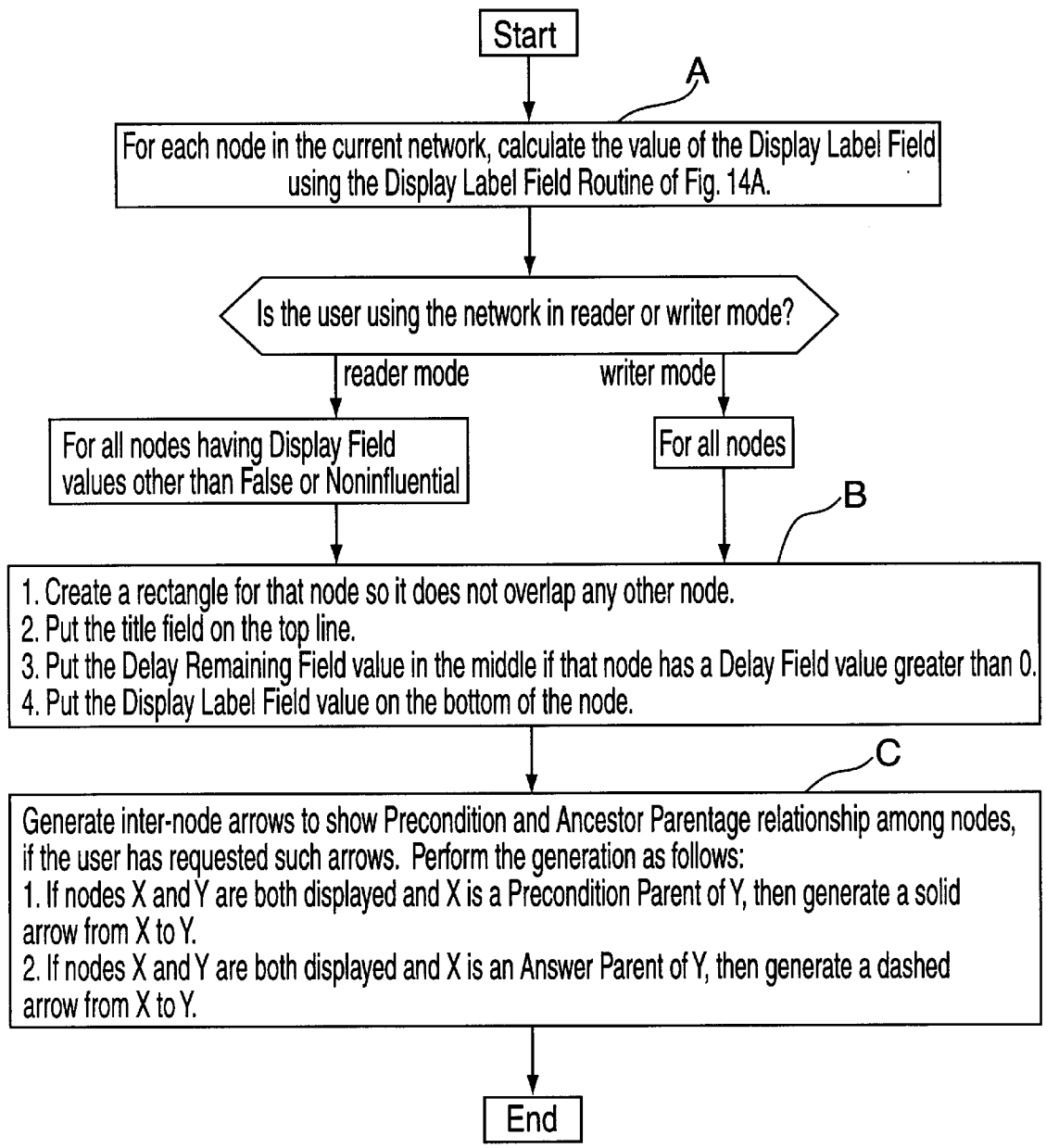
FIG. 14 is a high level flow chart illustrating the steps performed by the Display Network Routine.
Figure 14A:
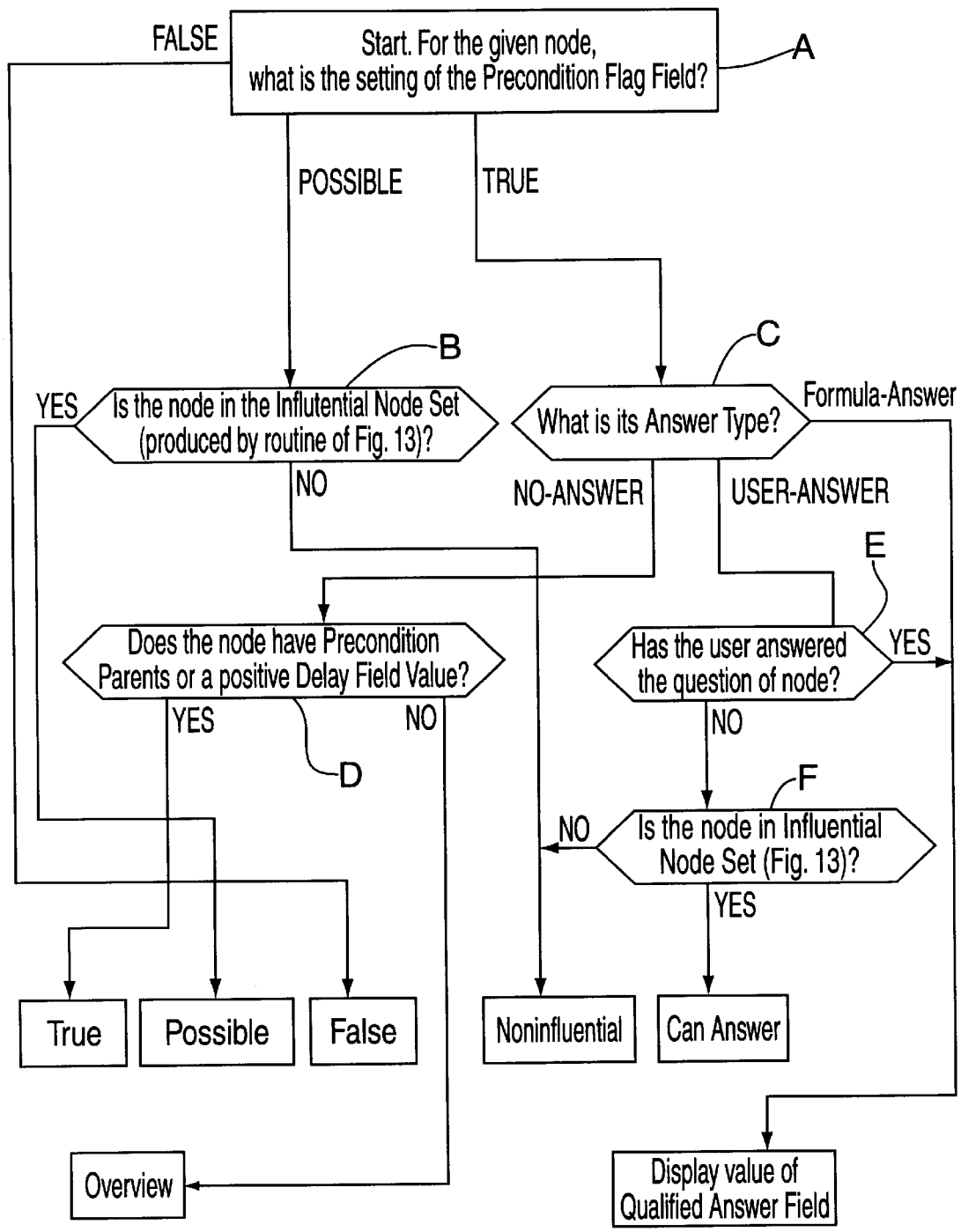
FIG. 14A is a high level flow chart illustrating the steps performed by the Display Label Field Routine.

In order to ensure that the Find Influential Node Set Routine operates correctly in the Routine of FIGS. 14 and 14A, the Acyclicity Constraint is imposed on the creation of each conditional transition network of the illustrative embodiment. In order to define the Acyclity Constraint, it is necessary to define several subordinate definitions. In particular, the Precondition Ancestors of a node X are defined as the Precondition Parents of X, the Precondition Parents of the Precondition Parents of node X and so on. Formally, the Precondition Ancestors of node X are the irreflexive transitive closure of the Precondition Parents of node X. The Answer Ancestors are defined analogously with respect to Answer Parents. Also Precondition Descendants and Answer Descendants are defined symmetrically. Node X is equal to the Ancestor of node Y if node X is the Precondition Ancestor of node Y, the Answer Ancestor of node Y or any combination thereof. In essence, the Acyclicity Constraint states that no node is its own Ancestor. Symmetrically, no node is its own Descendant. This constraint implies the absence of cycles in the conditional transition network of the illustrative embodiment. Notably, many of the processes of the illustrative embodiment, e.g. those of FIGS. 12, 13, and 14, depend on this constraint to work correctly.

The conditional transition network of the present invention can be used to represent a network of knowledge (i.e. cognitive network) acquired on any particular subject, in any particular domain. Once the acquired knowledge network has been represented in the conditional transition network, knowledge statements can be acquired from the conditional transition network by answering one or more questions represented by the nodes of the conditional transition network. The subject matter of the knowledge network may relate to an interrelated set of facts on a scientific, engineering, economic, social, political, or other topic; a domain of belief or ideology; or the like. In general, the source of any particular network of knowledge will vary from application to application. Several possible sources of knowledge networks will be considered below.

In some applications, the network of knowledge to be represented may be acquired from a preconstructed knowledge-base used in a conventional expert system. In such instances, the knowledge network will be initially represented as a set of inference rules (i.e. If X, Then Y statements) which may or may not be listed in any particular order. The writer may directly represent this system of knowledge in a conditional transition network of the present invention in many cases. To do this, each rule becomes a node whose antecedent (X in the statement if X then Y) becomes the Precondition Expression of the node and the consequent (Y in the statement if X then Y) becomes the Answer Field. Alternatively, the writer may represent the knowledge network within an "intermediate" data structure, such as a directed acyclic graph, and thereafter map the data contained in the acyclic graph into one or more conditional transition networks.

In other applications, the knowledge network to be represented may come directly from one or more individuals who have acquired some level of expertise in a particular subject or problem area. In this case, the knowledge network will be originally represented within the mind of the writer or writers. If desired, the writer may directly represent the knowledge network within a conditional transition network of the present invention. Alternatively, the writer may first represent the knowledge network within an intermediate data structure, such as a directed acyclic graph, and thereafter map the data contained therein into a condition transition network.

In yet other applications, the knowledge network to be represented may be derived from a preconstructed knowledge structure, such as a book, journal article, video tape, movie, sound recording, or multi-media work. In such instances, the writer may desire to construct a knowledge network from such knowledge structures in order that a reader can quickly access only selected portions of the work which relate to the reader's level of interest in a particular subject area, or her goal in reviewing a particular work. As will become apparent hereinafter, the knowledge network in such applications may take on the form of a set of related questions and answer statements which lead to one or more particular conclusions, or outcomes, that will provide the reader with the sought-after information. These questions, answers and conclusions are representable by particular nodes in the conditional transition network of the present invention. The sought-after information or the indirect address thereof can be stored in the Contents Field of nodes representing conclusions in the knowledge network.

Figure 4A:
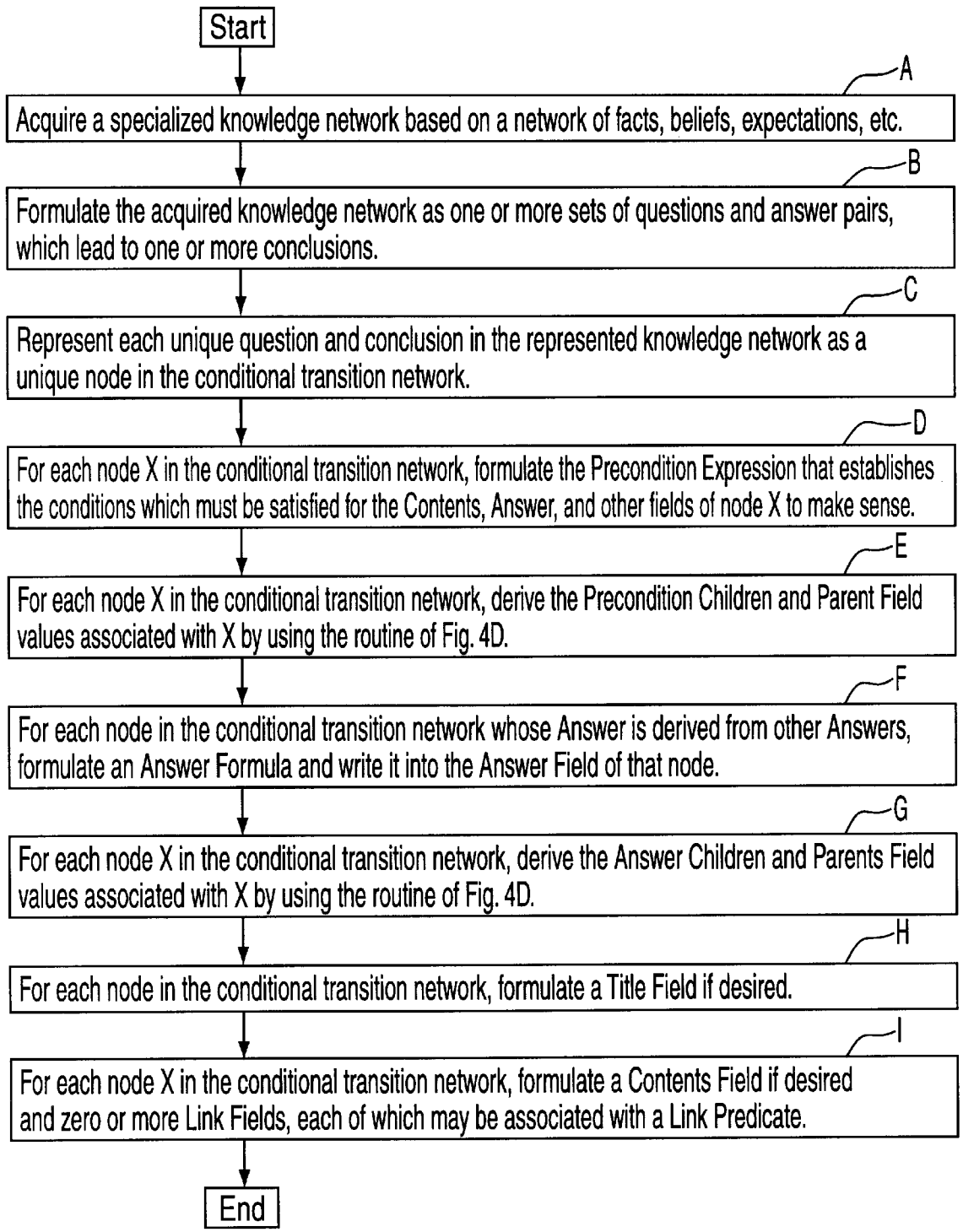
FIG. 4A show a high level flow chart illustrating steps in a generalized method for representing a knowledge network as one or more conditional transition networks.

The flow chart of FIG. 4A schematically illustrates the step of a generalized method which can be used to represent a knowledge network within a conditional transition network of the present invention.

As indicated at Block A in FIG. 4A, the first basic step of the method involves acquiring a specified knowledge network from a particular domain. As discussed above, the knowledge network may be obtained from a preconstructed knowledge base in a conventional expert system, from the experience of a particular individual or individuals, or some other available knowledge source. Exemplary techniques for acquiring a knowledge network on a particular topic or problem in a particular domain are presented in the book *AI and Expert Systems: A Comprehensive Guide. C Lanauage* (2nd Edition) by Robert I. Levine, et al., McGraw-Hill, Inc.

As indicated at Block B in FIG. 4A, the next step of the method involves formulating the knowledge network into one or more sets of question and answer pairs. Each question and answer pair is capable of being logically ordered with other question and answer pairs into a question and answer chain which, alone or in combination with other question and answer chains, leads to a particular conclusion or outcome of interest to the reader. The question and answer chains that underline the acquired knowledge network can be formulated as follows.

First identify the conclusions (or possible outcomes) represented within the acquired knowledge network. For each conclusion, identify the questions and answers and logical combinations thereupon that will establish the conclusion. Then, collect all questions that belong to the chain or chains of questions and answers that lead to a particular conclusion. These steps will be further described below with reference to the illustrative example of FIG. 4C.

Figure 4B:
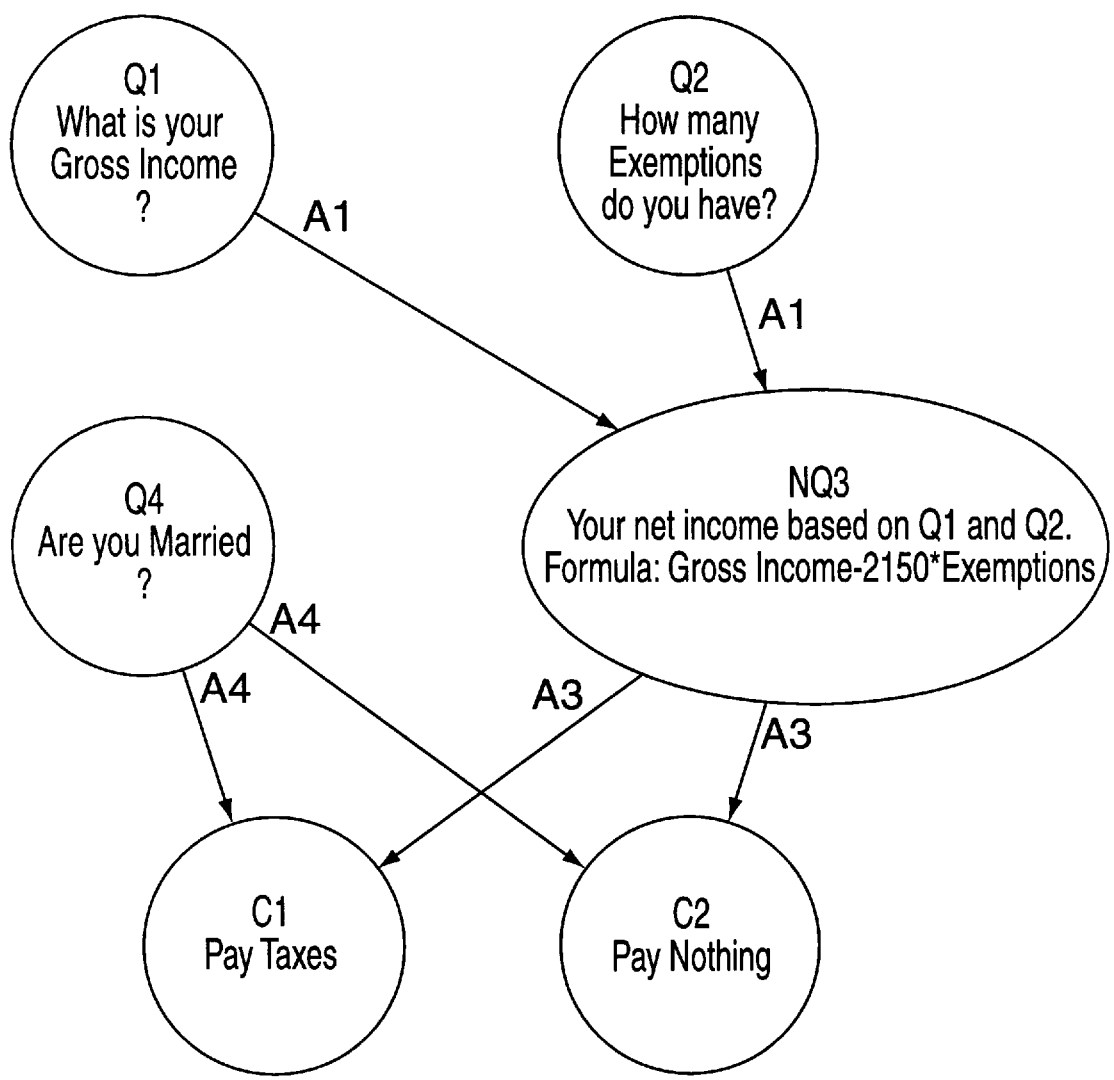
FIG. 4B is a schematic representation of a directed acyclic question and answer graph employed to represent an exemplary knowledge network prior to mapping the knowledge network into a conditional transition network of the present invention.

During Block B of the method, the writer will find the use of a directed acyclic graph helpful in formatting the acquired knowledge network into one or more question and answer chains. In FIG. 4B, an exemplary knowledge network is represented using a directed acyclic graph. As shown, each circular node in the graph represents a question $Q_i$ or computation $NQ_i$ without a question in the knowledge network. Each edge (i.e. line between nodes) in the graph represents an answer $A_i$ leading or directing to a logically linked or related question $Q_1$. Each conclusion or outcome $C_i$ in the knowledge network has edges entering it and may or may not have edges leaving it. In the exemplary knowledge structure of FIG. 4B, there are four questions, identified by Q1, Q2, NQ3 and Q4 at their assigned nodes in the graph, and two conclusions identified by C1 and C2 at their assigned nodes in the graph. As discussed above, there are several types of answers that might properly respond to a given question, namely: a User Answer which include responses such as "yes", "no", "$1,000", etc.: and a Formula-Answer, which is computed at a node using a formula expressed stored in the Answer Field of such nodes. For purposes of illustration only, question Q1, Q2, and Q4 have been designed to accept User-Answers from the intended reader. As such, the answer for Question Q1 is indicated by $A_1$, the answer for Question Q2 is indicated by $A_2$ and the answer for Question Q4 is indicated by $A_4$. Question NQ3, however, has been designed to accept a Formula-Answer from its node, and its answer is indicated by $A_3$. Having constructed an intermediate data structure (e.g. a directed acyclic graph) to the acquired knowledge network, it is easy to identify and specify the interrelationship among the questions represented on the graph. Using the graph, the linked chain of question and answer pairs that leads to a particular conclusion is readily identifiable.

As indicated at Block C in FIG. 4A, the next step of the method involves representing each unique question Q and conclusion C in the represented knowledge network, as a different node in a conditional transition network. This step is achieved by first writing the question string, for each question $Q_1$, into the Question Expression Field of a different node in the conditional transition network. For the exemplary knowledge network of FIG. 4B, the question string of each question $Q_1$, $Q_2$ and $Q_4$ is written into the Question Field of a different node. Hereinafter, such nodes shall be called query nodes. For each conclusion $C_i$, the question is empty, unless the conclusion includes a query in preparation for another conclusion. Hereinafter, such nodes $C_i$ shall be called conclusion nodes. For the exemplary knowledge network, a null-question is written into the Question Field of the nodes $C_1$ and $C_2$ in the conditional transitional network. Similarly, an empty string is written into the Question Field of NQ nodes. The Titles, Questions, Preconditions, Answers and Conclusions of the exemplary knowledge system are set forth in FIG. 4C.

As indicated at Block D in FIG. 4A, the next step of the method involves formulating, for each node in the conditional transition network, the Precondition Expression which establishes the truth conditions at each node which must be satisfied for the fields at the node to apply in the given situation. For example, the Precondition Expressions to be formulated at the query nodes representing questions $Q_1$, $Q_2$ and $Q_4$ will be represented by the empty string, as the Qualified Answers of no other node in the conditional transition network determines the truth condition of answers given at these query nodes. Hence, these query nodes have no Precondition Parents. On the other hand, the Precondition Expression to be formulated at the query node representing question $NQ_3$ will be represented by a predicate expression Exemptions >=0 having as its arguments, the node ID of $Q_2$. In a similar fashion, the Precondition Expression to be formulated at the node representing conclusion $C_1$ will have as its arguments the node ID's of $NQ_3$ and $Q_4$, as shown in FIG. 4C. In each case, the Precondition Expression plays the same role. Unless it is TRUE, the Answer Fields, Contents Fields and other fields do not apply in the given situation. For example, unless the Number of Exemptions is known, the Net Income cannot be properly calculated. Similarly, unless the Precondition for Pay Taxes is TRUE, there is no point in consulting an Accountant.

As indicated at Block E in FIG. 4A, the next step of the method involves formulating, for those nodes having answers that are computed, an Answer Formula and storing it in the Answer Field.

In general, formulating the Precondition Expression at each node X in the conditional transition network requires determining on which node or nodes Y, does the applicability of node X depend. Similarly, formulating a Link-Predicate Expression for a selected link from node X to node Y, requires determining on which node or nodes Z, does the traversal of the link from node X to node Y depend. In a similar manner, formulating a Formula-Answer Expression for a selected node Y in the conditional transition network, requires determining on which node or nodes X does the computed answer of node Y depend.

Figure 4D:
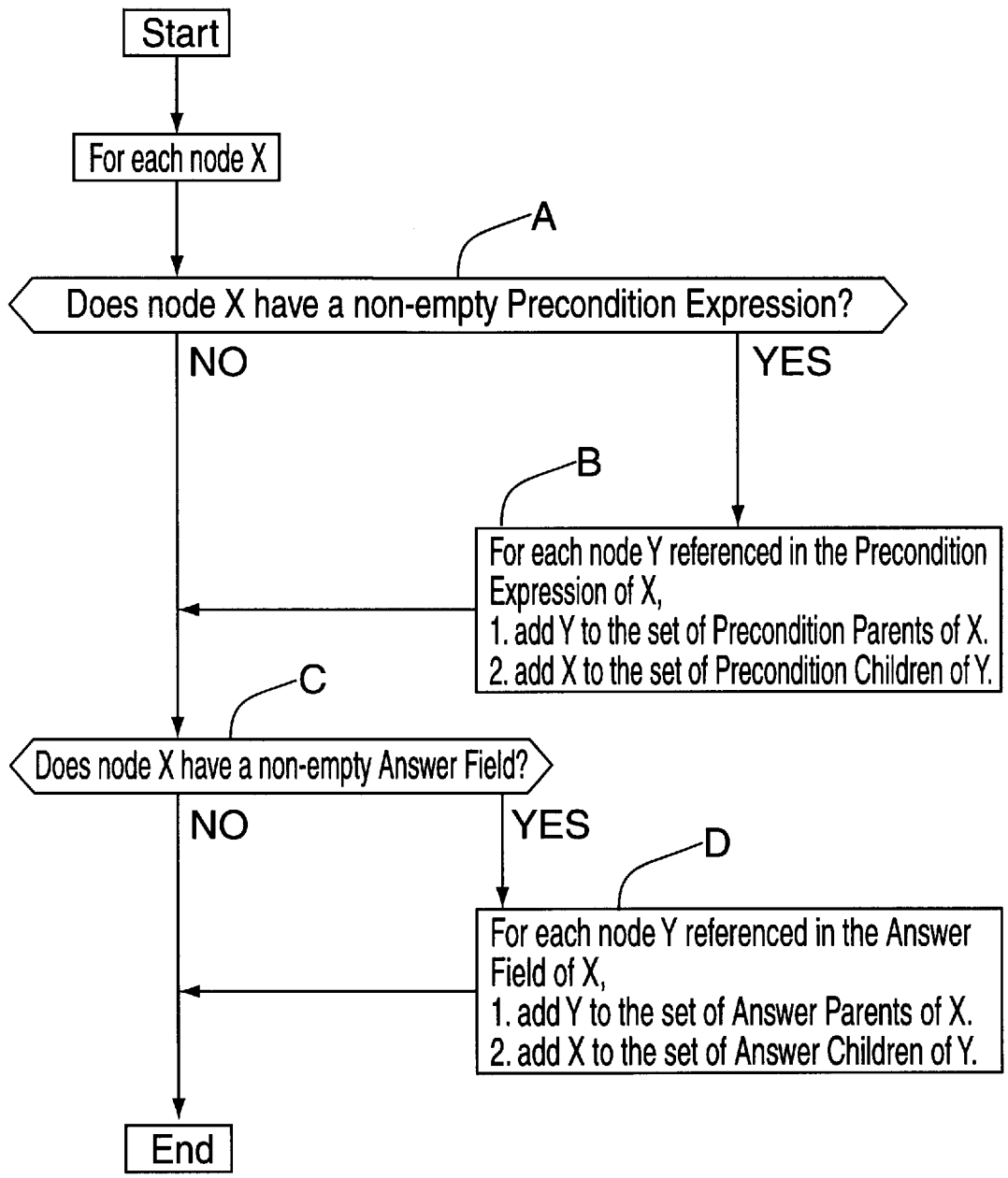
FIG. 4D is a high level flow chart illustrating the steps performed by the Infer Precondition/Answer Parent and Children Nodes Routine.

As indicated at Block F in FIG. 4A, the next step of the method involves writing into the Precondition Parent Field and Precondition Children Field of each node X, the node identifier of each Precondition Parent and Child of node X. In the illustrative embodiment, the Precondition Parents and Children of each node X are determined by the Infer/Parent and Children Nodes Routine shown in FIG. 4D. At Block A of this Routine, the processor determines whether node X has an empty Precondition Expression Field, and if so, proceeds directly to Block C of the Routine. If not, however, the processor infers the Precondition Parents of node X to be the node identifiers contained in the Precondition Expression Field of node X. Specifically, for each node Y referenced in the Precondition Expression of node X, the processor at Block B (i) writes the node Y identifier into the Precondition Parent Field of node X, and (ii) writes the node X identifier into the Precondition Children Field of node Y. Thus, in the exemplary knowledge network, the query node representing question $NQ_3$ in the conditional transition network will contain in its Precondition Parent Field, the node identifier of the query node representing question $Q_2$. However, the query nodes representing questions $Q_1$ and $Q_2$ in the conditional transition network will not contain any node identifiers in their Precondition Parents Field, since no Answers (and thus no Qualified Answers) from questions represented by other nodes determine whether questions $Q_1$ and $Q_2$ make sense.

As indicated at Block G in FIG. 4A, the next step of the method involves writing into the Answer Parent Field and Answer Children Field of each node X, the node identifier of each Answer Parent and Answer Child of node X. In the illustrative embodiment, the Answer Parents and Children of each node X are inferred by Blocks C and D of the Infer Parent and Children Nodes Routine of FIG. 4D. At Block C of this Routine, the processor determines whether the Answer Expression Field at node X contains an Answer-Formula. If no Answer-Formula is contained in node X, the processor exits the routine. However, if an Answer-Formula is contained at node X, then the processor infers the Answer Parents and Answer Children thereof by processing the node identifiers contained in the Answer Expression. Specifically, for each node Y referenced in the Answer Field of node X, the processor at Block C (i) writes the node Y identifier in the Answer Parents Field of node X and (ii) writes the node X identifier in the Answer Children Field of node Y. In the example of FIG. 4B, node $NQ_3$ in the conditional transition network will contain in its Answer Parent Field the node identifiers of the query nodes representing questions $Q_1$ and $Q_2$.

As indicated at Block H of FIG. 4A, the next step of the method involves formulating a Title Field of each query node in the conditional transition network in order to suggest to the reader which question the query node represents. Thereafter, the Title Field of each conclusion node is formulated so as to remind or clue the reader as to which conclusion the node represents.

As indicated at Block I of FIG. 4A, the final step of the method involves formulating the Contents Field, and zero or more Link Fields each of which may have a Link Predicate Expression. Analogous to Precondition Expressions, the Link Predicate Expression may contain predicate expressions having arguments which refer to the value of Qualified Answers of other nodes in the conditional transition network.

FIG. 5A illustrates the basic steps involved in an interactive process which the reader may conduct using the programmed computer-based system of the present invention in its reader mode of operation. This interactive process presumes that the conditional transition network has already been built (i.e. set up) by the writer by specifying question strings for query nodes, Precondition Expressions for query and conclusion nodes, Answer-Formula, Contents, Link Predicates, Delays and so on, as hereinbefore described with reference to FIG. 4.

Figure 20A:
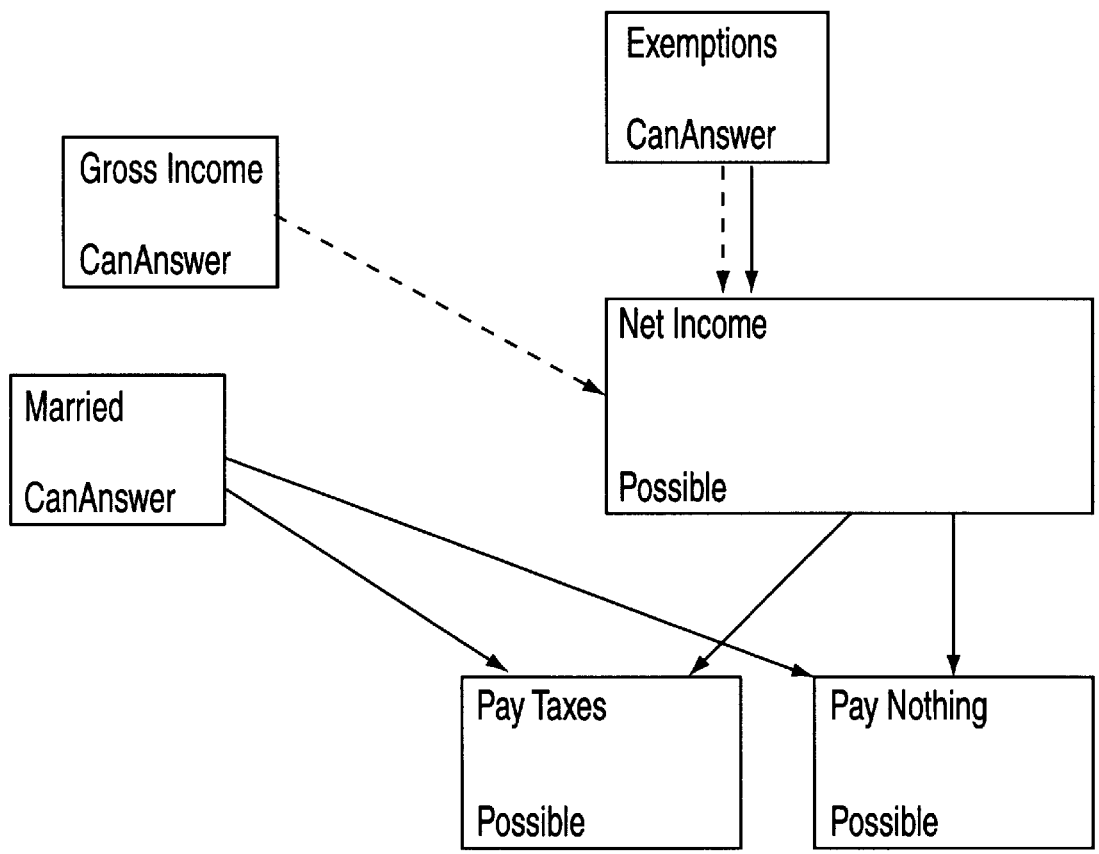

As indicated at Block A in FIG. 5A, the process begins by the programmed system (i.e. processor) setting the current state of the network to an "initial state". By definition, an initial state is defined as a state in which (i) the Global Clock is set to zero; (ii) each Answer Field contains the value of its formula if it has one, the value TRUE if the Question Field is empty, and the value POSSIBLE otherwise; and (iii) the Precondition Values of nodes having empty Precondition Expressions are TRUE, but no Precondition Flags are TRUE if they are associated with nodes having positive Delay Values. At Block B of the process, the system displays the current state of the conditional transition network by executing the Display Network Routine shown in FIG. 14. This results in a visual display of selected fields of certain nodes in the conditional transition network. Exemplary display formats for the conditional transition network are shown in FIGS. 20A and 20B, in particular. It is understood, however, that a wide variety of suitable network and node display formats may be used without departing from the principles of the present invention.

Figure 10:
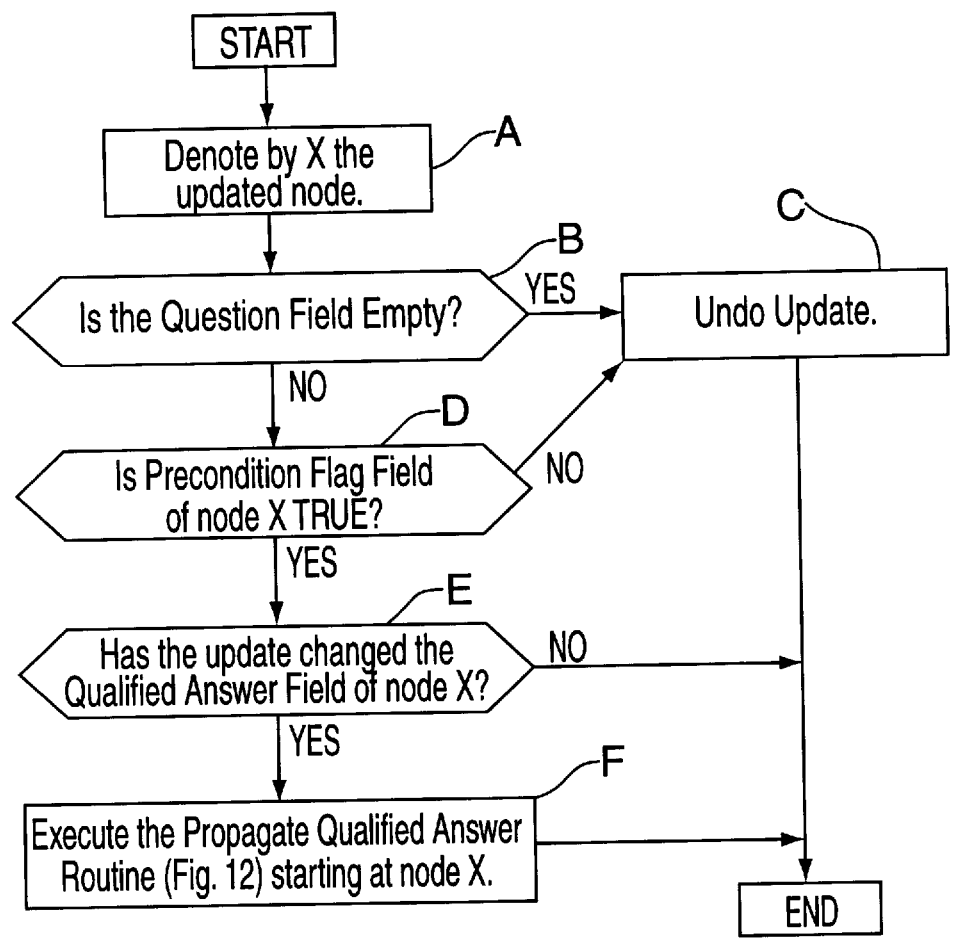
FIG. 10 is a high level flow chart illustrating the steps performed by the Update Answer/Qualified Answer Routine.

As indicated at Block C in FIG. 5A, the programmed system determines whether the reader has changed (e.g. updated) the Answer Field of some activated node in the conditional transition network. As will be described hereinafter, this change will be accepted by the system in the preferred embodiment only if the Precondition Flag of the changed node is TRUE and the Question Field is non-empty, as illustrated in FIG. 10. This event may occur each time the user, acting as the reader, calls upon a displayed node, displays the question string in its Question Field, and then writes an answer into the Answer-Field. Typically, the reader will perform this interactive procedure whenever answering questions at query nodes in order to reach a particular conclusion or outcome within the system of knowledge represented by the programmed conditional transition network.

After the above change is performed, the system calls and executes the Update Answer/Qualified Answer Fields Routine shown in FIG. 10. This procedure results in a new current network state. Thereafter, the system calls and executes the Find Approximate Influential Node Set Routine shown in FIG. 13. This later routine prepares the conditional transition network for an updated display procedure, performed at Block B of FIG. 5A, as shown. The type process performed by the computer-based system at Blocks B, C, D, B is often referred to as "forward chaining", as the reader provides answers to questions and from the answers provided, the system propagates the effect of the answers and qualified answers on other query and conclusion nodes in the conditional transition network.

If at Block C in FIG. 5A, the user does not change an Answer Field, then at Block E the system determines whether the user has requested to advance the Global Clock, e.g. has selected an Advance Global Clock Request from a control menu. If such a request has been made, the system then proceeds to Block F where it calls and executes the Advance Global Clock Routine shown in FIG. 15 in order to compute a new current network state. The Global Clock Routine propagates the effect of any change in Qualified Answers at any node throughout the network. Such a change would be caused by a change in the Precondition Flag value at a node as a result of the advance in the Global Clock. As indicated at Block F, the system thereafter calls and executes the Approximate Find Influential Node Set Routine shown in FIG. 13, in order to subsequently display the new current state of the conditional transition network of Block B.

Figure 17:
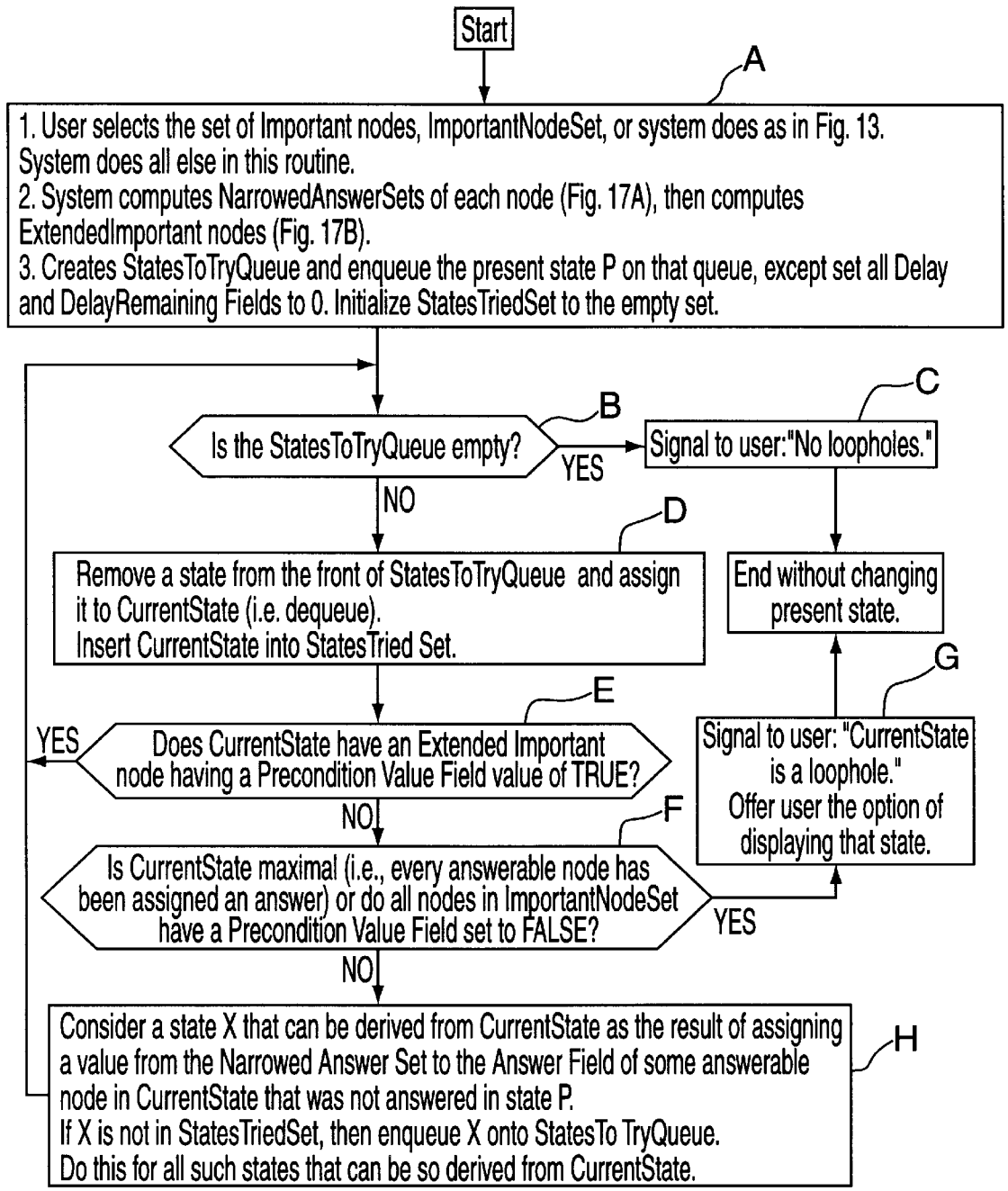
FIG. 17 is a high level flow chart illustrating the steps performed by the Approximate Loophole Search Routine.
Figure 17A:
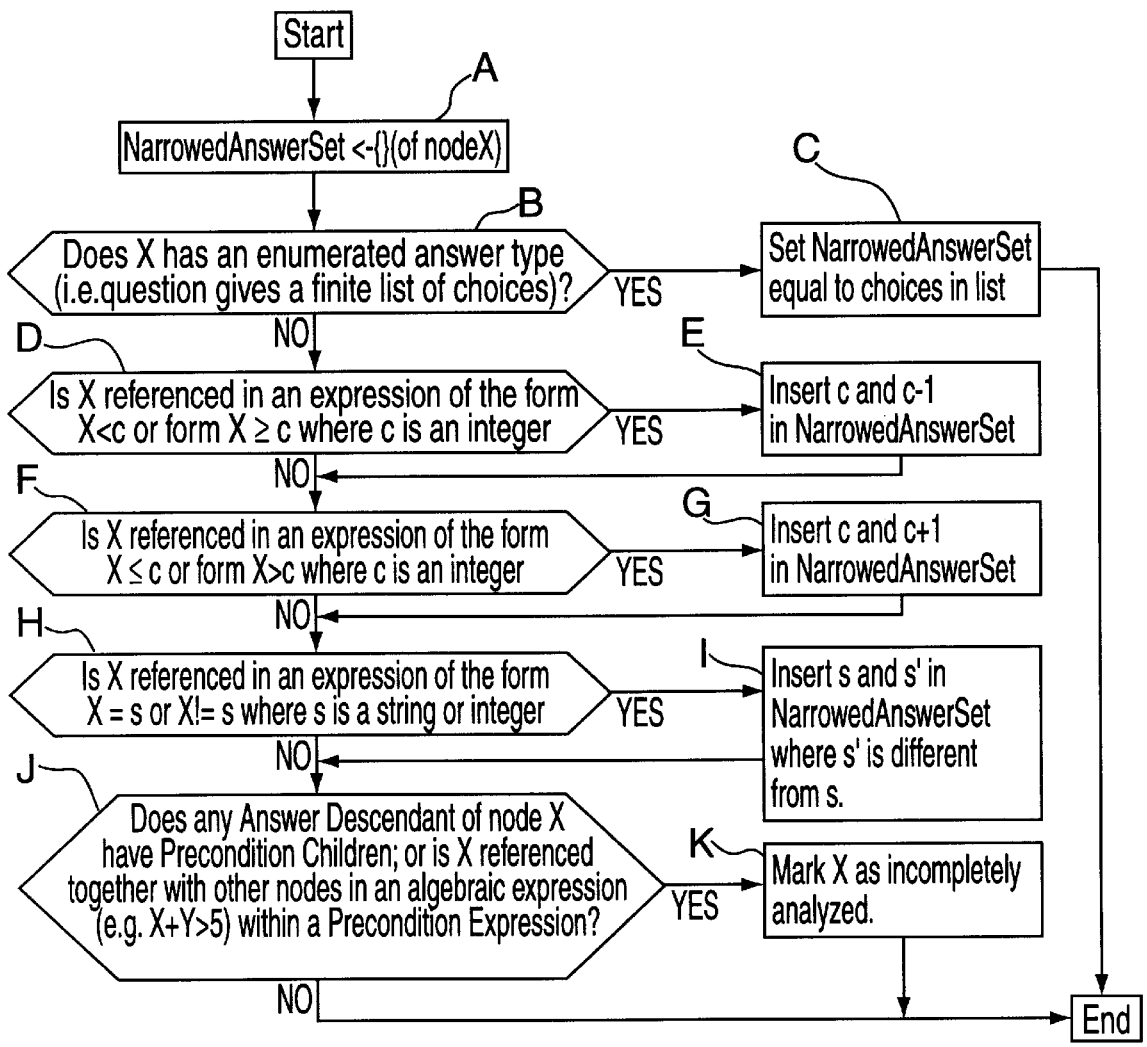
FIG. 17A is a high level flow chart illustrating the steps performed by the compute Narrowed Answer Set Routine.
Figure 17B:
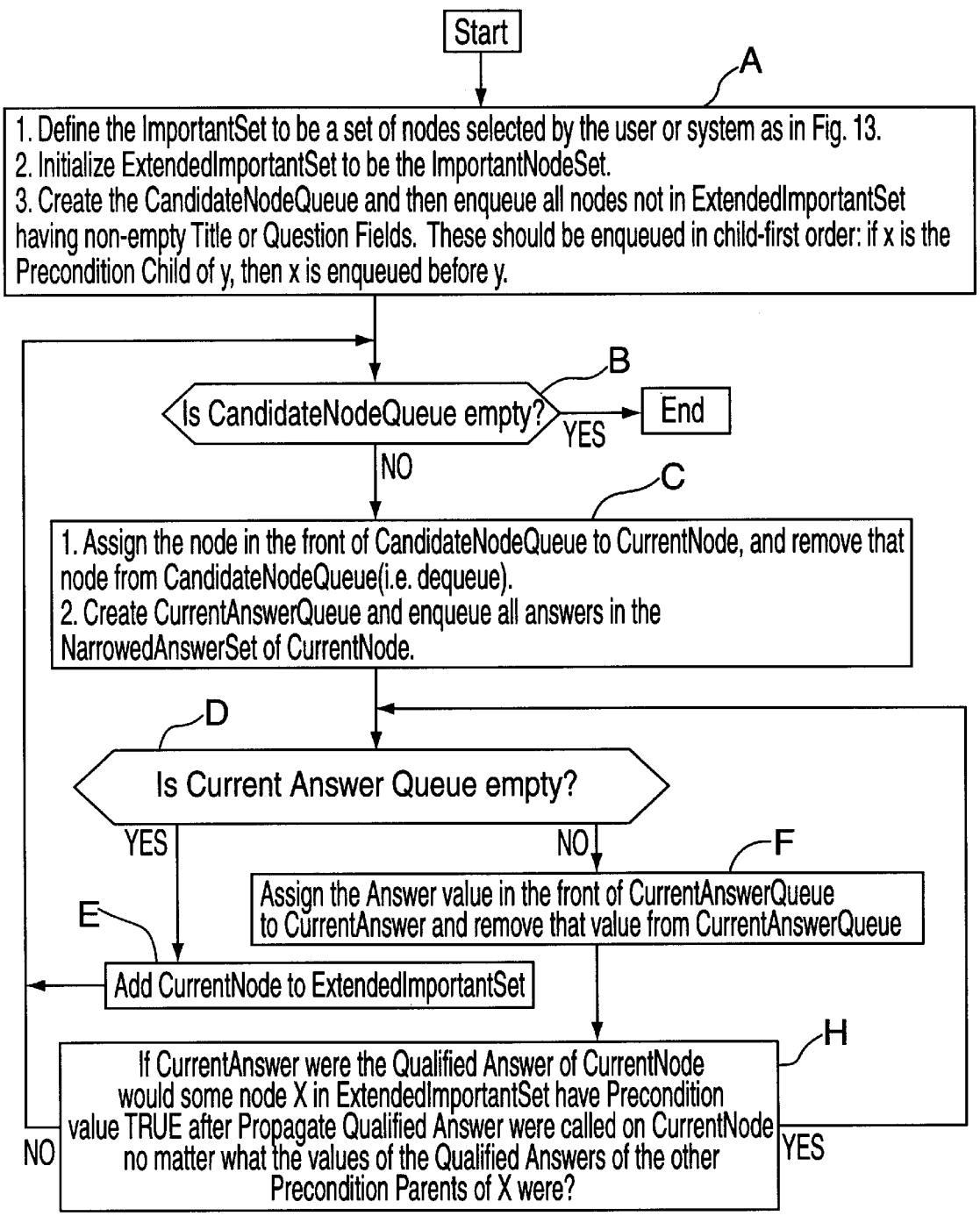
FIG. 17B is a high level flow chart illustrating the steps performed by the Find Extended Important Node Set Routine.

If, however, at Block E in FIG. 5A the system does not detect a request to advance the Global Clock, the system then proceeds to Block G and determines whether the user has entered a Loophole Analysis Request into the system. If such a request has been entered, then the system calls the Approximate Loophole Search Routine and executes the same with a required degree of user interaction, as shown in FIGS. 17, 17A and 17B. At this juncture it will be helpful to briefly describe below the functional capabilities of this Routine.

The concept of a "loophole state" is based upon several subordinate concepts; namely: zero-delay initial state of a network N; a maximal state; and important node. By definition, a zero-delay initial state of a network N is an initial network state of N with all nodes having a Delay Field value of zero. By definition, a "maximal state" is a network state that is constructed by assigning answers in some order to various nodes in the network, such that each such node has the label "Can Answer" when an answer is assigned to it, until there are no nodes in the network labeled "Can Answer". As will be described with reference to FIG. 14A, this display label indicates that such nodes have a non-empty Question Field, a Precondition Flag Value of TRUE and are unanswered. An "important node" is defined as a node that the user (i.e. reader or writer) selects as being important for the particular application at hand. If the user doesn't choose important nodes, then the system chooses them by default as nodes that have a non-null Contents Field or have formulae in their Answer Fields. Using the above definitions, a "loophole" or loophole state is defined as a 5 maximal state in which no important node in the network has a Precondition Value of TRUE.

If at Block G in FIG. 5A the system determines that the user has not entered a Loophole Analysis Request into the system, then as indicated at Block I, the system determines whether the user has entered an Approximate Target Seeking Request into the system. If the user has entered this request, then the system calls the Target Seeking Routine shown in FIG. 18 and executes the same with the requisite degree of user interaction. It will be helpful at this juncture to briefly describe below the functional capabilities of this Routine.

The concept of "target seeking" is based upon several subordinate concepts, namely: important node or important node set; derivation steps; and legal state. As defined above, an important node set is a set of nodes that the user selects or designates as being important to application at hand. A "derivation step", by definition, is a transition from one network state to another network state that is caused by either advancing the Global Clock, or by assigning an answer to an answerable query node having a TRUE Precondition Flag value. A "legal state", on the other hand, is defined as a network state in which the Precondition Value of each node is the value of the Precondition Expression in that state, and in which the Precondition Flag value of each node is a function of the Precondition Value of the node. Using these definitions, a "target-seeking" process performed by the Target Seeking Routine is defined as a process which determines, from a given zero-delay legal state (i.e. one in which all Delay Remaining and Delay fields are set to 0), whether there is a sequence of derivation steps that will lead to a state in which all important nodes have a Precondition Expression value of TRUE. As will become apparent hereinafter, the Target Seeking Routine helps the reader find answers to questions at various nodes which lead to desired conclusions or outcomes. In essence this capability permits the system to perform "backward-chaining" type processes which are required in numerous applications.

If at Block I in FIG. 5A the user does not enter the Target-Seeking Request, then the system proceeds to Block K and determines whether the user has established a network constraint node in the conditional transition network. As shown in FIG. 2, a network constraint node 15 generally has a Constraint Formula, the arguments of which are Precondition Parent node identifiers. As will become apparent hereinafter, the Constraint Formula imposes restriction on the answers of other nodes in the network. If a network constraint node has been established, then as indicated at Block L the system calls and executes the Approximate Constraint Evaluation Routine shown in FIG. 19. The Approximate Constraint Evaluation Routine processes data within all nodes in the network having at least one Precondition Parent node that appears in the Constraint Formula of the network constraint node just created. Part of this processing involves performing target-seeking using the Constraint Formula and the set of nodes that are Precondition Children of the constrained parent nodes identified in the Constraint Formula. Upon processing the data in these nodes, the Approximate Constraint Evaluation Routine will set the Precondition Value Field of each such node X to TRUE if the Precondition Expression in X satisfies the Constraint Formula. If the Precondition Expression of X contradicts the constraint formula, then the Precondition Value Field will be set to FALSE. If neither of these conditions hold (e.g., because the Precondition Expression of X refers to nodes that are not in the Constraint Formula and that have not been answered), then the Precondition Value of X becomes POSSIBLE. After this routine is completed, all nodes whose Precondition Flag changes will be the starting nodes for the Propagate Qualified Answer Routine shown in FIG. 12. This results in a new current network state. Thereafter, the system calls and executes the Approximate Find Influential Node Set Route of FIG. 13, in order to prepare an updated network display process at Block B. As will become apparent hereinafter, this capability permits the system to determine whether certain records in a database, represented by nodes in the network, satisfy particular qualifications represented by the Constraint Formula in the network constraint node.

If at Block K in FIG. 5A the system determines that the user has not established a network constraint node, then the system proceeds to Block M. At this Block the system determines whether the user has requested to perform a routine function, such as Change Display Layout, Save Current Network State, Examine Node Field, or Replay Previous Network States. If the system determines that the user has requested a routine function, then as indicated at Block N the system calls the corresponding routine from program memory and executes the same to perform the requested function. Thereafter, the system returns the Block B to display the resulting conditional transition network. If, however, at Block M the system determines that the user has not requested the performance of a routine function, then the system proceeds to Block 0 and determines whether the user has requested to exit the program.

FIG. 5B illustrates the basic steps involved in an interactive process which the writer may conduct using the programmed computer-based system of the present invention in its writer mode of operation. This interactive process presumes that the writer may have already formulated predicate expressions for the Precondition Expression, Answer and Link Fields in some nodes of the conditional transition network. As indicated at Block A in FIG. 5B, the process begins by the programmed system (i.e. processor) setting the current state of the network to an "initial state," in which there are no user-assigned answers. At Block B of the process, the system displays the Current State of the conditional transition network by executing the Display Network Routine shown in FIG. 14. At Block C, the processor determines whether the user has requested any function that he might request as a reader. If so, at Block D the system performs the requested function using an appropriate Routine previously described in connection with FIG. 5A, and then returns to Block B. If the user does not request any functions at Block C, then at Block E, the processor determines whether the user has updated the Title Field, Question Field or Contents Field. If any such field has been updated, then at Block F the system performs the update on the appropriate node using the routine of FIG. 10, and then returns to Block B. However, the system does not propagate (i.e. transfer) this information to other nodes in the network because such propagation is unnecessary. If the user does not update any field at Block E, then at Block G the processor determines whether the user has updated the Answer Field, the Precondition Expression Field or Display Field. If the user has updated any one of these fields, then at Block H the system (i) performs an update on the updated field; (ii) changes Answer Parents and Children or Precondition Parents and Children as appropriate; (iii) executes the Propagate Qualified Answer Routine of FIG. 12; (iv) executes the Find Approximate Influential Node Set Routine of FIG. 13, and then returns to Block B. However, if at Block G no Answer Field, Precondition Expression or Delay Field has been updated, then at Block I, the processor determines whether the user has chosen to exit the program. If not, the system return to Block B.

Having described the basic operational procedures that can be performed by the programmed computer-based system of the present invention, it is appropriate at this juncture to describe in detail the computational mechanisms that underlie these operational procedures. However, as certain computational processes are fundamental to other operational procedures, it will be helpful to first describe in detail these fundamental processes below.

Figure 3:
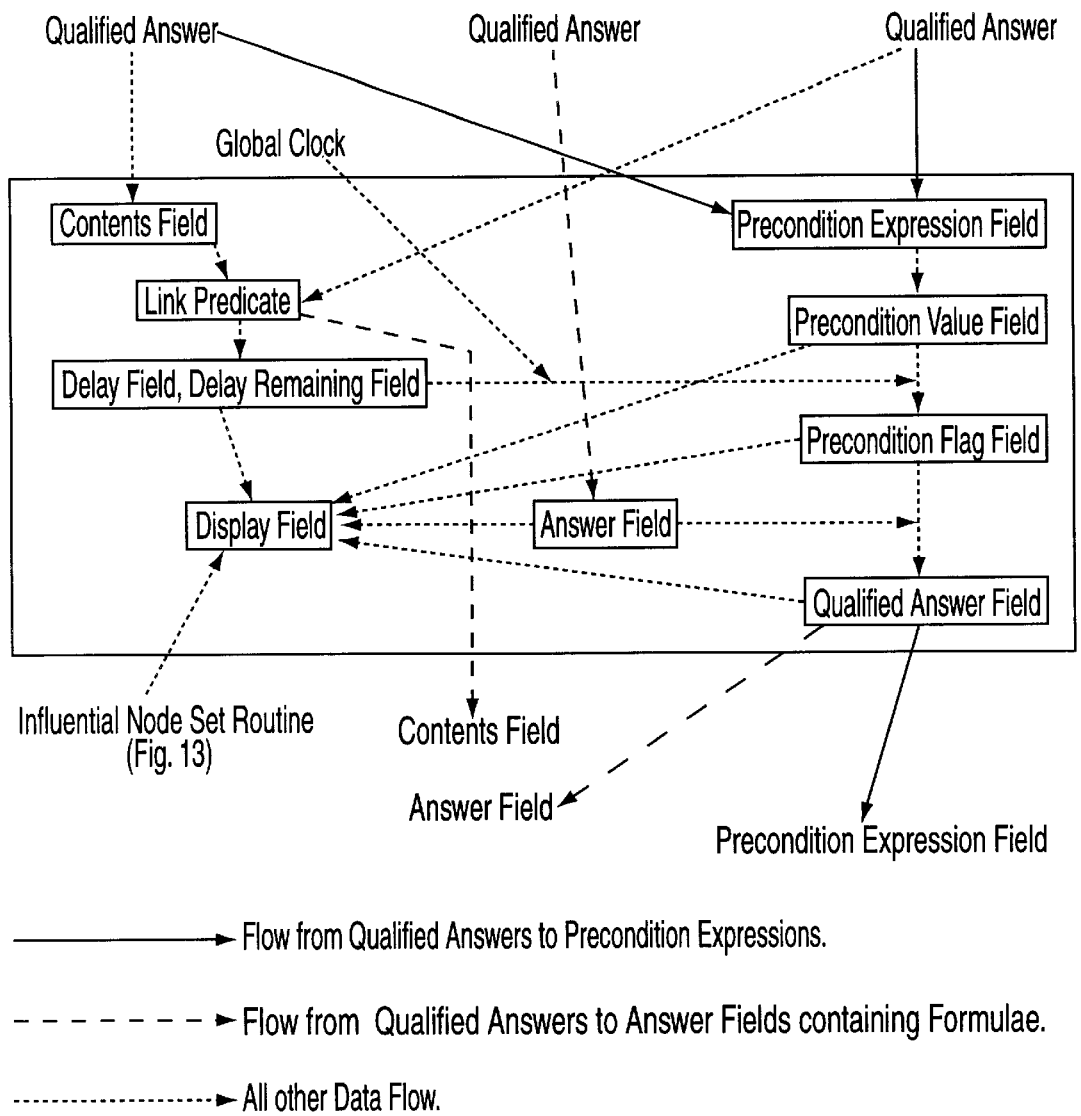
FIG. 3 is a schematic representation of a node in the condition transition network illustrating the flow of data into, within and out from the node in the conditional transition network.

As shown in FIG. 3, each node in the conditional transition network participates within various computational processes that cause data (i.e. information) to flow into, within and out from each node in the network.

As illustrated by solid lines in FIG. 3, the value of the Precondition Expression Field at each node is a function of the value of the Precondition Expression at the node and the Qualified Answers from other nodes (i.e. Precondition Parents). In order to compute the "meaning" represented by the Precondition Expression at a particular node at a given network state, it is necessary to evaluate the truth condition represented by the Precondition Expression of a node. The processor achieves this function at each node by performing the Precondition Expression Evaluation Routine of FIG. 6.

In essence, the Precondition Expression Evaluation Routine is an operational procedure that performs a semantic interpretation process whose output must be one of the Extended Boolean values TRUE, POSSIBLE and FALSE. In general, each Precondition Expression is a formula consisting of a collection of predicates linked together by Boolean combinators. Each predicate returns an Extended Boolean truth value, and may be expressed in terms of functions or rules. Each function returns an arbitrary data type, typically a numeric or a string. Each rule is of the form predicate ==> function. Each function may have, as arguments, external data (e.g. a query to a database, an information retrieval query applying to the contents of the nodes, or a reference to another sheet), or the ID's of other nodes in the conditional transition network.

Figure 6:
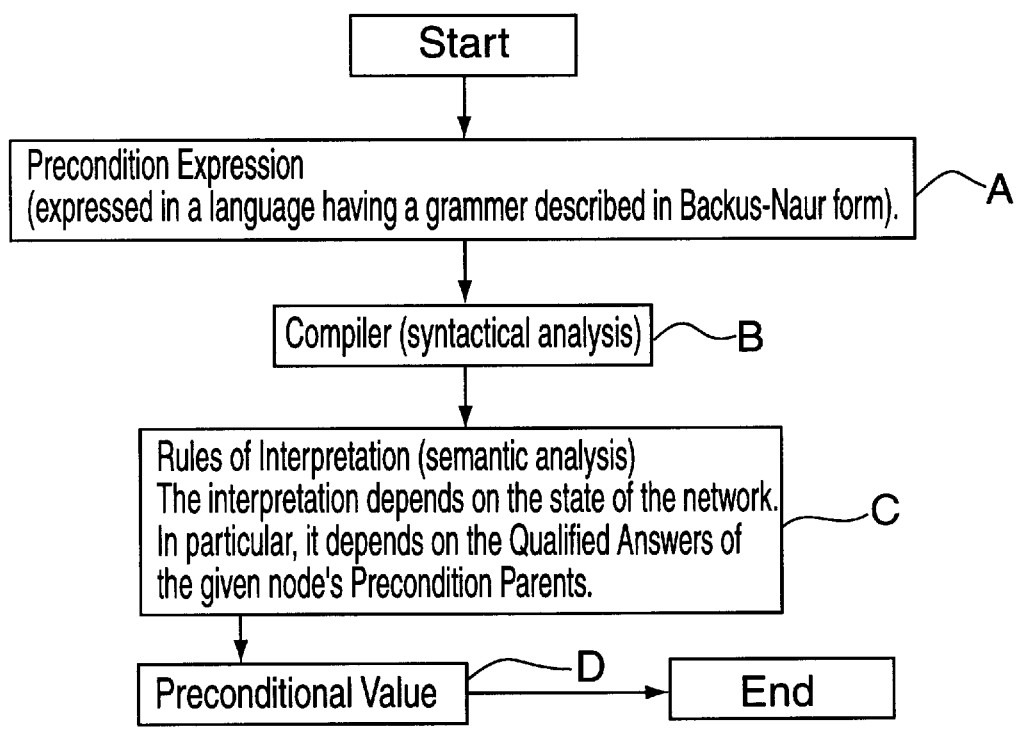
FIG. 6 is flow chart illustrating the steps performed by the Precondition Expression Evaluation Routine.

As indicated at Block A in FIG. 6, the processor begins the Precondition Expression Evaluation Routine by accessing the Precondition Expression at a given node. Each Precondition Expression is expressed in a language having a grammar described in Backus-Naur form. The grammatical description of an exemplary language is set forth below in Backus-Naur form:

```
precondition ::= predicate || empty string
predicate ::= '('predicate')'
    || predicate booleancombinator predicate
    || externalpredicate
    || functionrule relop functionrule
    || nodeidentifier equalop stringconstant || stringconstant
equalop nodeidentifier
    || nodeidentifier relop numeric || numeric relop
nodeidentifier
    || nonnumeric equalop nonnumeric
    functionrule ::= function || rule
    rule ::= predicate '==>' function : function : function
    function ::= externalfuction '(' arguments')'
    || '('function')'
    || '('rule')'
    || function arithop function
    || nodeidentifier
    || numeric
    arguments ::= argument || argument ',' arguments
    argument ::= nodeidentifier || externalidentifier
    nodeidentifier ::= identifier of a node in a specific
transition network
    externalidentifier ::= identifier of some data repository
external to any transition network.
```

-continued

```
    externalpredicate ::= predicate on a data repository
external to any transition network.
    numeric ::= some representation of a number (e.g., integer
float)
    nonnumeric ::= constant such as a string or character;
something that is not the representation of a number.
    booleancombinator ::= NOT || AND || OR || XOR
    relop ::= '<' || '<=' || '=' || '!=' || '>=' || '>'
    equalop ::= '=' || '!='
    arithop ::= '+' || '−' || '*' || '/' || '^'
```

Notably, <= is the symbol for "less than or equal"; >= is the symbol for "greater than or equal"; and != is the symbol for "unequal to".

As indicated by Block B of FIG. 6, the processor performs a syntactic analysis of the accessed Precondition Expression. This step involves analysis of the syntactic structure of the accessed Precondition Expression and the production of a syntax-tree for the analyzed Precondition Expression. At Block C of FIG. 6, the processor performs a semantic analysis upon the syntactically analyzed Preconditioned Expression in order to compute the truth value of the Expression. Notably, the semantic analysis depends on the value of the Qualified Answers of the Precondition Parents of the nodes under evaluation, and thus, depends on the current network state of the conditional transition network. Computationally, evaluation of the truth conditions of each Precondition Expression involves (i) performing a syntactic analysis of the Precondition Expression Field; (ii) inserting the Qualified Answer Values, if any, into the arguments of syntax-tree, and (iii) interpreting the syntax tree to produce the value of the Precondition Expression Field in the current network state to produce the Precondition Value of the Node at Block D. Steps (i) and (ii) are known in the art and further explanation can be found on page 234–287 of the book entitled The UNIX Programming Environment, by Brain W. Kernighan and Rob Pike, (Prentice-Hall) 1984. Step (iii), however, requires special rules of interpretation as the value of each evaluated argument in the Precondition Expression may be an extended Boolean (i.e. TRUE, POSSIBLE and FALSE), a numeric, or a non-numeric and those values may propagate into other expressions.

In general, the Predicate Expression may have either an arithmetic or string operator, each having a standard domain from which its arguments are selected. For arithmetic operations, the standard domain for both arguments is some numerical domain. When the arguments come from their standard domains, the arithmetic operator is interpreted in the conventional manner. Thus, when using spreadsheet layout position notation, if the Qualified Answers of A1 and B1 are both numerics in a given network state, then A1+B1 means take the sum of these arguments. For string predicates, the standard domains of its arguments is the string domain.

In general, when all of the arguments of the predicate belong to their standard domains in a given network state, the predicate result is interpreted using conventional rules. However, when at least one argument of a predicate has the value FALSE or POSSIBLE, then conventional rules of interpretation no longer apply. Instead, the following rules of interpretation apply:

(1) If any argument in a predicate is FALSE, then return FALSE;

(2) Otherwise, if any argument is POSSIBLE, then return POSSIBLE;

(3) If rules (1) and (2) do not apply, then apply the conventional interpretation.

Table 1 shows the interpretation for arithmetic expressions. Arithmetic functions with more than two arguments will generalize this table as follows. If any argument is FALSE, then the result is FALSE. Otherwise, if any argument is POSSIBLE, then the result is POSSIBLE. Otherwise, apply the conventional interpretation of the function.

TABLE 1

For (+, −, *, /):

| first arg | second arg | result |
|---|---|---|
| numeric | numeric | conventional numerical result |
| numeric | POSSIBLE | POSSIBLE |
| POSSIBLE | numeric | POSSIBLE |
| POSSIBLE | POSSIBLE | POSSIBLE |
| FALSE | ANYTHING | FALSE |
| ANYTHING | FALSE | FALSE |

Table 2 shows the interpretation for arithmetic predicates. General predicates having more than two arguments generalize this table as follows. If any argument is FALSE, then the result is FALSE. If any argument is POSSIBLE, then the result is POSSIBLE. If no argument is FALSE and no argument is POSSIBLE, then the result is interpreted in the conventional manner.

TABLE 2

For <, > |=, !=:

| first arg | second arg | result |
|---|---|---|
| numeric | numeric | conventional interpretation |
| numeric | POSSIBLE | POSSIBLE |
| POSSIBLE | numeric | POSSIBLE |
| POSSIBLE | POSSIBLE | POSSIBLE |
| FALSE | ANYTHING | FALSE |
| ANYTHING | FALSE | FALSE |

The interpretation of boolean combinators for the three-valued logic is set forth in Table 3:

TABLE 3

For AND:

| first arg | second arg | result |
|---|---|---|
| TRUE | TRUE | TRUE |
| TRUE | POSSIBLE | POSSIBLE |
| POSSIBLE | TRUE | POSSIBLE |
| POSSIBLE | POSSIBLE | POSSIBLE |
| FALSE | ANYTHING | FALSE |
| ANYTHING | FALSE | FALSE |

For NOT:

| arg | result |
|---|---|
| TRUE | FALSE |
| FALSE | TRUE |
| POSSIBLE | POSSIBLE |

For OR:

| first arg | second arg | result |
|---|---|---|
| TRUE | ANYTHING | TRUE |
| ANYTHING | TRUE | TRUE |

TABLE 3-continued

| POSSIBLE | POSSIBLE | POSSIBLE |
|---|---|---|
| POSSIBLE | FALSE | POSSIBLE |
| FALSE | POSSIBLE | POSSIBLE |
| FALSE | FALSE | FALSE |

A rule is represented syntactically as predicate ==> TRUE-function: POSSIBLE-function: FALSE-function. The value of the predicate determines the function that executes.

rule:

| predicate | result |
|---|---|
| FALSE | FALSE-function |
| POSSIBLE | POSSIBLE-function |
| TRUE | TRUE-function |

As illustrated by dotted lines in FIG. 3, the value of the Precondition Flag Field at each node is a function of the (i) Precondition Value Field at the node, (ii) the value of the Delay Field, the Remaining Delay field and the Global Clock. The value of the Precondition Flag Field at each node is computed by the processor performing the steps in the Precondition Flag Evaluation Routine shown in FIG. 7.

As indicated at Block A in the Precondition Flag Evaluation Routine, the processor begins by determining whether the Precondition Value Field at the node being analyzed contains the value FALSE or POSSIBLE. If the Precondition Value Field contains either of these values, then at Block B the processor sets the Precondition Flag Field to the value of the Precondition Value Field and thereafter exits the routine. Otherwise, it advances to Block C and determines whether the Delay Field is set to zero. If it is, the processor enters Block B and thereafter exits the routine. If the Delay Field is not set to zero, then the processor determines whether the Precondition Value Field contains the value TRUE and also whether the Delay Remaining Field has the value zero. If both of these conditions are satisfied, then the processor proceeds to Block E and sets the Precondition Flag Field at the node to the value TRUE, and thereafter exits the routine. If, however, the above-described pair of conditions are not satisfied, then the processor proceeds to Block F and sets the Precondition Flag Field to the value POSSIBLE, and thereafter exits the routine. The Precondition Flag Evaluation Routine is performed for each node in the conditional transition network whose Delay Field, Precondition Value Field, or Delay Remaining Field changes.

Figure 8:
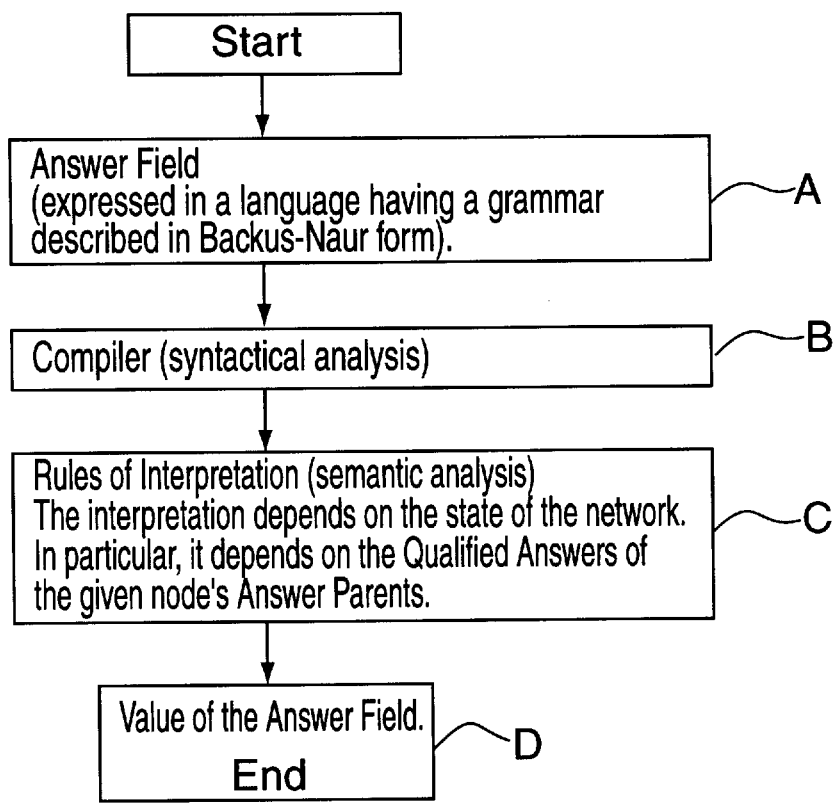
FIG. 8 is a high level flow chart illustrating the steps performed by the Answer Field Evaluation Routine.

As illustrated by the dashed lines in FIG. 3, the value of an Answer Field of a node may be a function of the Qualified Answer of the Answer Parents of the node, and thus is a function of the state of the network. As illustrated in FIG. 8, the value of each such Answer Field is computed by the processor performing the steps of the Answer Field Evaluation Routine. As indicated at Block A, the processor begins the Answer Field Evaluation Routine by accessing the Answer Field, which like each Precondition Expression, is expressed in a language having a grammar in Backus-Naur Form, described above. At Block B in the Answer Field Evaluation Routine, the processor performs a syntactical analysis of the accessed Answer Field and produces a syntax tree. At Block C of the Routine, the processor performs a semantic analysis upon the syntactically analyzed Answer Field in order to compute the value of the Answer Field. Computationally, this step involves: (i) performing a syntactic analysis of the Answer Field; (ii) inserting the Qualified Answer Values, if any, into the arguments of syntax-tree, and (iii) interpreting the syntax tree to produce the value of the Answer Field in the current state. As when evaluating Precondition Expressions, steps (i) and (ii) are performed in a conventional manner. However, step (iii) requires the use of the extended Boolean rules of interpretation described above in connection with the evaluation of Precondition Expressions. Notably, the output of this computational process, indicated at Block D, need not be an extended Boolean value, as in the case of the Precondition Expression Evaluation Routine of FIG. 6, but rather is normally FALSE, POSSIBLE, or a numeric.

As illustrated by the dotted lines in FIG. 3, the value of the Qualified Answer Field of each node is generally a function of the value of the Answer Field and the value of the Precondition Flag Field at the node. Thus, the Qualified Answer Field of each node X is an indirect function of the state of the network "above Node X". The term "above node X," refers to those nodes that are Precondition or Answer Ancestors of node X. The value of the Qualified Answer Field at each node is computed by the processor performing the steps of the Qualified Answer Assignment Routine shown in FIG. 9. As indicated at Block A, the processor begins the Qualified Answer Assignment Routine by determining whether the Precondition Flag Field at the node contains the value FALSE, in which case the processor sets the value in the Qualified Answer Field to FALSE, and thereafter exits the routine. If at Block A the value in the Precondition Flag Field is determined not to be FALSE, then the processor proceeds to Block C, where it determines whether the Precondition Flag Field of the node contains the value POSSIBLE.

If it does contain this value, then at Block D the processor sets the Qualified Answer Field of the node to POSSIBLE and thereafter exits the routine. If, however, at Block C the processor determines that the Precondition Flag Field contains neither POSSIBLE nor FALSE, then the processor infers that the value contained therein is TRUE and sets the value in the Qualified Answer Field of the node to the value of the expression contained in the Answer Field of the node. Thereafter, the processor exits the routine. This process is performed for each node whose Answer Field or Precondition Flag Field changes.

As discussed in connection with the process of FIG. 5, the Update Answer/Qualified Answer Routine of FIG. 10 is executed at a node each time the processor determines that the reader or writer has updated the value in the Answer Field or Precondition Expression Field of the node. As used hereinafter, the term "update" refers to the reader or writer entering an answer value into the Answer Field of a selected node in the conditional transition network. In either case, the user may use a pointing device to select the node and the keyboard or a pointing device to enter or change the Answer value. As indicated at Block A of FIG. 10, the processor begins the update Answer/Qualified Answer Routine by denoting the updated query node by X, and then proceeding to Block B, at which it determines whether the Question Field of the updated node X is empty. If the Question Field is empty, implying that the node is not answerable, then the processor proceeds to Block C where the updated Answer Field is undone.

Thereafter, the processor exits the update Answer/Qualified Answer Routine. If, however, the Question Field of the updated node is not empty, implying that the node may be answerable, then the processor proceeds to Block D at which it determines whether the Precondition Flag Field of node X is TRUE. If the value in this field is not TRUE, then the processor proceeds to Block C and undoes the updated Answer Field of node X. Notably, it is possible, in some embodiments, to allow such updates as shortcuts. These shortcuts would change answers in the Precondition Parents of node X in order to make the Precondition Flag of node X evaluate to TRUE. If the Precondition Flag Field of node X has a TRUE Value, then the processor proceeds to Block E and determines whether the value in the Qualified Answer Field of node X has changed. If the value of the Qualified Answer Field has not changed, then propagation of Qualified Answers to Answer Children nodes is not necessary, and thus the processor exits the routine. If, however, the value of the Qualified Answer Field of node X has changed, then propagation of Qualified Answers to Answer (and Precondition) Children nodes is in order, and thus the processor calls the Propagate Qualified Answer Routine of FIG. 12, and then executes the same starting at node X. When the Propagate Qualified Answer Routine is completed, the processor exits the Update Answer/Qualified Answer Routine.

Figure 11:
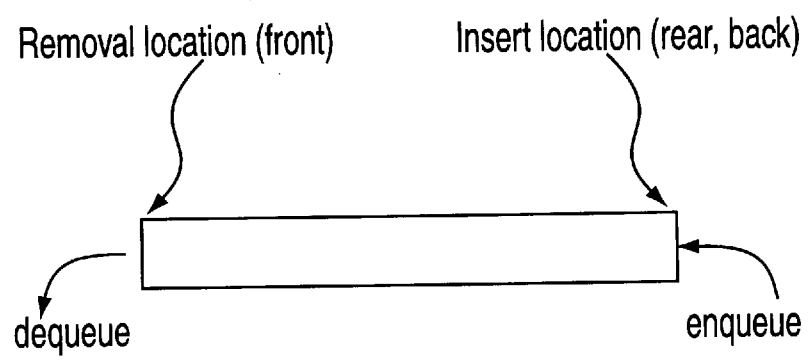
FIG. 11 is a schematic representation of a queue-type data structure used in the various computational processes of the present invention.

The Propagate Qualified Answer Routine of the present invention is a computational process that requires that use of a conventional data structure known as a queue, schematically illustrated in FIG. 11. During the execution of the Propagate Qualified Answer Routine, the queue holds the node identifiers of the Precondition and Answer Children of nodes whose Qualified Answer has changed. In accordance with conventional principles, an empty queue is created by initializing a queue. As shown in FIG. 11, each object (typically, a node identifier) to be enqueued is added to the insert location (i.e. rear) of the queue, and each object to be dequeued is removed from the removal location (i.e. front) of the queue and returned to the application at hand. This queue shall be referred to as the Qualified Answer Queue in the following detailed description of the Propagate Qualified Answer Routine.

Figure 12:
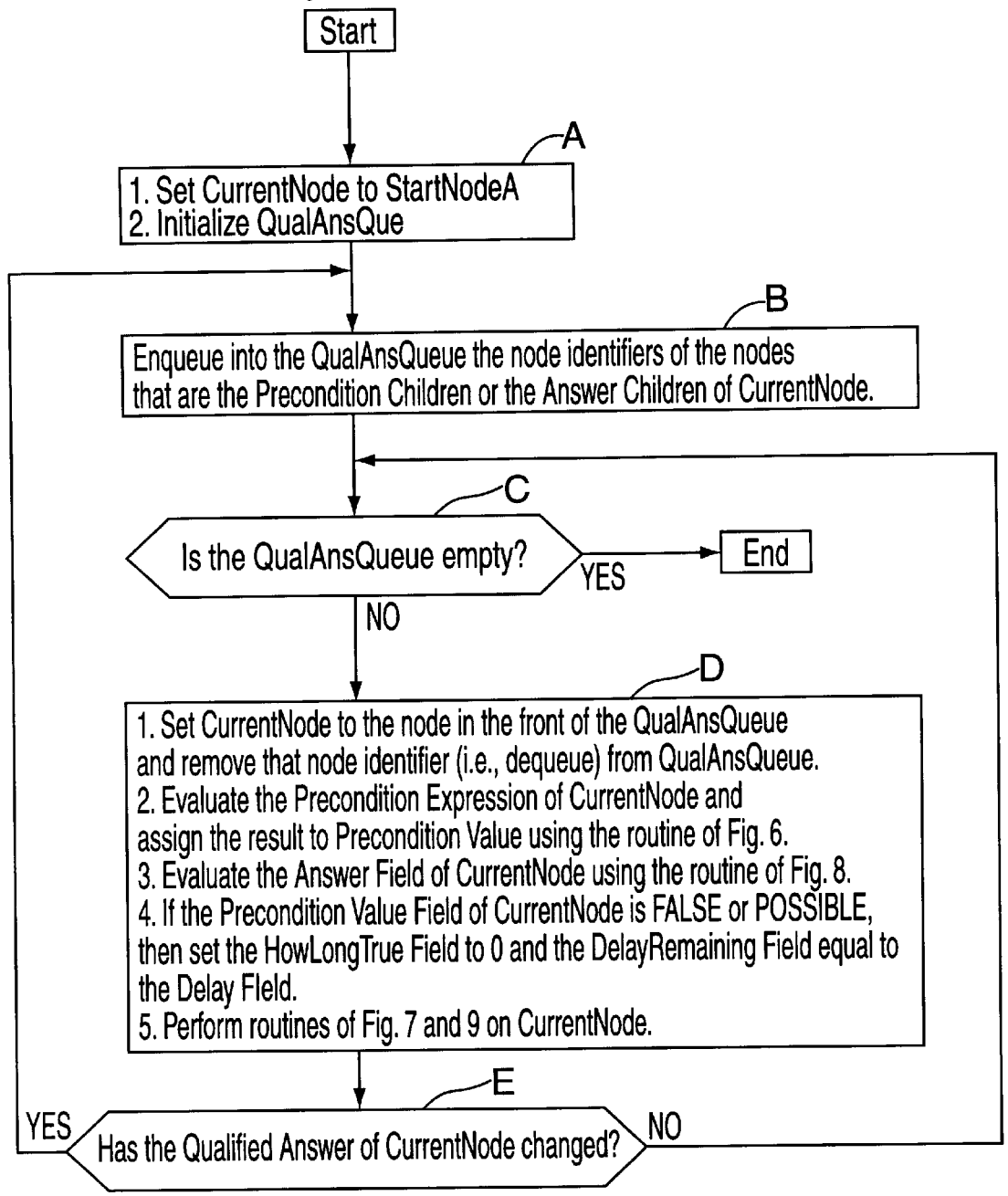
FIG. 12 is a high level flow chart illustrating the steps performed by the Propagate Qualified Answer Routine.

As indicated at Block A in FIG. 12, the processor begins the Propagate Qualified Answer Routine by setting the Current Node to start at node X and initializing the Qualified Answer Queue. At Block B, the processor enqueues onto the Qualified Answer Queue the node identifiers of all nodes that are the Precondition Children or the Answer Children of the Current Node. Then at Block C the processor determines whether the Qualified Answer Queue is empty. If it is empty, then the processor exits the routine. However, if the Qualified Answer Qileue is not empty (i.e. it contains at least one node identifier), then the processor proceeds to Block D. At this Block, the processor sets the Current Node to the node in the front of the Qualified Answer Queue and then removes that node identifier from the Qualified Answer Queue. Then, the processor evaluates the Precondition Expression of the Current Node and assigns the result to the Precondition Value Field, using the Precondition Expression Evaluation Routine. The Answer Field of the Current Node is then evaluated using the Answer Field Evaluation Routine. Then if the Precondition Value Field of the Current Node is FALSE, or POSSIBLE, then the processor sets the How Long True Field of the Current Node to 0 and the Delay Remaining Field equal to the Delay Field. Thereafter, the processor proceeds to Block E and determines whether the Qualified Answer of the Current Node has changed. If the Qualified Answer of the Current Node has changed, then the processor returns to Block B and enqueues into the Qualified Answer Queue the node identifiers of the nodes that are the Precondition Children or the Answer Children of the Current Node. However, if the Qualified Answer of the Current Node has not changed, then the processor returns to Block C and determines whether the Qualified Answer Queue is empty. If it is not empty, the processor proceeds to Block D, resets the Current Node to be node in the front of the Qualified Answer Queue and performs operations in Block D using the new Current Node. This process proceeds until the change to the Qualified Answer of node A has been fully propagated.

Displaying the current state of the conditional transition network occurs at Block B of the interactive Program shown in FIG. 5. The actual computational procedures involved in the display process are illustrated in the Display Routine of FIGS. 14 and 14A. The concepts of important nodes and influential nodes are needed to understand the computation of Display Labels in the Display Label Routine of FIG. 14A, in particular. Thus, prior to describing the details of these Routines, it will be appropriate to first discuss these concepts and routine for determining the same.

Figure 22A:
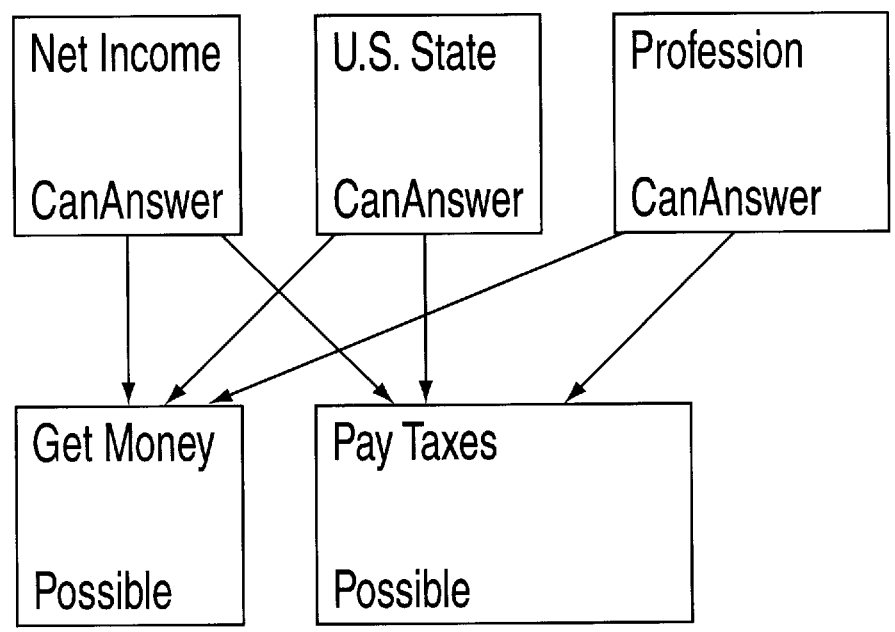

In many applications, the reader is particularly interested in the Precondition Flag, Qualified Answer value, or Contents of certain critical nodes (e.g., the Pay Taxes or Pay Nothing nodes in the example of FIG. 22A). Such nodes are called Important. By default, the system will consider a node to be Important if it has contents or an Answer Field referring to the Qualified Answers of other nodes (i.e. is a formula) or both. Alternatively, the reader can select Important nodes explicitly. In either case, the reader would like not to waste time by answering the Questions of nodes that will not have any effect on the Precondition Value or Answer Value of Important nodes.

A node is Influential if it is Important or it can affect the Qualified Answer or the Precondition Flag value of an Important node. All other nodes are said to be Noninfluential. By default, Noninfluential nodes are not displayed in reader mode, although the reader can override this default in order to force Noninfluential nodes to be shaded gray or labeled "Noninfluential" on the display screen computing influential and noninfluential nodes is difficult in general. For this reason, an approximate solution is employed to provide a more computationally efficient routine.

The Find Approximate Influential Node Set Routine of FIG. 13 is based on four basic assumptions. First, the routine works from Precondition and Answer child nodes to parent nodes. The reason is that the influence of nodes is based on the influence of their Children, and thus it is necessary to decide whether those Children node are Influential before making this determination for the Parent nodes thereof.

Second, if an Answer Child of node B is Influential and has Precondition Flag TRUE, then node B will usually be Influential since changing the Qualified Answer of node B could potentially change the Qualified Answer of the Answer Child of node B. This will not always be the case, however. For example, if node B is referenced only once in that Answer Child and the reference is of the form B * 0 (where * is the symbol for multiplication), then changing the Qualified Answer of node B will never have an effect on that Child's Answer Field value. Thus, node B may be included in the Influential Node Set in the routine of FIG. 13 even though it is in fact Noninfluential. A more refined analysis could study the form of the references to node B in order to improve the approximation.

Third, if a node X is Influential and has Precondition Value POSSIBLE, then it is likely that some combination of the unanswered Precondition Parents of node X will determine the Precondition Value of node X. This may not be the case, however. For example, it may be that the Precondition of node X reads (A=1) OR ((A=1) AND (B=5)). In this case, the answer to node B will never be significant. Node A is both necessary and sufficient to determine the truth or falsity of the node. Again, in the routine of FIG. 13, node B may be included into the Influential Node set even though it is in fact Noninfluential. Once again, a more refined analysis could study the form of references to node B in order to improve the approximation.

Finally, if node B is already answered, then its answer may have already affected the Precondition Value or Qualified Answer of one or more Important Nodes. Hence, each answered node is included in the Influential Node set.

As shown in Block A of FIG. 13, the processor begins the Find Approximate Influential Node Set Routine by selecting a definition for the Important Node Set. As indicated in Block A, the Important Node Set is defined as a set of nodes that the user selects as significant to the application at hand, or if the user has made no selection, the set of nodes in which the Contents Fields are not empty, or that contain Answer Formulas. The second step of Block A involves initializing the Influential Node set. This is achieved by setting the Influential Node Set equal to the selected Important Node set. The third step of Block A involves initializing a Candidate Node Queue, in which each location in the queue stores the identifier of a node. The initialized Candidate Node Queue is then assigned the set of all initialized nodes (i.e. having a non-empty Title Field, a non-empty Question Field, or a non-empty Answer Field) that are not in the initial Influential Node Set. Notably, the order of nodes in the Candidate Node Queue is constrained to obey the following rule: if node X is the Precondition or Answer Child of node Y, then node X is enqueued before node Y. The acyclicity constraint states that a node may be neither an Answer Descendant nor a Precondition Descendant nor any combination thereof of itself, and ensures that at least one ordering satisfies this rule.

After Block A of FIG. 13 has been completed, the processor proceeds to Block B and determines whether the Candidate Node Queue is empty. If the Candidate Node Queue is empty, then the processor exits the routine. However, if the Candidate Node Queue is not empty, then the processor proceeds to Block C. At this Block, the Current Node is assigned the node from the front of the Candidate Node Queue and that node is removed from Candidate Node Queue. Then at Block D, the processor determines whether there is any Answer Child node X of the Current Node such that node X is in the Influential Node Set and the Precondition Flag Field of node X is TRUE. If there is such an Answer Child node of the Current Node, then at Block E the processor adds the Current Node to the Influential Node Set and then returns to Block B, as shown. However, if there is no such Answer Child node of the Current Node, then at Block F the processor determines whether the Current Node has any Precondition Children in the Influential Node Set having the Precondition Value POSSIBLE. If so, then the processor proceeds to Block E and adds the Current Node to the Influential Node Set and thereafter returns to Block B. However, if the Current Node has no such Precondition Children in the Influential Node Set, then at Block G the processor determines whether both the Precondition Flag of the Current Node is TRUE and the Current Node has been answered. If the Current Node satisfies these conditions, then the processor proceeds to Block E and adds the current node to the Influential Node Set, and thereafter returns to Block B. However, if the conditions at Block G are not satisfied by the Current Node, then the processor returns directly to Block B. The above computational process continues as described until all nodes in the Candidate Node Queue have been processed and the Candidate Queue is empty. The Influential Node Set which results from carrying out the Approximate Find Influential Node Set Routine of FIG. 13 is used in the Network Display Routine of FIGS. 14 and 14A described below.

As indicated at Block A of FIG. 14, the processor begins the Display Network Routine by calling the Display Label Field Subroutine of FIG. 14A and calculating the value of the Display Label Field for each node in the network. As illustrated at Block A in FIG. 14A, the processor begins this subroutine by determining the value in the Precondition Flag Field. If the processor determines that the value in the Precondition Flag Field is FALSE, then the processor writes the display label "False" into the Display Label Field of the node. If the Precondition Flag Field contains the value POSSIBLE, then the processor proceeds to Block B and determines whether the node being processed is in the precomputed Influential Node Set. If the node being processed is in the Influential Node Set, then the processor writes the display label "Possible" into the Display Label Field of the node. However, if the node being processed is not in the Influential Node Set, then the processor writes the display label "NonInfluential" into the Display Label Field of the node. As illustrated at Block A in FIG. 14A, if the value in the Precondition Flag Field is set to TRUE, then the processor proceeds to Block C and determines the type of answer contained in the Answer Field of the node. If the Answer-Type is a Formula-Answer (i.e. the node's answer field has a formula and the node's question field contains an empty string), then the processor writes the value of the Qualified Answer Field into the Display Field. If the node's Answer Field is empty (i.e. No-Answer), then the processor proceeds to Block D and determines whether the node has Precondition Parents or a positive Delay Field value. If the node does not meet the conditions set forth at Block D, then the processor writes the "Overview" display label into the Display Label Field of the node. This label indicates that the node has been assigned an overview function, such as a commentary on the domain of application of a particular network. If the conditions at Block D are satisfied, then the processor writes the display label "True" into the Display Label Field of the node.

If at Block C the answer-type is determined to be a User-Answer (i.e., the node has a non-empty question string), then the processor proceeds to Block E and determines whether the user has entered a value into the Answer Field either directly or as a parameter to a formula. If this is the case, the processor writes the value of the Qualified Answer Field into the Display Label Field of the node. However, if the Answer Field is empty, the processor proceeds to Block F and determines whether the node being processed is in the Influential Node Set. If it is in the Influential Node Set, then the processor writes the display label "CanAnswer" in the Display Value Field of the node. The CanAnswer value indicates to the reader that he or she may want to answer the question at that node. However, if the node is not in the Influential Node Set, then the processor writes the display label "NonInfluential" into the Display Label Field of the node. The Noninfluential value indicates that there is no point for the user to answer the question of the node in the present state, since the answer will not change the Precondition Flag or Qualified Answer of any Important node.

After performing the process in Block A of FIG. 14, the processor first determines whether the system is in reader mode or writer mode, e.g. by checking the state of a global variable. Notably, the user establishes the write mode upon each invocation of a conditional transition network application, perhaps by menu selection. In the writer mode, all nodes visible in the current window on the network will be displayed. In the reader mode, only those nodes whose Display Label Field values are different from False or NonInfluential will be displayed. The purpose of this display process is to reduce screen clutter. Having determined which nodes to display, the system proceeds to Block B. At this Block, the processor performs the following display operations for each displayed node:

(1) create a rectangle for that node so it does not overlap any other node in the network;

(2) display the Title Field on the top line of the created rectangle;

(3) display the Delay Remaining Field value in the middle of the rectangle if the node has a Delay Field value greater than 0; and (4) display the calculated display label field value on the bottom of created rectangle.

Thereafter, the processor proceeds to Block C in the Display Network Routine and generates inter-node display arrows in order to show Precondition and Answer Parentage relationships among the nodes. The inter-node display arrows are generated according to the following rules:

(1) If nodes X and Y are both displayed and node X is a Precondition Parent of node Y, then generate a solid display arrow from node X to node Y; and (2) If nodes X and Y are both displayed, and node X is an Answer Parent of node Y, then generate a dashed arrow from node X to node Y. Two exemplary visual displays which can be produced by executing the above-described display routine are shown at FIGS. 20F and 20H for reader and writer modes respectively.

Figure 15:
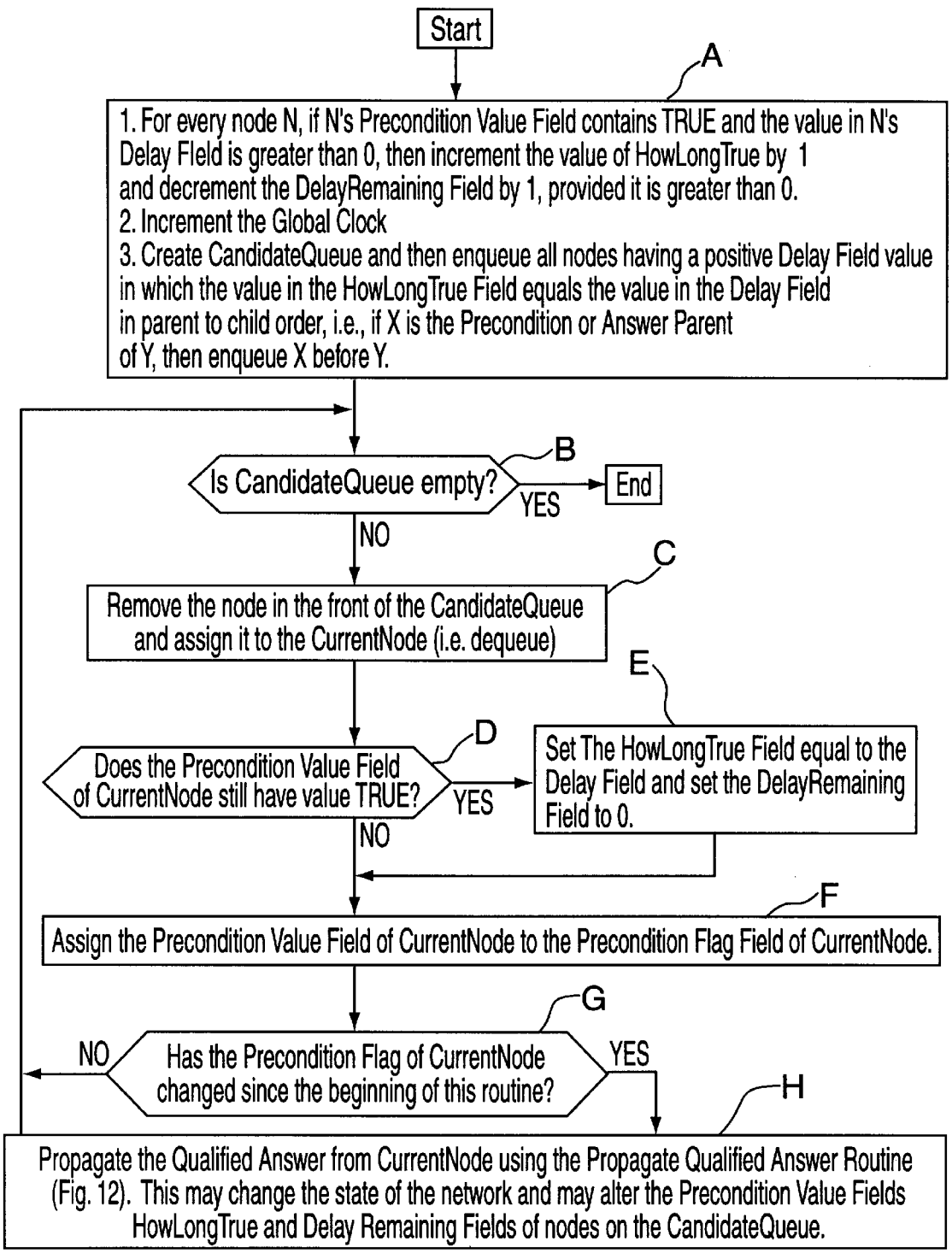
FIG. 15 is a high level flow chart illustrating the steps performed by the Advance Global Clock Routine.

In FIG. 15, the details of the computational process underlying the Advance Global Clock Routine are illustrated. As indicated at Block A of FIG. 15, the processor begins the Advance Global Clock Routine by performing a number of operations. First, for every node N whose Precondition Value is TRUE and whose Delay Field value is greater than 0, the processor increments the value of the How Long True Field by 1; then it decrements the value of the Delay Remaining Field by 1, provided that field has a positive value. Then the processor creates a Candidate Node Queue and then enqueues all nodes in which the value in the How Long True Field equals the value in the Delay Field where the Delay Field is positive. Notably, the enqueuing of such nodes is carried out in parent to child order, i.e. if node X is the Precondition or Answer Parent of node Y, then enqueue node X before node Y. After the operations of Block A are completed, the processor proceeds to Block B and determines whether the Candidate Queue is empty. If it is empty, the processor exits the routine. If the Candidate node is not empty, then the processor proceeds to Block C and removes the node in the front of the Candidate Queue and assigns the removed node to the Current Node of the routine. At Block D, the processor then determines whether the Precondition Value Field of Current Node still has the value TRUE; that field must have had the value TRUE when the routine began since Current Node came from the set of candidate nodes created in Block A. If the Precondition Value Field of the Current Node has such a value, then at Block E the processor sets the value in the How Long True Field equal to the value in the Delay Field, and sets the value in the Delay Remaining Field Equal to 0, and then proceeds to Block F. If at Block D the Precondition Field of the Current Node does not have a value TRUE, then the processor proceeds to Block F. At Block F, the processor assigns the Precondition Value Field of the Current Node to the Precondition Flag Field of the Current Node. At Block G, the processor determines whether the Precondition Flag of the Current Node has changed since the beginning of the routine. If it has not changed, then the processor returns to Block B. However, if the Precondition Flag of the Current Node has changed since the beginning of the routine (i.e. the normal case), then the processor proceeds to Block H and executes the Propagate Qualified Answer Routine of FIG. 12. This propagates the Qualified Answer from the Current Node to Precondition and Answer Descendant nodes in the network. Notably, this process may change the state of the network and may also alter various fields of nodes on the Candidate Queue. That is the reason for the test of Block D and the assignments of Block E. After the operational procedures of Block H have been completed, the processor returns to Block B, as shown. The above described process is repeated until all nodes in the Candidate Node Queue have been processed.

Figure 16:
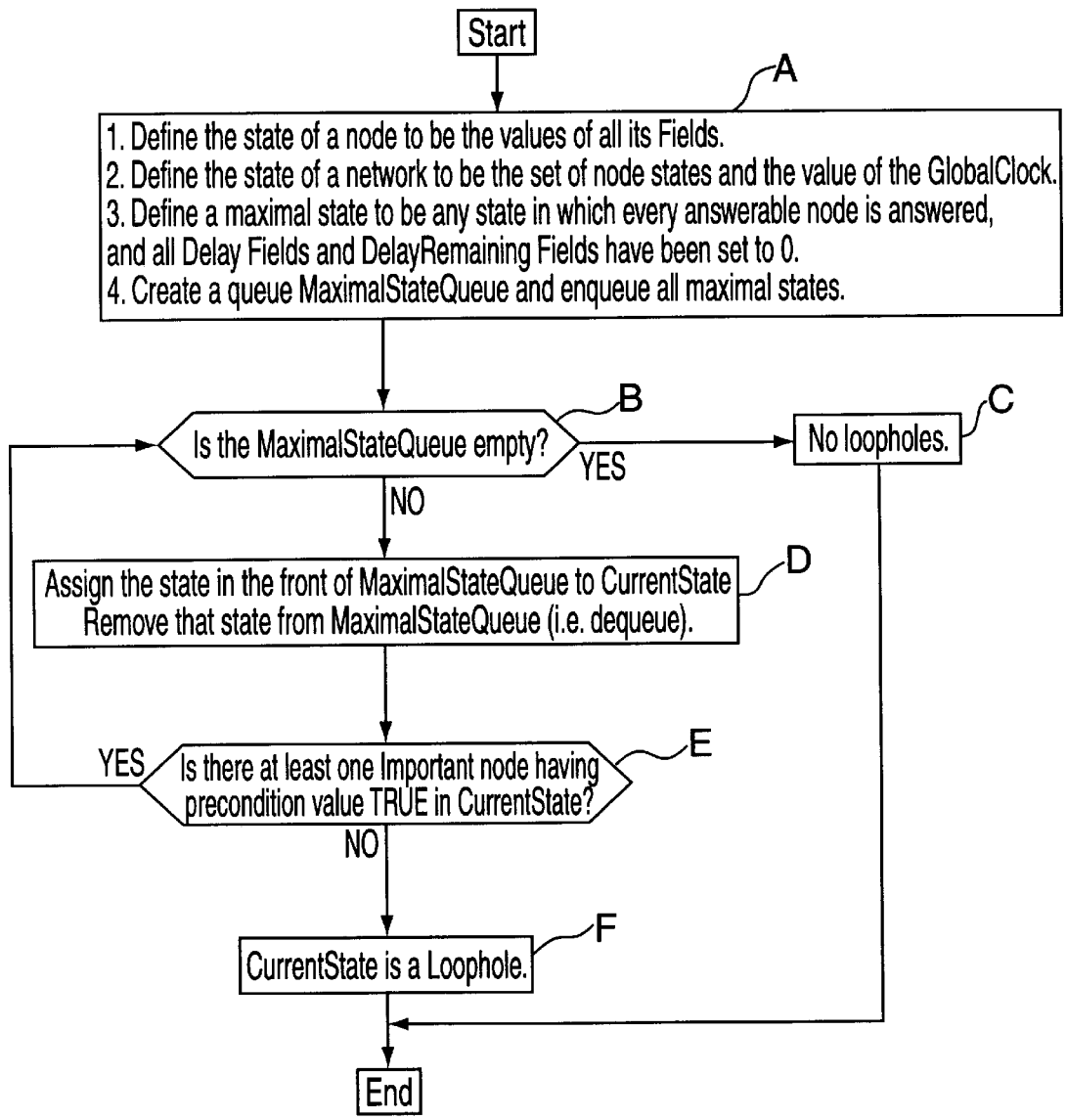
FIG. 16 is a high level flow chart illustrating the steps performed by the Generalized Loophole Search Routine.

In FIG. 16, a generalized method is presented for finding loophole states in the conditional transition network of the present invention. As indicated at Block A in FIG. 16, the processor starts the Generalized Loophole Search Routine by defining the state of a node to be values of all of its fields. Then the processor defines the state of the network to be the set of node states and the value of the Global Clock. At Block A, the processor also defines a "maximal state" to be any state in which every answerable mode is answered and all Delay Fields and Delay Remaining Fields have been set to 0. Then, the processor creates a queue, entitled Maximal State Queue and then enqueues all maximal states. Notably, unlike the earlier defined queues utilized by other routines, the Maximal State Queue contains at each of its storage locations, the data set associated with all of the nodes in the network. After the operations of Block A are completed, the processor proceeds to Block B and determines whether the Maximal State Queue is empty. When the Maximal State Queue contains no maximal states, then the processor concludes that no Loophole States are present and exits the routine. So long as the Maximal State Queue contains at least one maximal state, the processor will proceed to Block D. At this Block, the processor assigns to the Current State, the maximal state in the front of the Maximal State Queue, and then removes that state from the Maximal State Queue. At Block E, the processor determines whether there is at least one Important Node defined in FIG. 13 in the Current State having a TRUE Precondition Value. If there is such an important node in the Current State, then the processor returns to Block B. If, however, there is no such Important Node in the Current State, then the processor proceeds to Block F and concludes that the Current State is a Loophole State. Thereafter, the processor exits the program.

While the routine presented in FIG. 16 provides a generalized method for finding Loophole States in a programmed conditional transition network, it is computationally expensive to carry out. A computationally more efficient, though approximate, method for finding Loophole states is shown in FIG. 17. This method involves the use of two subroutines. The Compute Narrowed Answer Set Subroutine of FIG. 17A computes a small (i.e. narrowed) set of answers that are to be tried at each node during the Approximate Loophole Search Routine of FIG. 17. The idea is to reduce the size of the search space of answer values to try and therefore to reduce execution time. The Find Extended Important Set Subroutine of FIG. 17B is used in the Approximate Loophole Search Routine in order to reduce the number of nodes to explore and therefore also to reduce execution time. Prior to describing the Approximate Loophole Search Routine, it will be appropriate to first discuss the subroutines employed therein.

The subroutine of FIG. 17A shows a way to find the "Narrowed" set of Answer values for each node. Some nodes have only a fixed set of answers. For example, a node may have a Question of the form "Which of the following U.S. states do you come from? (none, Kentucky, Tennessee, California, New York, Nevada)" For this question, the Narrowed Answer Set is exactly that fixed set. An extended optimization would cut down this set to Kentucky and one other state for the example of FIG. 22A, FIG. 22B.

Underlying the Compute Narrowed Answer Set Subroutine is the understanding that even nodes whose User-Answer comes from an infinite domain may not require testing an infinite number of Answer values. For example, suppose a node B has the question "How many people are in this room?" and is referenced only in the Precondition Expressions of nodes C and D. The Precondition of node C is (B >10) OR (B=20) and the Precondition of node D is (B >=25) AND (A=5). In this case, it suffices to test the following values of B: 10, 11, 20, 21, 24, and 25. Any other value will have the same effect on the truth or falsity of the Precondition Children of B as one of these values. Finding this set of values, called the Narrowed Answer Set, is the function of the process described in the compute Narrowed Answer Set Subroutine of FIG. 17A.

However, even if all nodes have a fixed-size Narrowed Answer Set, Loophole Analysis requires solving a difficult ("NP-complete") problem. Thus, it is desired to reduce the number of states which the loophole analysis process must to explore. We say that a state S leads to another state S' (or, equivalently, S' is derived from S), if S' is the same as S except that S' may specify answers to nodes that are unanswered in S.

The Approximate Loophole Search Routine of FIG. 17 reduces the number of States to explore by extending the set of Important nodes in the subroutine of FIG. 17B. Suppose node B is not Important, but, if its Precondition Flag is TRUE, then every one of its Answer values would make some Important node X have a Precondition Value of TRUE. In that case, node B would be called an Extended Important node. For most conditional transition networks, any legal state where an Extended Important node has a Precondition Value of TRUE can lead only to Loophole-Free states. Hence, this method reduces the work needed to be performed by the Approximate Loophole Search Routine of FIG. 17.

The main object of the Compute Narrowed Answer Set Subroutine of FIG. 17A is to find, for each node X, the set of answer values at node X which may change the Precondition Value of any descendant node. As indicated at Block A of FIG. 17A, the processor begins the subroutine by initializing the Narrowed Answer Set at node X to be the empty set. At Block B, the processor determines whether node X has an enumerated answer type (i.e. question gives a finite list of choices). If so, then at Block C the processor sets the Narrowed Answer Set equal to the choices in the finite list and then exits the subroutine. However, if node X has no such answer type, then at Block D the processor determines whether node X is referenced in a predicate of the form X<c or the form X>=c within a Precondition Expression, where c is an integer and >= is the symbol for "greater than or equal to." If node X is so referenced, then at Block E the processor inserts c and c−1 into the Narrowed Answer Set and proceeds to Block F. If node X is not referenced as such, then the processor proceeds directly to Block F. At Block F the processor determines whether node X is referenced in a predicate of the form X<=c (the symbol <=means "less than or equal to") or the form X >c within a Precondition Expression, where c is an integer. If node X is so referenced, then at Block E the processor inserts c and c+1 into the Narrowed Answer Set, and proceeds to Block H. If node X is not referenced as such, then the processor proceeds directly to Block H. At Block H, the processor determines whether the node is referenced in a predicate within a Precondition Expression of the form X=s of X !=s, where s is a string or integer and the symbol !=means "is unequal to". If node X is so referenced, then at Block I the processor inserts s and s' into the Narrowed Answer Set, where s' is different from S. Thereafter, the processor proceeds to Block J. If node X is not referenced as such, then the processor proceeds directly to Block J. At Block J, the processor determines whether any Answer Descendant of node X has Precondition Children, or whether node X is referenced together with other nodes in an algebraic expression (e.g. X+Y>5) within a Precondition Expression. If so, then at Block K the processor marks node X as being incompletely analyzed and exits the subroutine. (A node that is incompletely analyzed will not change the action of this routine, but may cause the Approximate Loophole Search Routine of FIG. 17 to miss some loopholes.) However, if the condition at Block J is not satisfied, then the processor directly exits the subroutine. The above subroutine is performed for each and every node in the conditional transition network.

As indicated in Block A of FIG. 17B, the processor begins the Compute Extended Important Set Subroutine by performing a number of preliminary operations. First, the Important Node Set is defined as either a set of nodes selected by the user or by the system itself. Second, the processor defines the Extended Important Node Set and initializes the same to be the Important Node Set. Third, the processor creates the Candidate Node Queue and then enqueues all nodes not in the Extended Important Set having non-empty Title or Question Fields. Notably, these Candidate Nodes should be enqueued in child-first order, e.g., if node X is the Precondition Child of node Y, then node X is enqueued before node Y. Such an enqueuing is possible because the acyclicity constraint ensures that no node is the Precondition Descendant of itself.

At Block B of FIG. 17B, the processor determines whether the Candidate Node Queue is empty. If it is, then the processor exits the subroutine. If the Candidate Node Queue is not empty, then the processor proceeds to Block C and performs several operations. First, the processor assigns the node in front of the Candidate Node Queue to the Current Node, and then removes that node from the Candidate Node Queue. Then, the processor creates the Current Answer Queue and enqueues all answers in the Narrowed Answer Set of the Current Node. At Block D, the processor then determines whether the Current Answer Queue is empty, and, if so, proceeds to Block E where it adds the Current Node to the Extended Important Set, and thereafter returns to Block B. However, if the Current Answer Queue is not empty, then at Block F the processor assigns the Answer Value in the front of the Current Answer Queue to Current Answer and removes that value from the Current Answer Queue, and then proceeds to Block G. At this Block, the processor tests the following question: if the Current Answer were the Qualified Answer of the Current Node, would some node X in the Extended Important Set have a Precondition Value True after the Propagate Qualified Answer Routine is called on the Current Node, regardless of the values of the Qualified Answers of the other Precondition Parents of node X? If the answer to the question is yes, the processor returns to Block D, and if not, returns to Block B, as shown. Returning to Block B indicates that the Current Node is not Extended Important.

As shown in FIG. 17, the processor begins the Approximate Loophole Search Routine by performing a number of preliminary operations. As indicated at Block A of FIG. 17, the user selects the Important Node Set, or if desired, the processor may carry out this process as hereinbefore described. Then, the processor computes the Narrowed Answer Set of each node using the subroutine of FIG. 17A, and thereafter computes the Extended Important Node Set using the subroutine of FIG. 17B. As indicated in Block A, the processor then creates the States To Try Queue and enqueues the current state P on that queue, and sets all Delay and Delay Remaining Fields to 0. The initialization operation in Block A involves initializing the States Tried Set to the empty set.

After the operations in Block A of FIG. 17 have been completed, the processor proceeds to Block B and determines whether the States To Try Queue is empty. If it is, then the processor advances to Block C and displays to the user that no loopholes exist and then exits the routine without changing the current state of the network. However, if the States To Try Queue is not empty, then the processor proceeds to Block D and removes a State from the front of the States To Try Queue and assigns it to the Current State. Then the processor inserts the Current State into the States Tried Set. At Block E, the processor determines whether the Current State has an Extended Important node having a Precondition Value Field of TRUE. (This indicates that states derived from the Current State are unlikely to have loopholes, so the search path starting from the Current State need not be explored.) If so, then the processor returns to Block B, as shown. If the Current State does not have such a node, then the processor proceeds to Block F. At this Block, the processor determines whether the Current State is a Maximal State (i.e. every answerable node has been assigned an answer), or whether all nodes in the Important Node Set have a Precondition Value Field Set of FALSE. If the conditions at Block F are satisfied, then the processor proceeds to Block G, displays to the user that the Current State is a Loophole State, and then exits the Routine. However, if the conditions at Block F are not satisfied, then at Block H the processor first considers a state X that can be derived from the Current State as a result of assigning a value from the Narrowed Answer Set to the Answer Field of some answerable node in the Current State that is not answered in state P (defined in block A as the state of the network when Loophole Analysis is invoked). Then the processor determines if state X is not in the States Tried Set. This test can be done efficiently by hash-encoding each state and comparing those encodings. Then, the processor enqueues state X onto the States to Try Queue. This procedure is performed for all such States that can be derived from the Current State as the result of assigning a value to the Answer Field of some answerable but unanswered node having a TRUE Precondition Flag from that node's Narrowed Answer Set. Thereafter, the processor returns to Block B.

Figure 18:
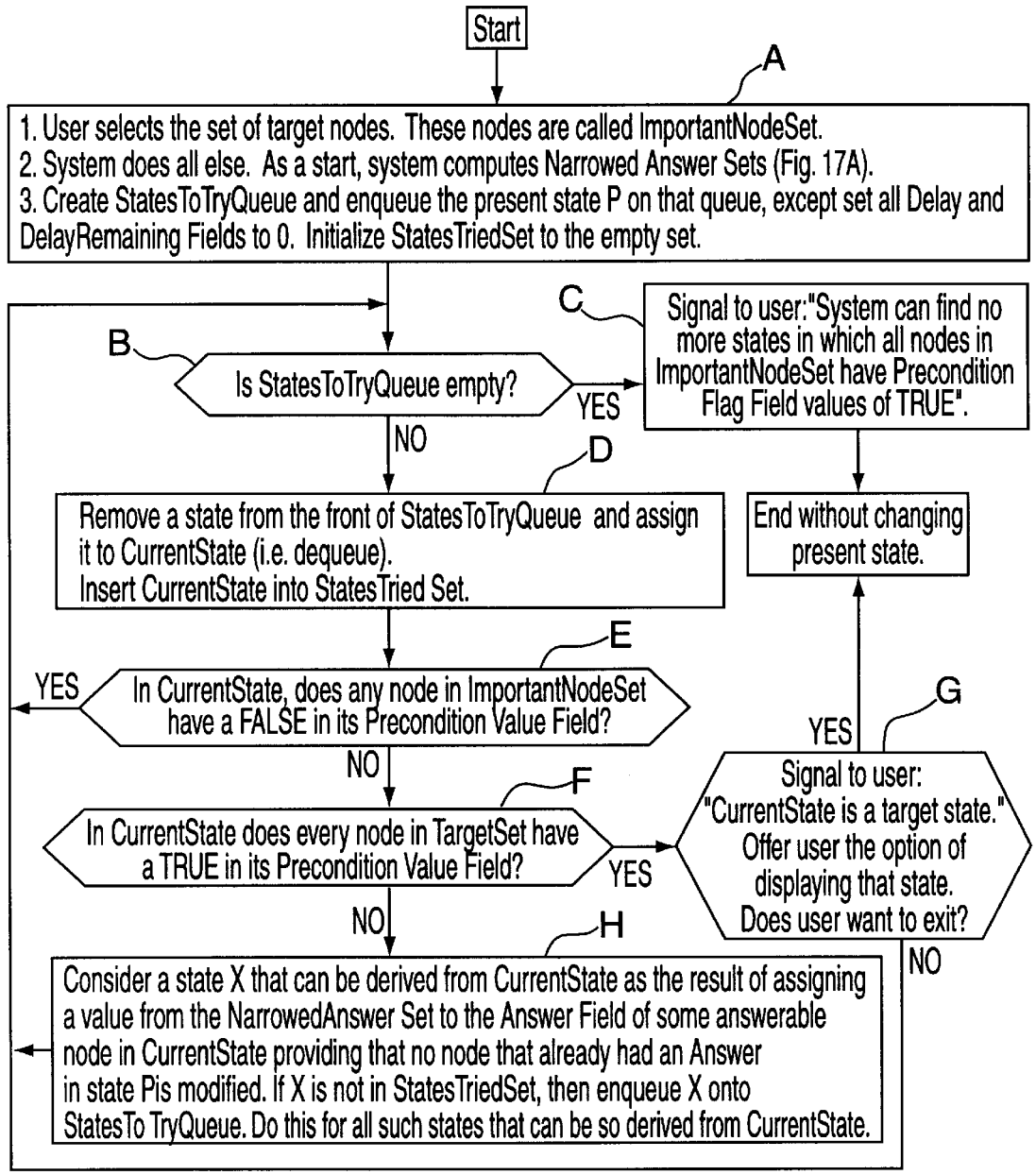
FIG. 18 is a high level flow chart illustrating the steps performed by the Approximate Target State Search Routine.

The Approximate Target Seeking Routine of FIG. 18 searches for target states. In many applications, these are desirable states and target-seeking indicates which answers lead to such states. However, the method may not find a target state when there are nodes in the network that the routine of FIG. 17A has marked as incomplete. It may also miss target states because it does not explore states derived from S if S contains a Target Node with a Precondition Value of FALSE. Failing to explore such nodes may cause Target-Seeking to miss a target state, because a Target Node may have a strange Precondition such as A !=POSSIBLE. It is in this sense that the routine of FIG. 18 is "approximate."

The computational process underlying the Approximate Target Analysis Routine is shown in FIG. 18. Notably, the Approximate Target Analysis Routine employs the Compute Narrowed Answer Set Subroutine of FIG. 17A described above; and shares some computational advantages with the Approximate Loophole Analysis Routine. As indicated at Block A of FIG. 18, the processor begins the Approximate Target Analysis Routine by performing a number of preliminary operations. First, the user selects the set of target nodes, which normally represent the desired conclusions or outcomes, to which the sought after answers to questions in the network logically lead. These selected nodes are called the Important Node Set. Notably, for target-seeking, no system default has been chosen for the selection of the Important Node Set, as such a default would make little sense for the applications we have examined. The processor then computes the Narrowed Answer Set of each node in the network using the Compute Narrow Answer Set Routine of FIG. 17A. Thereafter, the processor creates the States To Try Queue and then enqueues the present state P on that queue but with all Delay and Delay Remaining Fields set to 0. State P is the state of the network when the Target-Analysis routine is invoked. Finally, the processor initializes the States Tried Set to the empty set.

Having completed the preliminary operations of Block A, the processor proceeds to Block B and determines whether the States to Try Queue is empty. If it is empty, then at Block C the processor displays to the user that the system can find no more states in which all nodes in the Important Node Set have Precondition Flag Field Values of TRUE, and then exits the routine without changing the present set of the network. As this is the first visit to Block B, the branch to Block D will not occur, but may occur later. However, so long as the States To Try Queue is not empty, the processor proceeds to Block D. At this Block, the processor removes a state from the front of the States to Try Queue and assigns it to Current State. Then, the processor inserts the Current State into the States Tried Set. At Block E, the processor determines whether, in the current State, any node in the Important Node Set has a FALSE value in its Precondition Value Field. If the Important Node Set has such a node, then the processor returns to Block B. This indicates that no state derived from the Current State is likely to be a target state, i.e., one in which all Important Nodes have Precondition Value TRUE. If no such node is in the Important Node Set, then the processor proceeds to Block F and determines whether, in the current state, every node in the Target Set has a TRUE value in its Precondition Value Field. If every such node has a TRUE Precondition Value, then the processor proceeds to Block G and displays to the user that the current state is a target state. At Block G, the system asks the user whether the system should display the target state. After the user has viewed the target state (and perhaps saved it, though this detail is not shown in FIG. 18), the system queries whether the user wants to exit target-seeking. If the user does not request to exit, then the processor returns to Block B. If at Block F the processor determines that in the Current State not every node in the Target Set has a TRUE Precondition Value, then the processor proceeds to Block H. At this Block, the processor considers a state X that can be derived from the Current State as the result of assigning a value from the Narrowed Answer Set to the Answer Field of some answerable node in the current state provided that no node that already had an Answer in State P is modified. Then, if the processor determines that state X is not in the States Tried Set, then the processor enqueues state X onto the States to Try Queue. The operational procedure of Block H is performed for all such states that can be derived from the current state. This procedure is performed for all such States that can be derived from the Current State as the result of assigning a value to the Answer Field of some answerable but unanswered node from that node's Narrowed Answer Set where that node has a TRUE Precondition Flag. After Block H is completed, the processor returns to Block B.

Figure 19:
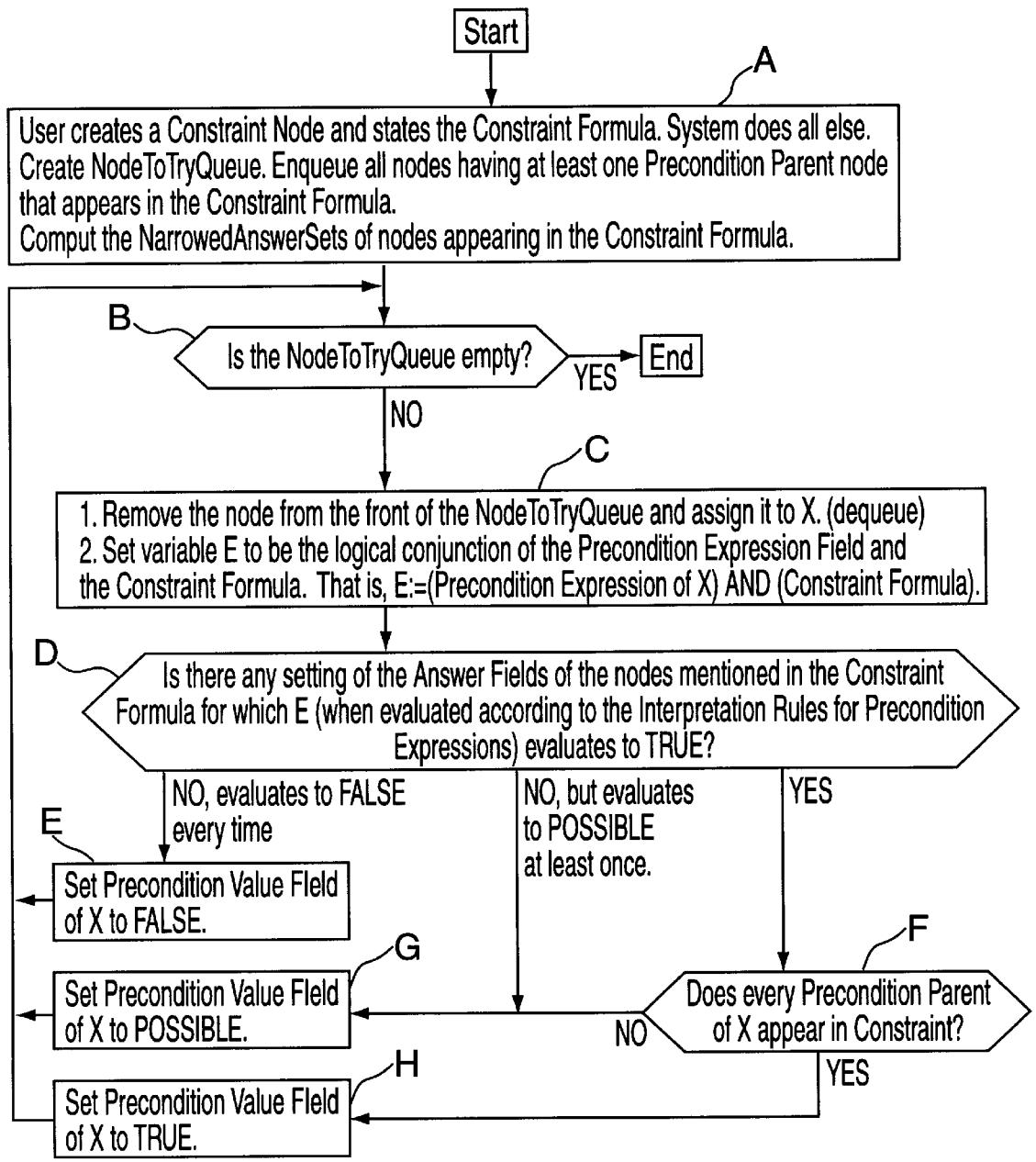
FIG. 19 is a high level flow chart illustrating the steps performed by the Approximate Constraint Evaluation Routine.

In the event that a conditional transition network has a constraint node with a constraint formula, the Approximate Constraint Evaluation Routine of FIG. 19 can be used to evaluate each such constraint node. As indicated at Block A of FIG. 19, the processor begins the Approximate Constraint Evaluation Routine by determining whether the user has created a constraint node in the network and formulated a constraint formula therein. If so, the processor creates the Node to Try Queue and then enqueues all nodes having at least one Precondition Parent Node that appears in the Constraint Formula. Then, the processor uses the Compute Narrowed Answer Set Routine of FIG. 17A in order to compute the Narrowed Answer Set of all nodes appearing in the Constraint Formula. After the preliminary operations of Block A have been completed, the processor proceeds to Block B and determines whether the Node To Try Queue is empty. If the Node to Try Queue is empty, the processor exits the routine. However, so long as the Node To Try Queue contains at least one node, the processor proceeds to Block C and performs the following operations. First, the processor removes the node from the front of the Node To Try Queue and assigns it the label X. Then the processor sets the Variable E to be the logical conjunction of the Precondition Expression Field of X and the Constraint Formula, i.e. E:=(Precondition Expressions of Node X) and (Constraint Formula). Proceeding to Block D, the processor determines whether there is any setting of the Answer Field values for the nodes mentioned in the Constraint Formula, which makes variable E evaluate to TRUE when variable E is evaluated according to the Interpretation Rules for Precondition Expressions. Possible settings come from the Narrowed Answer Sets of the nodes in question. If every such setting causes E to evaluate to FALSE, the processor proceeds to Block E, sets the Precondition Value Field of Node X to FALSE, and then returns to Block B. Otherwise, if some settings cause E to evaluate to POSSIBLE but none cause E to evaluate to TRUE, then the processor proceeds to Block G and sets the Precondition Value Field of Node X to Possible, and then returns to Block B. If the processor determines that there are Answer Field Values which satisfy the condition at Block D, then the processor proceeds to Block F and determines whether every Precondition Parent of Node X appears in the Constraint Formula. If not, then the processor proceeds to Block G, sets the Precondition Value Field of Node X to POSSIBLE and returns to Block B. However, if every Precondition Parent of Node X appears in the Constraint Formula, then the processor proceeds to Block H, sets the Precondition Value Field of node X to TRUE and then returns to Block B. After the Routine is completed, all nodes whose Precondition Flag changes will be the starting nodes for the Propagate Qualified Answer Routine of FIG. 12.

The computational process underlying the various operational procedures of the present invention have been described in great detail above. For a more complete understanding of the advantages and capabilities of the computer-based system of the present invention, it will be helpful to provide several examples of these capabilities in order to illustrate how these operational procedures can be used to process data contained within a conditional transition network during various modes of system operation. These examples will now be described with reference to the interactive process of FIG. 5A, and the display screens and internal data representations of FIGS. 20A through 24. A simple example of traversing through Blocks A, B, C, D, B of the interactive process of FIG. 5A will be described with reference to FIGS. 20A through 20I. FIGS. 20A and 20B illustrate the visual display of a conditional transition network in two different display formats. In FIG. 20A, solid arrows are induced by Precondition Expressions and dashed arrows are induced by Answer Fields. FIG. 20B shows a spreadsheet-like display format without arrows. FIG. 20C is a schematic representation of an internal state of the conditional transition network shown in FIGS. 20A and 20B. In this example, nodes entitled "Gross Income", "Exemptions" and "Married" have an empty Precondition Field and hence have TRUE Precondition Values and TRUE Precondition Flags. Such nodes have the display label "CanAnswer" since they each have a TRUE Precondition Flag, have either Answer Children or Precondition Children or both, and are unanswered. As shown, all Delay Field values are 0 so that the Precondition Flag is the same as the Precondition Value in all nodes and all states. Since none of the Answer Fields of these three nodes have been specified, the Answer Value is POSSIBLE in all cases. This implies that the Precondition Values of the nodes entitled "Net Income", "Pay Taxes" and "Pay Nothing" are also POSSIBLE as is the Answer Field of the Net Income node.

Figure 20D:
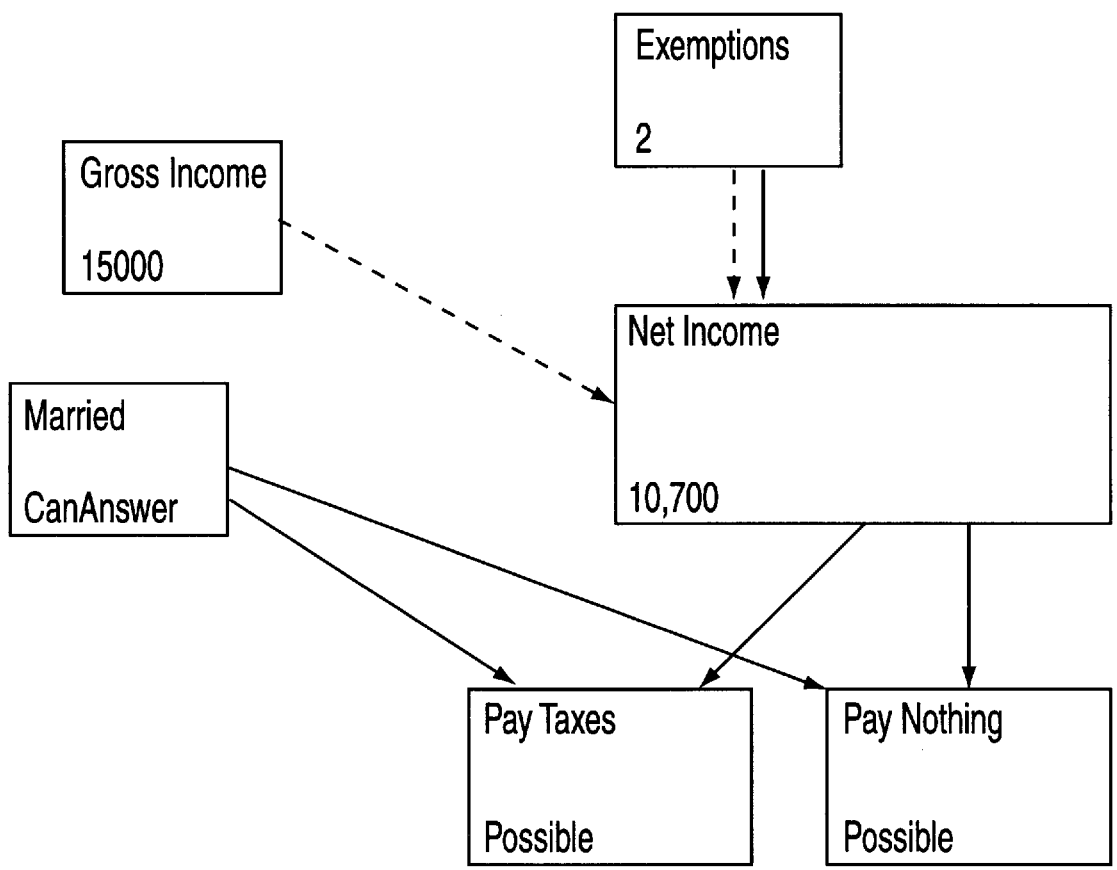
Figure 20F:
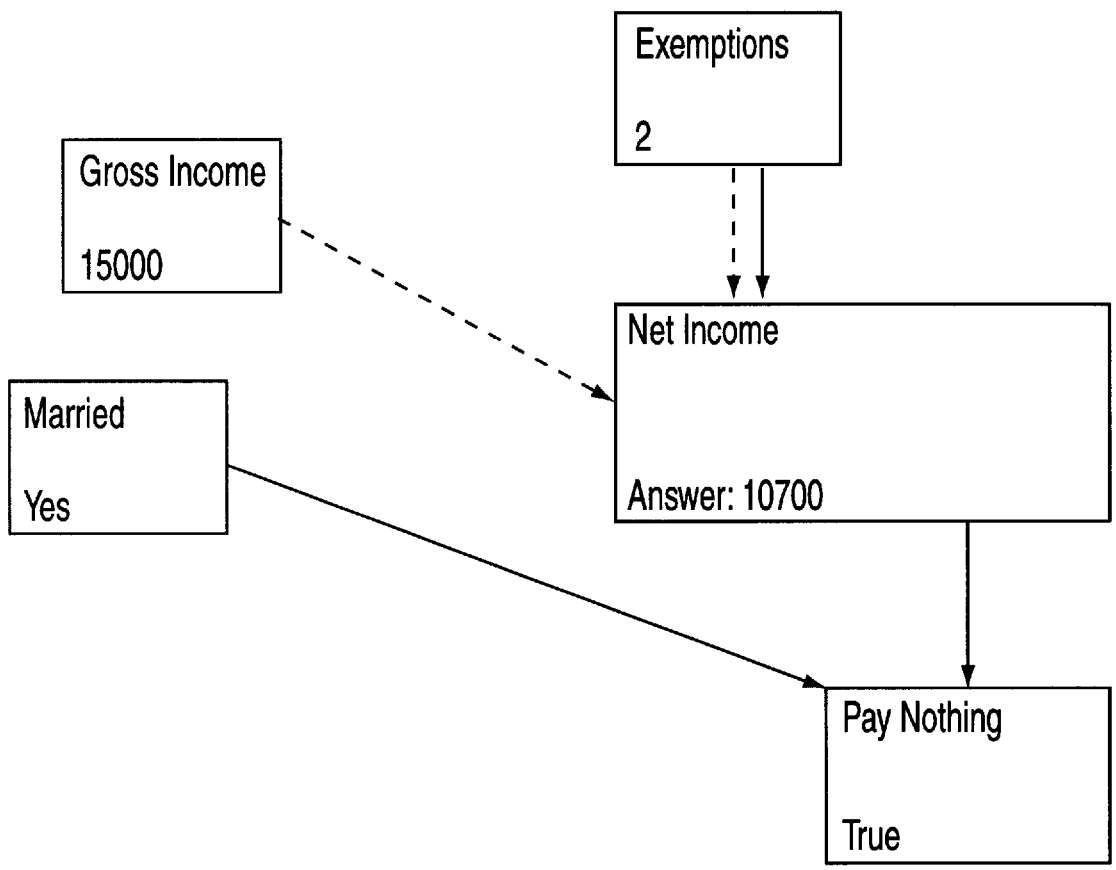
Figure 20H:
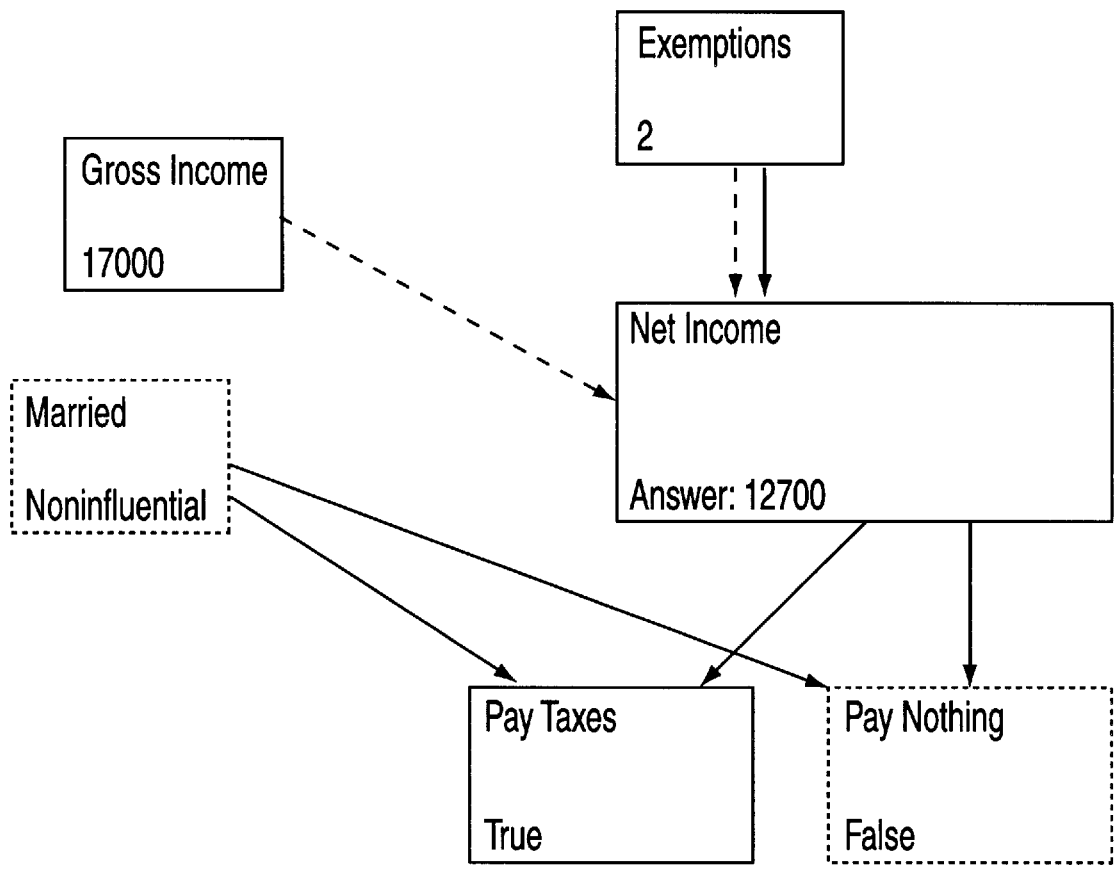

FIGS. 20D and 20E show the state of the network after the reader has selected and specified, at Block C in FIG. C, Answer Values for the Gross Income and Exemptions nodes (in either order). The Answer in the Net Income node is based on a calculation of Gross Income−2150 * Exemptions, just as in a conventional spreadsheet. As the specification of Gross Income is not sufficient to determine whether conclusion nodes entitled "Pay Taxes" or "Pay Nothing" should be TRUE or FALSE, the node entitled "Married" is still marked "CanAnswer".

FIGS. 20F and 20G show the state of the network after the Married node is answered in the affirmative from the state in FIG. 20D. Pay Nothing conclusion node has TRUE in Precondition Value and Precondition Flag Fields. The node entitled Pay Taxes is not displayed because its Precondition Flag is FALSE.

FIGS. 20H and 20I shows the state of the network after the reader has selected and specified slightly different Answer values for the query nodes entitled "Gross Income" and "Exemptions". The query node entitled "Married" is unanswered, but in fact its answer would not make any difference, so it is marked "Noninfluential". FIG. 20H shows the display of the network that the writer would see. In reader mode, the nodes labeled Noninfluential and FALSE would not be displayed at all.

Referring to Blocks A, B, C, E, and F in FIG. 5A and to FIGS. 21A through 21H, a simple example of how to use the Global Clock and Delay Fields of the Conditional Transition Network will be given.

For some applications such as scheduling, it is useful to incorporate a notion of "task" into the conditional transition network. Each such task may take some time period to complete. This time period can be represented by the Delay Field of the nodes in the network. When a node B has a positive Delay value, its Precondition Value is not always the same as its Precondition Flag. Suppose the Delay value of node B is k. As explained in FIG. 7, the Precondition Flag of node B is the same as the Precondition Value when the latter is FALSE or POSSIBLE. For the Precondition Flag to become TRUE, the Precondition Value must have had a TRUE value during the last k clock ticks of the Global Clock.

The representation of time advancement occurs by the process performed by the Advance Global Clock Routine of FIG. 15. As previously discussed, this Routine changes a field called HowLongTrue, which is initialized to 0 in each node whenever a conditional transition network is initialized. The routine also changes a field called Delay Remaining which is initialized to the value of Delay in each node each time a conditional transition network is initialized. Each time the Global Clock is advanced, HowLongTrue is incremented by one for all those nodes whose Precondition Value is TRUE. At the same time, the Delay Remaining Field of each node is decremented by one unless it already has the value 0, in which case it stays at 0. Some nodes will have HowLongTrue Field equal to their Delay Field value (and Delay Remaining Field equal to 0). These nodes are referred to as candidate nodes. Some of these nodes will have their Precondition Flag set to TRUE. To determine which of these nodes will have their Precondition Flag set to TRUE, the Advance Global Clock Routine, executed at Block F in FIG. SA and in FIG. 15, sets up the Candidate Queue in parent-to-child order, i.e. Precondition and Ancestor parent before child. This ensures that if a node B has an ancestor whose Qualified Answer may change as a result of advancing the Global Clock, then the Precondition Value of node B will reflect that change before the Precondition Flag of node B changes value. As indicated at Block H in FIG. 15, each time the Advance Global Clock Routine changes a Precondition Flag value, it calls the Propagate Qualified Answer Routine of FIG. 12 in order to force the recomputation of Precondition Values at Descendent nodes in the network. Notably, it is possible for a node X to be the Precondition Parent or Answer Parent of another node Y in the Candidate Queue.

Figure 21A:
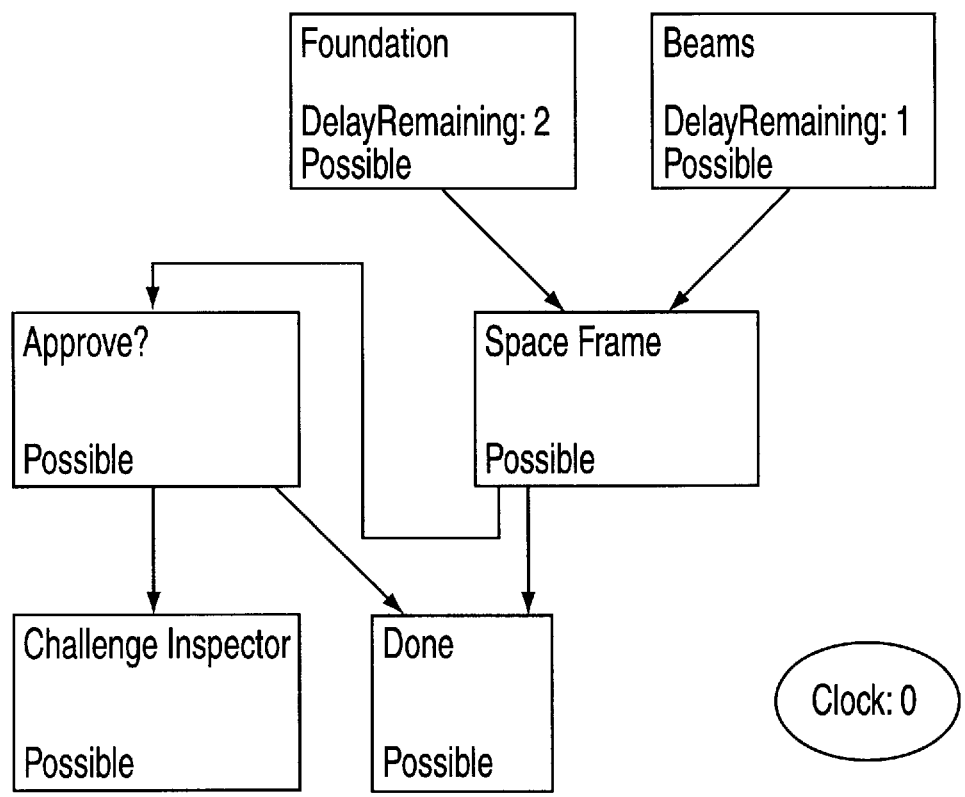
Figure 21C:
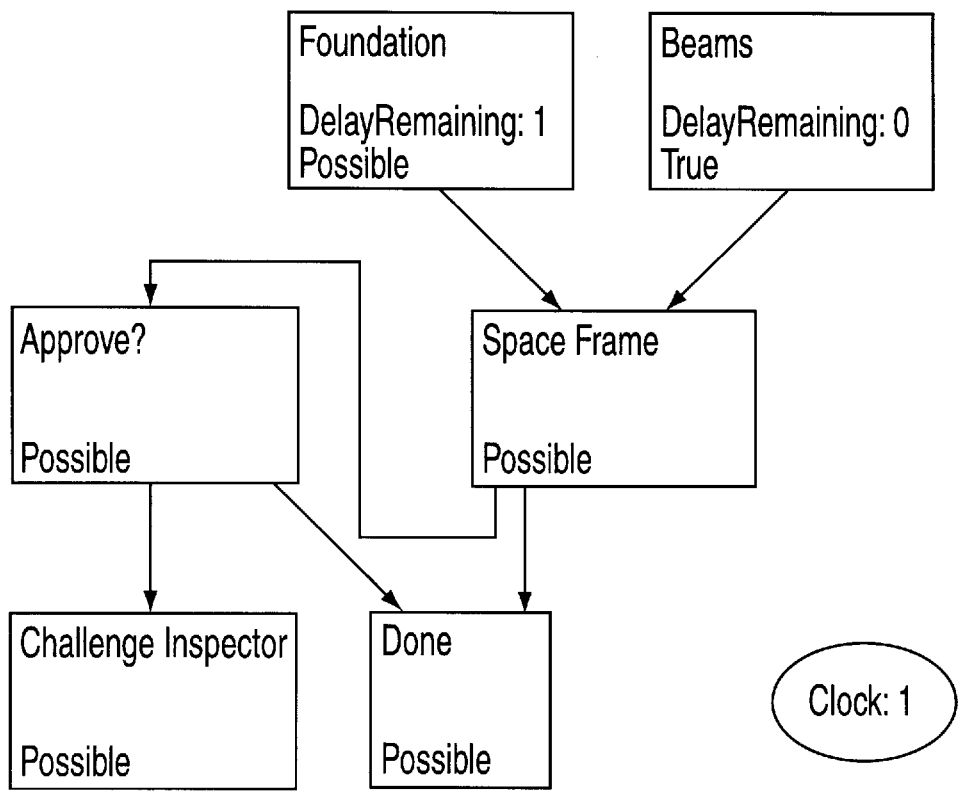
Figure 21D:
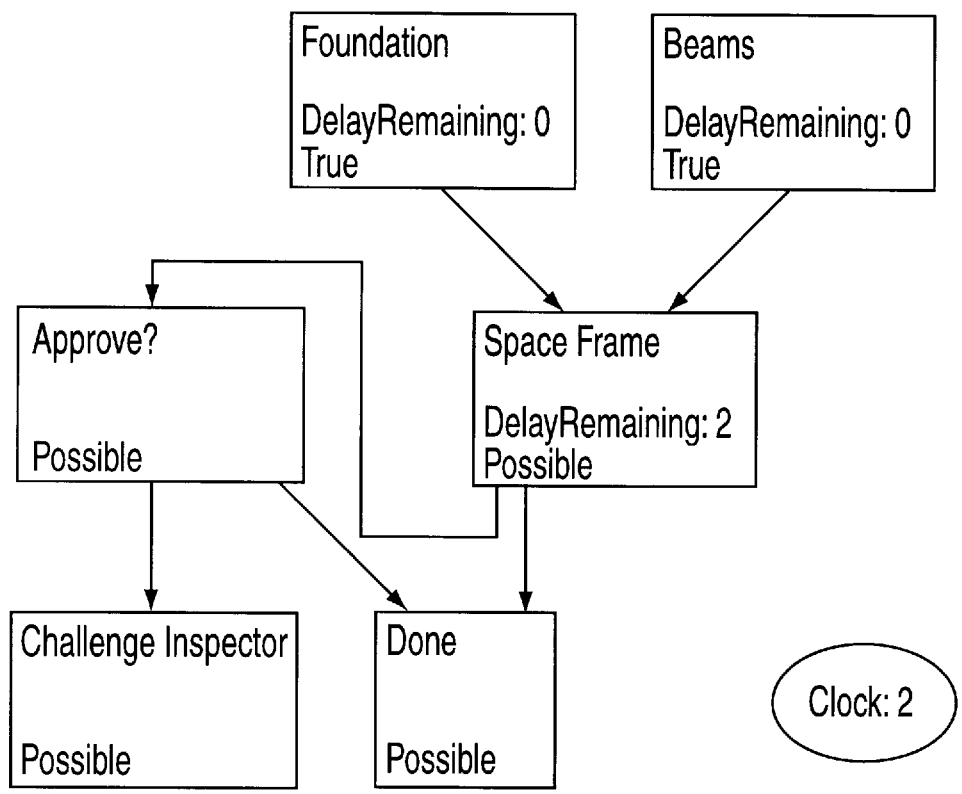
Figure 21E:
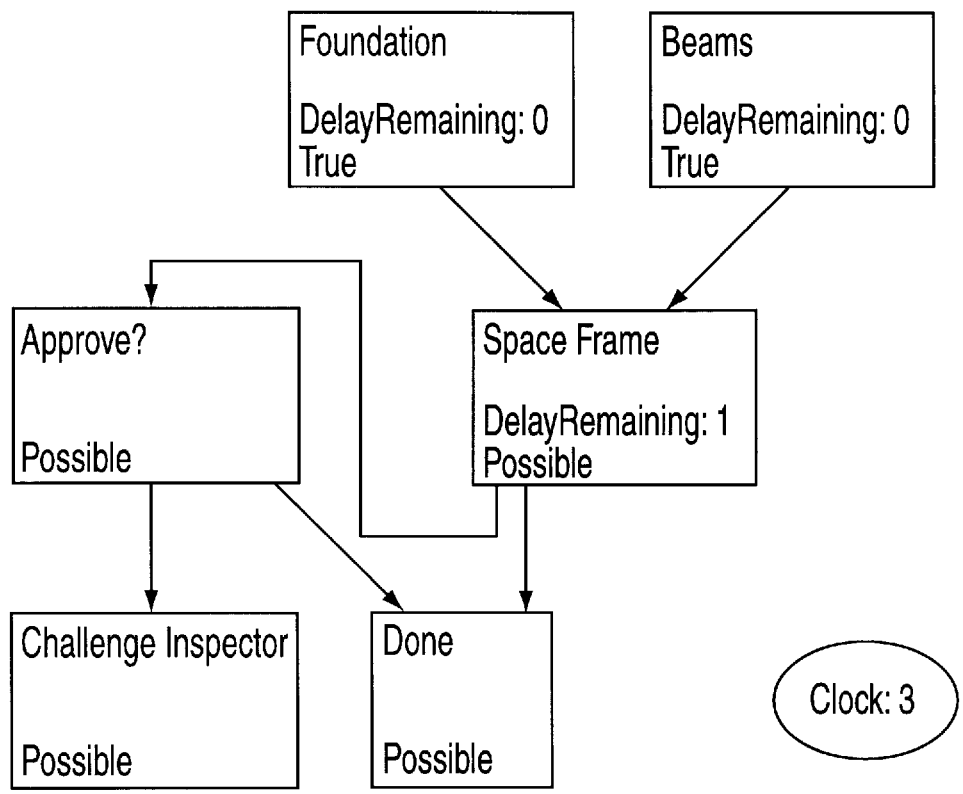
Figure 21F:
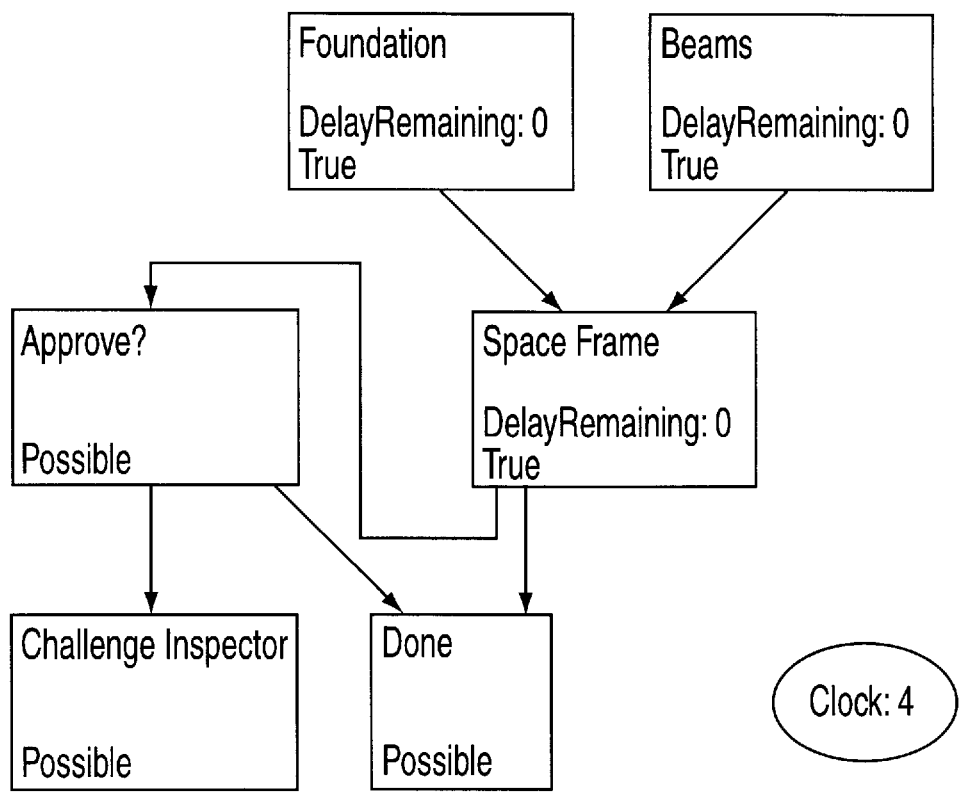
Figure 21G:
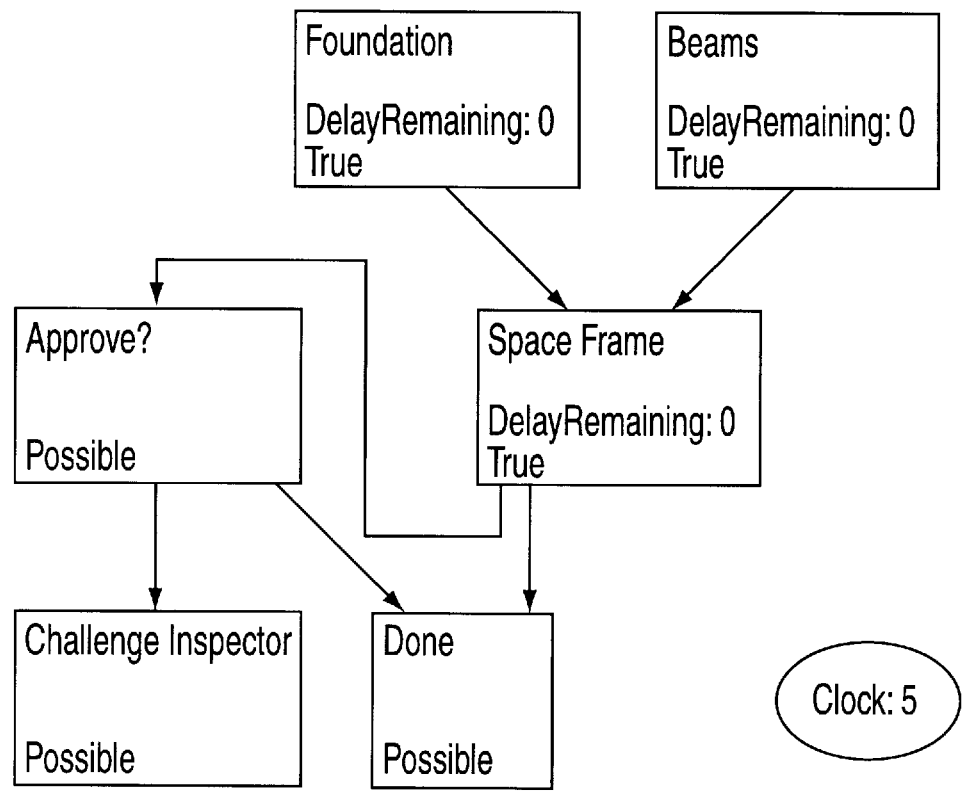
Figure 21H:
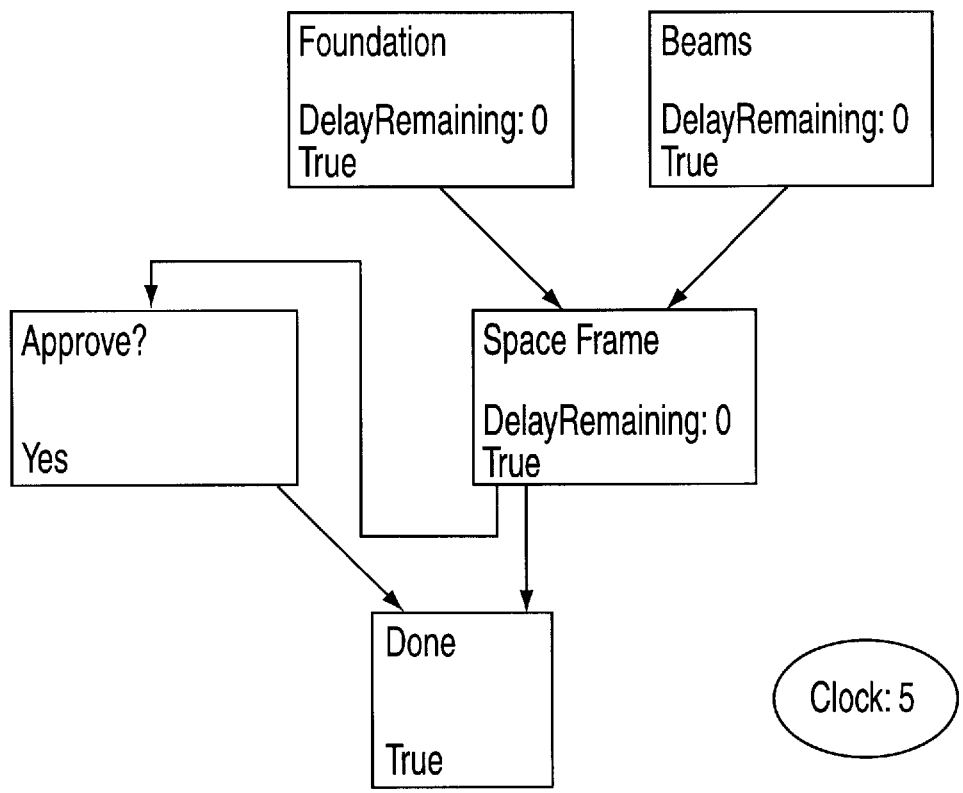

FIG. 21A shows the display of a network representing a construction project schedule at the beginning of the project, i.e. Global Clock has value 0. FIG. 21B shows the internal state of the network displayed in FIG. 21A. When the Global Clock is advanced to 1, as shown in FIG. 21C, the node entitled "Beams" has had its Precondition Flag set TRUE, but no other node has its Precondition Flag affected. When the Global Clock is advanced to 2 as shown in 21D, "Foundation" also has a TRUE Precondition Flag. As the Answer of both of these nodes is by default TRUE because they are of type No-Answer, the Qualified Answer in both case becomes TRUE. Notably, the initial value of the Answer Field of the query node entitled "Approve?" is POSSIBLE, because its Question Field is not empty. Advancing the Global Clock to 3, as shown in FIG. 21E, changes only the Delay Remaining Field of the Space Frame node. When the Global Clock is advanced to 4, as shown in FIG. 21F, the project is complete pending the inspector's approval. The network display in FIG. 21G shows that the Global Clock can advance without changing the visible or internal state of any node. Finally, the network displayed at FIG. 21H shows what happens when the inspector grants his or her approval. Notably, in the present example, conclusion node entitled "Done" illustrates how it is possible to combine predicates that refer to other nodes (e.g., Approve?=

"Yes") and predicates induced by advancing the Global Clock (i.e., Space Frame=TRUE) within a Precondition Expression.

Referring to FIGS. 5A and 22A through 22C, it will be shown how the use of the Approximate Loophole Analysis Routine of FIG. 17 can detect a loophole state in which a wealthy Kentucky horse breeder is neither required to pay taxes to the government nor entitled to a tax refund.

Figure 22C:
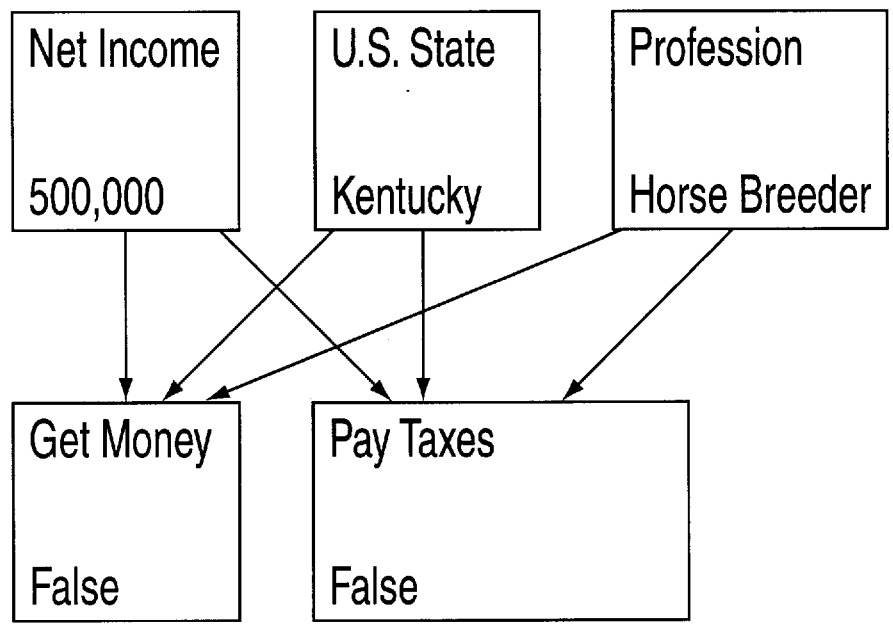

FIG. 22A shows a displayed network programmed for tax liability analysis. As shown in the internal state diagram of FIG. 22B, the query and outcome nodes in the network have been formulated for illustration purposes so that if a horse breeder from Kentucky with a net income of $500,000 answered all of the query nodes in the network (to provide a maximal state), then neither of the conclusion nodes would result in TRUE Precondition Values, as shown in FIG. 22C. The consequence of this is that the Kentucky horse breeder with a net income of $500,000 would neither be required to pay taxes nor be entitled to a tax refund. This state is a loophole state that is a maximal state in which no important nodes have a TRUE Precondition Value. In most Applications, the existence of such a state represents a problem with the specification of the application. That is the case for a tax law that permits a high income earner to pay no taxes, whereas someone who earns less pays taxes. The writer of this conditional transition network can easily detect such loophole states by requesting that the system executed the Approximate Loophole Analysis Routine at Block G of FIG. 5A.

Figure 23A:
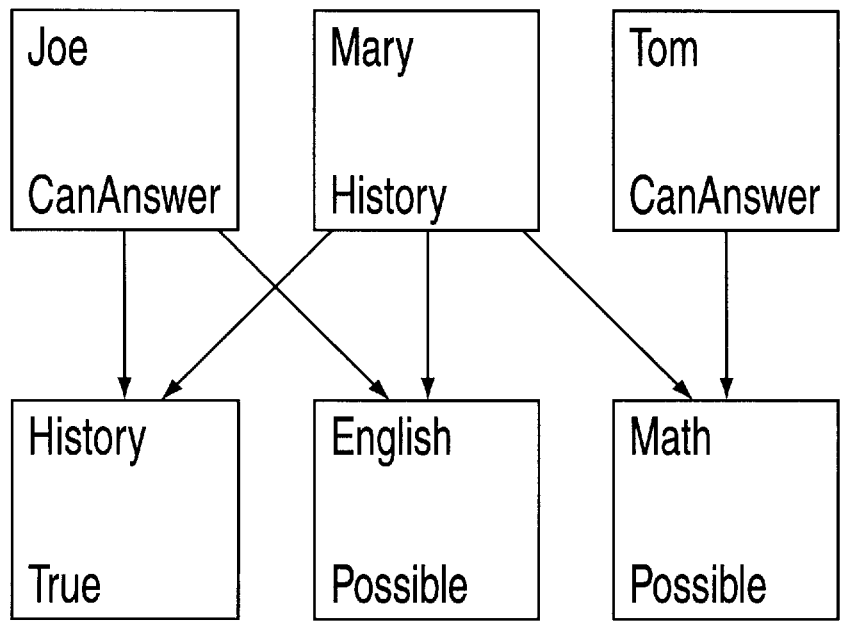
Figure 23C:
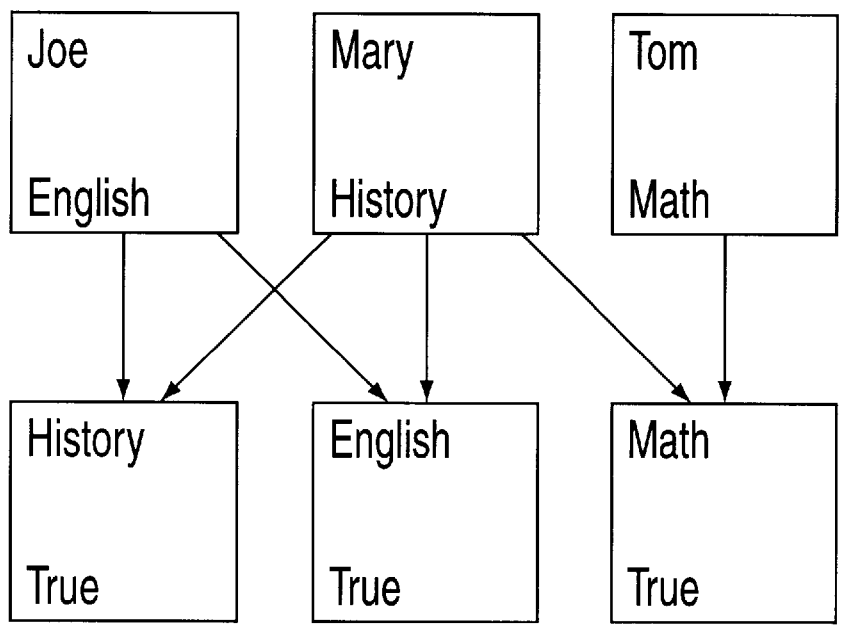

Target-seeking tries to find a state derived from a current state that makes all Important nodes have a Precondition Value of TRUE. For example, FIG. 23A shows a displayed network in which the Important Nodes are those entitled History, English and Math. The problem presented might be to assign Joe, Mary and Tom to teach the various courses such that the Precondition Values of the nodes entitled History, English and Math are each TRUE. The target-seeking capability of the present invention can find such an assignment if there is one. Thus, in most applications, finding a target state is good news for the user.

The full description of the starting state shown in FIG. 23A is given in 23B. The target-analysis routine of FIG. 18 would discover the target state of FIG. 23C. As shown, a satisfying assignment for this example consistent with the starting state is for Joe to teach English, Mary to teach History, and Tom to teach Math. Such an assignment satisfies the Precondition Expressions of the three Important nodes.

Figure 24:
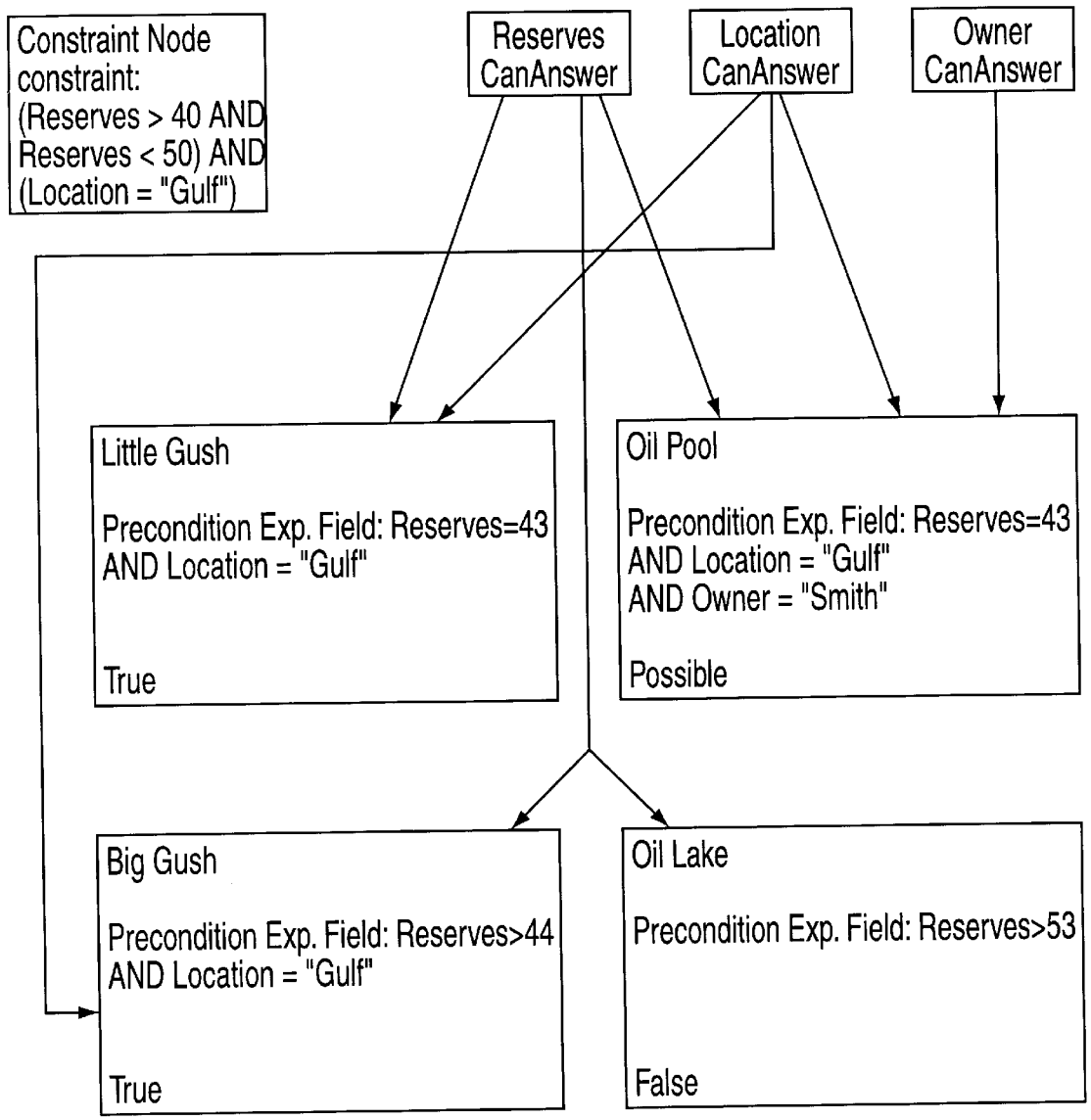
FIG. 24 is a schematic representation of a conditional transition network having a constraint node.

Referring to FIGS. 5A and 24, an example of evaluating a constraint node in a network will be described. As shown in FIG. 24, a Constraint has the same syntax as a Precondition Expression. In the state when a Constraint is issued, (i) every node referred to by the Constraint node (its Constraint Parents) must be an answerable node (i.e., have a non-empty Question field) that has not been answered; (ii) the Constraint Parents must have TRUE Precondition Flags. Such nodes will have "CanAnswer" in the Display Field.

Once a constraint node is established in a conditional transition network, as shown in FIG. 24, any modification to the Qualified Answers of the Constraint Parents will cause the Constraint node to become blank and to have no effect as rules (i) and (ii) of the previous paragraph will no longer be satisfied. By definition, Constraint Children are defined as the set of nodes that are Precondition Children of the Constraint Parents. FIG. 24 shows the Precondition Expressions of the four Constraint children for illustrative purposes only. They would not in fact appear in a reader display.

A Constraint affects the Constraint Children as described in the Routine of FIG. 19. According to this Routine, for each Constraint Child node B having Precondition Expression Pre_B, the routine creates a new expression E by putting an AND between Pre_B and the Constraint, i.e. E=(Pre_B) AND (Constraint). Then the routine determines whether there is a state of the network derived from the current state in which E has a value of TRUE. If every such state causes expression E to be FALSE, then the Precondition Value of node B is set to FALSE (e.g., node entitled Oil Lake). If there is a state where E is TRUE and if the Constraint refers to every Unanswered node among the Precondition Parents of node B, then the Precondition Value of node B becomes TRUE (i.e. nodes entitled "Little Gush" and "Big Gush"). If there is such a state, but there is at least one Unanswered Precondition Parent of node B to which the Constraint does not refer, then the Precondition Value of node B becomes POSSIBLE (e.g. node entitled Oil Pool).

A special predicate function is available to a Constraint node called the Information Retrieval predicate or IR predicate for short. The syntax is IR(fragment 1, fragment 2, . . . ) where each fragment is either a word or part of a word. When applied to a node B, the IR predicate returns TRUE, if the contents of B contain all the fragments identified as arguments; FALSE if the contents of B contain none of the fragments identified as arguments; and POSSIBLE otherwise. Other predicates on the contents of node B may also be added.

Notably, Constraints are similar to Answers in that they affect Precondition Values, but their behavior is quite different. First, Constraints impose restrictions on the Answers of other nodes. Second, two nodes that have mutually exclusive Preconditions may both have Precondition Values of TRUE because Constraints may specify a set of values as opposed to simply a single value. This is the case, for example, for nodes entitled "Little Gush" and "Big Gush" in FIG. 24.

Constraints are inspired by relational database query qualifications. The Precondition Expression of each node in the network either satisfies or fails to satisfy the Constraint, much as records may satisfy or fail to satisfy a query's qualification. If a node's Precondition Expression satisfies the Constraint, then the node's Precondition value will become TRUE or POSSIBLE. In the case of a relational database, no distinction would be made between TRUE and POSSIBLE. The distinction is important in the case of a conditional transition network, because the reader may specify an Answer to a Question not mentioned in the Constraint and that Answer may cause a node having a POSSIBLE Precondition Value to have a FALSE Precondition Value. This distinction is not present in prior art database systems.

Constraints are also different than database queries in that the Precondition Expression of a node may contain inequalities as in the case of "Big Gush" and "Oil Lake" nodes in FIG. 23. In prior art databases, each field may consist of at most a set of values, but may not itself contain an inequality expression (e.g. Reserves>44).

The present invention has been described as if a human being were its only possible writer. However, it is possible for a programmed processor to update all of the fields as a writer, and for a second programmed processor to update the Answers as a reader. Certain aspects of the graphical interface would no longer be needed, but the logic of interaction would remain substantially the same.

The Precondition Expressions and Answer Fields of the conditional transition network of the present invention can be expressed using a variety of linguistic constructs. In the illustrative embodiment, the computer-based system employs a linguistic construct in which the Precondition Expressions evaluate to an Extended Boolean value and the Answer Fields evaluate either to an Extended Boolean value or to a value of some other domain. A particular domain of interest is a set of elements, which will be discussed below.

In the case of a set of elements, the language of Precondition Expressions would extend to first order predicate calculus with equality, aggregates, and arithmetic. A typical expression might be (x|Sailboardowner(x) AND there exists y such that Married(x, y) AND (Juggler(y) OR Dancer(y))). This denotes the set of people who own sailboards and are married to someone who either juggles or dances. Such an expression may be an answer expression. The sets SailboardOwner, Married, Juggler, and Dancer may come from a node within a conditional transition network or from some external database. Within a precondition, we might test this set for equality with the empty set or ask whether the number of such individuals is greater than 15. Since some values may be Extended Booleans, it will be helpful to discuss how they are to be treated. Implicitly, predicates such as this construct sets of x values that are true in the given environment. However, it is desired to allow for an extension to this language, namely: to allow the user to write (POSS_OR_TRUE(x, y) AND (Juggler(y) OR Dancer(y))). In such a case, if an element "Bob" is married to Alice and Alice may be a juggler or a dancer, then Bob would be part of the resultant set.

A typical application of such a language extension is "data-mining". Suppose a store is deciding whether to place lipstick near soda or lipstick near diapers. Each checkout bill is given an identifier in some external database and contains purchase data. Suppose the database contains predicates Diapers, Lipstick, and Soda, each of which identifies the checkout bills that included the respective items. In such an application, a node with precondition count ((x|Diapers (x) AND Lipstick(x)})>count ((x|Soda(x) AND Lipstick (x)}) might have the contents: "Put lipstick near diapers." On the other hand, a node with precondition count ((x|Diapers (x) AND Lipstick(x)})<count ((x|Soda (x) AND Lipstick (x)}) might have the contents "Put lipstick near soda."

Even without extending the expression language to handle multi-valued structures, conditional transition networks can handle a file of inputs and produce a file of outputs. This will suffice for many purposes and may be simpler to use. The mechanism to do this is called the CTN-file interface. The CTN-File interface specifies as input a conditional transition network identifier and two files: the Infile, described in the next paragraph, and the FormatFile, a single line of node titles The InFile consists of a sequence of records, separated by newline characters. A typical record may have the format nodeid: value, nodeid: value, . . . , clockadvance, . . . nodeid: value. In Backus-Naur, the format can be described as:

record ::=actionspec newline newline ::=carriage return character actionspec ::=action ¦¦ action ',' actionspec action ::=nodeid ':' value ¦¦ clockadvance clockadvance ::=advance the global clock by one time unit nodeid ::=some means of identifying a node, either by its identifier or by its title value ::=an answer value Each record is processed left-to-right. When a "clockadvance" action is encountered, the system executes the Advance Global Clock routine of FIG. 15. When a nodeid:value action is encountered, the system updates the answer field of nodeid with value and then executes the Update Answer/Qualified Answer Field Routine of FIG. 10 with nodeid as its argument. After the last action (either a clockadvance or nodeid:value) of a record is encountered and the last routine is applied, an output record is created according to the FormatFile. For each node in the format file from left to right, the node Title and its Display Field are printed to OutFile. When this is complete, the next record in InFile is processed.

To make this description concrete, reference will be made to the simplified tax scenario of FIG. 20. The FormatFile of this particular application consists of Married, Net Income, Pay Taxes, Pay Nothing. Those are the four nodes of interest. Suppose that InFile consists of three records:

record 1: Exemptions: 2, Gross Income: 50000 record 2: Gross Income: 5000, Married: Yes, Exemptions: 0 record 3: Exemptions: 1, Gross Income: 12000

Then output file will also consist of three records, corresponding to the application of each of these records to an initial state:

record 1: Married: Noninfluential, Net Income: 45700, Pay Taxes: True, Pay Nothing: False.

record 2: Married: Yes, Net Income: 5000, Pay Taxes: False, Pay Nothing: True.

record 3: Married: Possible, Net Income: 9850, Pay Taxes: Possible, Pay Nothing: Possible.

The conditional transition network and related processes of present invention have numerous applications. Preferred applications will be those in which there is a vast body of expertise, but each individual non-expert user may be interested in only a small part of that expertise which depends on many, possibly interrelated, factors, some involving calculation. These are typical applications for which one requires a consultant or expert. While several such applications will be given below, it is understood that other applications will be apparent to those with ordinary skill in the art.

Conditional transition networks of the present invention can be used to construct computer-based system that supports real-time modelling of cognitive processes involved in diverse forms of human behavior. Such types of computer-based systems can be used to support highly effective, user-friendly human-computer interaction.

Conditional transition networks of the present invention can be used to construct computer-based systems that permit the user to combine printed text and multi-media in order to produce interactive multimedia books that may include interactive annotations that incorporate images, sounds, video and animations. Such interactive electronic books could be realized on desktop, laptops, notebook or other types of computer-based systems.

Conditional transition networks of the present invention can be used to create diverse capabilities within computer-based systems, such as intelligent agents, smart documents and the like.

Conditional transition networks of the present invention can be used to create improved spreadsheet programs having extensive modelling capabilities.

Conditional transition networks can be used to build a computer-based system that can determine quantitative strategies, such as how to frame a real estate transaction to minimize mortgage expenses. Notably, such determinations require calculation, answering numerous questions and logical inference.

Conditional transition networks can be used to construct a simple expert system to do medical diagnosis and determination of treatment (e.g. of a urinary tract infection).

Conditional transition networks can be used to represent a strategy for a line of questioning, e.g. against an opposing witness. Loophole analysis could be used to see if the witness might give certain answers to questions that would allow him or her to persuade the jury of an undesirable conclusion. Other strategies such as corporate strategies or even governmental ones could also be encoded in this way.

Conditional transition networks of the present invention can be used to build a system for computer-aided instruction. For example, students could translate simple noun phrases from English to German and the system could check whether the case agreement was done correctly. The student can use the conditional transition network to generate examples as well. If a student started with the phrase "der gute Mann" (the good man), with each word represented by a separate node, the student could change "der" to "die" and the system, by doing target-seeking, could present the example "die guten Maenner" (the good men).

Alternatively, one could generate examples by specifying their properties as attributes. For German noun phrases, the reader could specify attributes of noun phrases as four different nodes. One node would specify whether the noun phrase was definite or indefinite; another, singular or plural; a third, masculine, feminine, or neuter; a fourth, nominative, dative, genitive, or accusative. The phrase "die guten Maenner" might then be generated if the student user had requested an example that was definite, plural, masculine, and nominative.

Conditional transition networks of the present invention can be used to build a computer-based system that serves as a tourist guide. In a case where a tourist has several criteria (time of day, budget, principal interest, etc.), the guide would determine where the tourist should go. This would also be possible by using a conventional database system, but a conditional transition network is more flexible.

Conditional transition networks of the present invention can be used to build a computer-based system that can maintain an index on the results of a keyword search done by information retrieval. The user could select a set of nodes based on the results of one or more information retrieval queries. All selected nodes would have Precondition Value POSSIBLE and unselected ones would have Precondition Value FALSE. The-user would refine his or her selection using questions and answers in a conditional transition network.

Conditional transition networks of the present invention can be used to build a computer-based system that can represent and simulate an optimization problem, e.g. match people to jobs given their preferences and skills.

Conditional transition networks of the present invention can be used to build a configuration engine for simple applications, e.g. given a needs analysis, order enough disk drives to satisfy the demand.

Conditional transition networks of the present invention can be used to build a smart map. Instead of using the grid cells of a spreadsheet, each node could be represented by a light in a map. The color of the light representing a node may indicate its Precondition Values. For example, a company may be considering a good location for a store among a set of available locations. Each location has certain properties such as distance from a major road, size, and price. The writer encodes these into the Precondition Expressions of the various nodes by the writer. The initial state would be a map with all locations displayed yellow (for POSSIBLE). As criteria are entered by the reader, certain locations turn red (FALSE) and others turn green (TRUE).

Conditional transition networks of the present invention can be used to build a system which maps out a set of possible plans for a business or other enterprise. Which plan is followed may depend on initial decisions, e.g., today, we will buy a subsidiary that makes air compressors. The plan may change depending on future events, e.g., if the sales of the power transformer division fall below 10 million dollars, then merge it with the turbine division. Time may play a role in the plan, e.g. buy a new corporate jet only after earnings have exceeded targets for three years running.

Conditional transition networks of the present invention can be used to build a system which maps out a set of possible plans for a design of a constructed product. Various issues come up in the design of a product, especially when concurrent engineering techniques (multiple inter-dependent parts are designed at the same time) are used. One may have an initial set of choices to make, e.g., the technology to choose and the delegation of responsibility. Other choices may depend on circumstances, e.g., the failure to meet schedules.

While the particular embodiments shown and described above have proven to be useful in many applications in the computing arts, further modifications of the present inventions will occur to persons skilled in the art. All such modifications are within the scope and spirit of the present invention as defined by the appended claims.

What is claimed is:

1. A computer-based system for providing a user flexible access to information items stored in an information storage medium associated with said computer-based system, said computer-based system comprising:

(a) programmed means for producing a data structure for use in representing a knowledge network including a set of questions answerable so as to provide a set of answers associated with said information items, said data structure including a plurality of nodes, each said node having a plurality of data fields including:

a question field for storing data representative of a question in said knowledge network, an answer field for storing data representative of an answer formula evaluatable to produce a value for said answer formula, the value of said answer formula, or an answer to the question in said question field of said node, a qualified answer field for storing data representative of a qualified answer evaluatable to produce a value for said qualified answer, a precondition expression field for storing data representative of a precondition expression evaluatable to produce a value for said precondition expression which expresses a truth condition upon said answer formula, the value of said answer formula, or the answer to said question, stored in the answer field of said node, a contents field for storing data representative of one or more information items associated with said node, and a display field for storing a display label having a display value dependent on the values of one or more of said plurality of data fields at said node, said display label being visually displayable to said user, wherein the value of the precondition expression in the precondition expression field of at least one said node depends on the value of one or more of said plurality of data fields associated with at least one other said node, wherein the value of the qualified answer in the qualified answer field of each said node depends upon the value of the answer in the answer field of said node and the value of the precondition expression in the precondition expression field of said node, and wherein the display label in the display field of each said node depends at least on the value of the precondition expression field of said node;

(b) data storage means operably connected to said programmed means, for storing the data associated with said data structure produced by said programmed means;

(c) visual display means, operably connected to said data storage means, having a display surface for visually displaying data representative of at least a portion of said data structure including said display labels associated with at least one or more nodes in said data structure; and (d) data entry means operably connected to said data storage means, for entering data into said data structure or modifying data stored in said data structure.

2. The computer-based system of claim 1, wherein the precondition expression in the precondition expression field of each said node is formulated using propositional logic, predicate calculus, arithmetic expressions, mathematical functions, or information from an external database, or any combination thereof.

3. The computer-based system of claim 1, wherein the value of each said precondition expression is a value selected from the group consisting of TRUE, FALSE and POSSIBLE.

4. The computed-based system of claim 1, wherein the answer in the answer field of at least one node is an answer-formula.

5. The computer-based system of claim 1, wherein each said node further comprises a title field for storing a title assigned to said node.

6. The computer-based system of claim 1, wherein said set of questions are answerable so as to lead to one or more conclusions, and wherein each said question in said knowledge network is represented by one said node having a non-null question value in the question field of said node, and wherein each said conclusion in said knowledge network is represented by one said node.

7. The computer-based system of claim of 1, wherein the display label in the display field of at least one of said plurality of nodes depends at least on the value of the precondition expression field of said at least one of said plurality of nodes and on the value of the answer field of said at least one of said plurality of nodes.

8. The computer-based system of claim of 1 comprising a global clock for incrementally producing global clock ticks, wherein each said node comprises:

a precondition parents field for storing data representative of the identities of other said nodes having qualified answers upon which the value of the precondition expression of said node depends;

a delay field for storing a data representative of a first number of global clock ticks; and wherein the display label in the display field of at least one of said plurality of nodes also depends on whether the precondition parents field of said at least one of said plurality of nodes stores data representative of the identities of other nodes having qualified answers upon which the value of the precondition expression of said node depends, or whether the delay field of said at least one of said plurality of nodes stores data representative of a positive number of global clock ticks.

9. The computer-based system of claim 1, wherein data stored in the contents field of each said node identifies a data storage location in an external memory storage device.

10. The computer-based system of claim 1, wherein at least one said node comprises:

a precondition children field for storing data representative of other said nodes each having a precondition expression whose value depends on the qualified answer of said node; and an answer children field for storing data representative of other said nodes, each having an answer-formula whose value depends on the qualified answer of said node.

11. The computer-based system of claim 1, wherein at least one said node comprises:

a precondition parents field for storing data representative of other said nodes having qualified answers upon which the value of the precondition expression of said node depends; and an answer parents field for storing data representative of other said nodes having qualified answers upon which the value of the answer-formula in said node depends.

12. The computer-based system of claim 1, wherein said programmed means comprises:

means for automatically updating the value of the qualified answer in the qualified answer field of said node when the value of the answer in the answer field or the value of the precondition expression of said node has been changed.

13. The computer-based system of claim 1, wherein said programmed means comprises:

means for automatically updating the value of the qualified answer in the qualified answer field of other said nodes when the value of the qualified answer in the qualified answer field of said node has been changed.

14. The computer-based system of claim 1, wherein said programmed means comprises:

means for automatically updating the value of the precondition expression in the precondition expression field of other said nodes when the value of the qualified answer in the qualified answer field of said node has been changed.

15. The computer-based system of claim 1 comprising a selectable writer mode of operation and a selectable reader mode of operation, wherein during said writer mode of operation a user can write said precondition expressions in the precondition expression field of said plurality of nodes, and write said questions in the question field of said plurality of nodes, and wherein during said reader mode of operation the user can read one or more of said questions from the question field of said nodes and write answers in the answer fields of said nodes.

16. The computer-based system of claim 1, wherein said programmed means comprises:

means for determining the answer values in the answer fields of some of said plurality of nodes, which cause at least a selected one of said nodes to have a predetermined value in the answer field, the qualified answer field, or the precondition expression field of said selected node.

17. The computer-based system of claim 16, wherein said predetermined value is TRUE.

18. The computer-based system of claim 16, wherein said predetermined value is FALSE.

19. The computer-based system of claim 1, wherein said plurality of nodes includes one or more nodes which are influential to other said nodes; and wherein said programmed means comprises means for analyzing the data fields of said plurality of nodes, and for identifying a set of influential nodes among said plurality of nodes.

20. The computer-based system of claim of 19, wherein the display label in the display field of at least one of said plurality of nodes depends at least on the value of the precondition expression field of said at least one of said plurality of nodes and also on whether said at least one of said plurality of nodes is identified as being an influential node among said plurality of nodes.

21. The computer-based system of claim 1, wherein each said node comprises a precondition flag field for storing data representative of a precondition flag at said node.

22. The computer-based system of claim 21, wherein said programmed means comprises:

means for automatically updating the value of the qualified answer in the qualified answer field of said node when the value of the answer in said answer field or the value of the precondition expression of said node has been changed.

23. The computer-based system of claim 21, wherein said programmed means comprises:

means for automatically updating the value of the qualified answer in the qualified answer field of other said nodes when the value of the qualified answer in the qualified answer field of said node has been changed.

24. The computer-based system of claim 21, wherein said programmed means comprises:

means for automatically updating the value of the precondition expression in the precondition expression field of other said nodes when the value of the qualified answer in the qualified answer field of said node has been changed.

25. The computer-based system of claim 21 comprising a global clock for incrementally producing global clock ticks, and wherein each said node comprises:

a delay field for storing a data representative of a first number of global clock ticks; and a delay remaining field for storing data representative of a second number of global clock ticks.

26. The computer-based system of claim 25, wherein the value of the precondition flag in the precondition flag field of at least one said node depends on the value of the precondition expression in the precondition expression field of said node and the value of the delay remaining field of said node.

* * * * *